US012641525B2

(12) United States Patent
Kim et al.

(10) Patent No.: US 12,641,525 B2
(45) Date of Patent: May 26, 2026

(54) METHOD AND APPARATUS FOR REQUESTING SIGNIFICANT UPDATE INFORMATION FROM APS WITHIN TRANSMISSION MLD IN WIRELESS LAN SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 455 days.

(21) Appl. No.: 18/034,344

(22) PCT Filed: Nov. 9, 2021

(86) PCT No.: PCT/KR2021/016219
§ 371 (c)(1),
(2) Date: Apr. 27, 2023

(87) PCT Pub. No.: WO2022/103114
PCT Pub. Date: May 19, 2022

(65) Prior Publication Data
US 2023/0413165 A1     Dec. 21, 2023

(30) Foreign Application Priority Data

Nov. 12, 2020   (KR) ........................ 10-2020-0151313
Nov. 27, 2020   (KR) ........................ 10-2020-0163127
Dec. 18, 2020   (KR) ........................ 10-2020-0178753

(51) Int. Cl.
*H04W 48/14*          (2009.01)
*H04W 28/08*          (2023.01)
(Continued)

(52) U.S. Cl.
CPC ........... *H04W 48/14* (2013.01); *H04W 28/08* (2013.01); *H04W 76/20* (2018.02); *H04W 84/12* (2013.01)

(58) Field of Classification Search
CPC ..... H04W 48/14; H04W 28/08; H04W 76/20; H04W 84/12; H04W 76/15; H04W 76/11; (Continued)

(56) References Cited

U.S. PATENT DOCUMENTS

2021/0321410 A1 * 10/2021 Patil ....................... H04W 72/27
2022/0346166 A1 * 10/2022 Guo ....................... H04L 45/245

OTHER PUBLICATIONS

Namyeong Kim, "Solicited method for critical update in multi-link," LG Electronics, IEEE 802.11-20/1737r0. Nov. 5, 2020.
(Continued)

*Primary Examiner* — Jutai Kao
*Assistant Examiner* — Syed M Bokhari
(74) *Attorney, Agent, or Firm* — Bryan Cave Leighton Paisner LLP

(57) ABSTRACT

Proposed are a method and apparatus for requesting significant update information from APs within a transmission MLD in a wireless LAN system. In detail, a reception MLD transmits a probe request frame to the transmission MLD via a first link. The reception MLD receives a probe response frame from the transmission MLD via the first link. The transmission MLD comprises a first transmission STA operating in the first link and a second transmission STA operating in a second link. The reception MLD includes a first reception STA operating in the first link and a second reception STA operating in the second link. The probe request frame includes a profile field of the second reception STA. The profile field of the second reception STA includes a first significant update request field. When the first reception STA requests partial information regarding the second link and the first significant update request field is set to 1,
(Continued)

PPDU Format (IEEE 802.11a/g)

| L-LTF | L-STF | L-SIG | Data |

HT PPDU Format (IEEE 802.11n)

| L-LTF | L-STF | L-SIG | SIG A | HT-SFT | HT-LFT | ••• | HT-LFT | Data |

VHT PPDU Format (IEEE 802.11ac)

| L-LTF | L-STF | L-SIG | VHT-SIG A | VHT-SFT | VHT-LFT | VHT-SIG B | Data |

| 8µs | 8µs | 4µs | 4µs | 8µs | 4µs per symbol | 4µs | Variable durations per HE-LTF symbol | | | |

| L-LTF | L-STF | L-SIG | RL-SIG | HE-SIG A | HE-SIG B | HE-STF | HE-LTF | ••• | HE-LTF | Data | PE | the partial information regarding the second link is set as
significant update information regarding the second link.

13 Claims, 66 Drawing Sheets

(51) Int. Cl.
   _H04W 76/20_          (2018.01)
   _H04W 84/12_          (2009.01)
(58) Field of Classification Search
   CPC ...... H04W 76/19; H04W 76/22; H04L 63/00;
                   H04L 5/0048; H04L 27/26136; H04L
                                               27/2692
   USPC ........................................................ 370/338
   See application file for complete search history.

(56)                    References Cited

OTHER PUBLICATIONS

Guogang Huang, "Discussion on Multi-link Setup," Huawei, IEEE
802.11-20/1534rl, Nov. 1, 2020.
Abhishek Patil, "MLO Indication of Critical Updates," Qualcomm,
IEEE 802.11-20/0586r8, Oct. 4, 2020.
Ming Gan, "BSS parameter update for Multi-link Operation,"
Huawei, IEEE 802.11-20/0503-02-00be, Jun. 18, 2020.
Yoshihisa Kondo, "Discussion on Multi-link with Multiple AP
MLDs, ATR," IEEE 802.11-20/1060rl, Oct. 21, 2020.

* cited by examiner (a)

Figure 4:
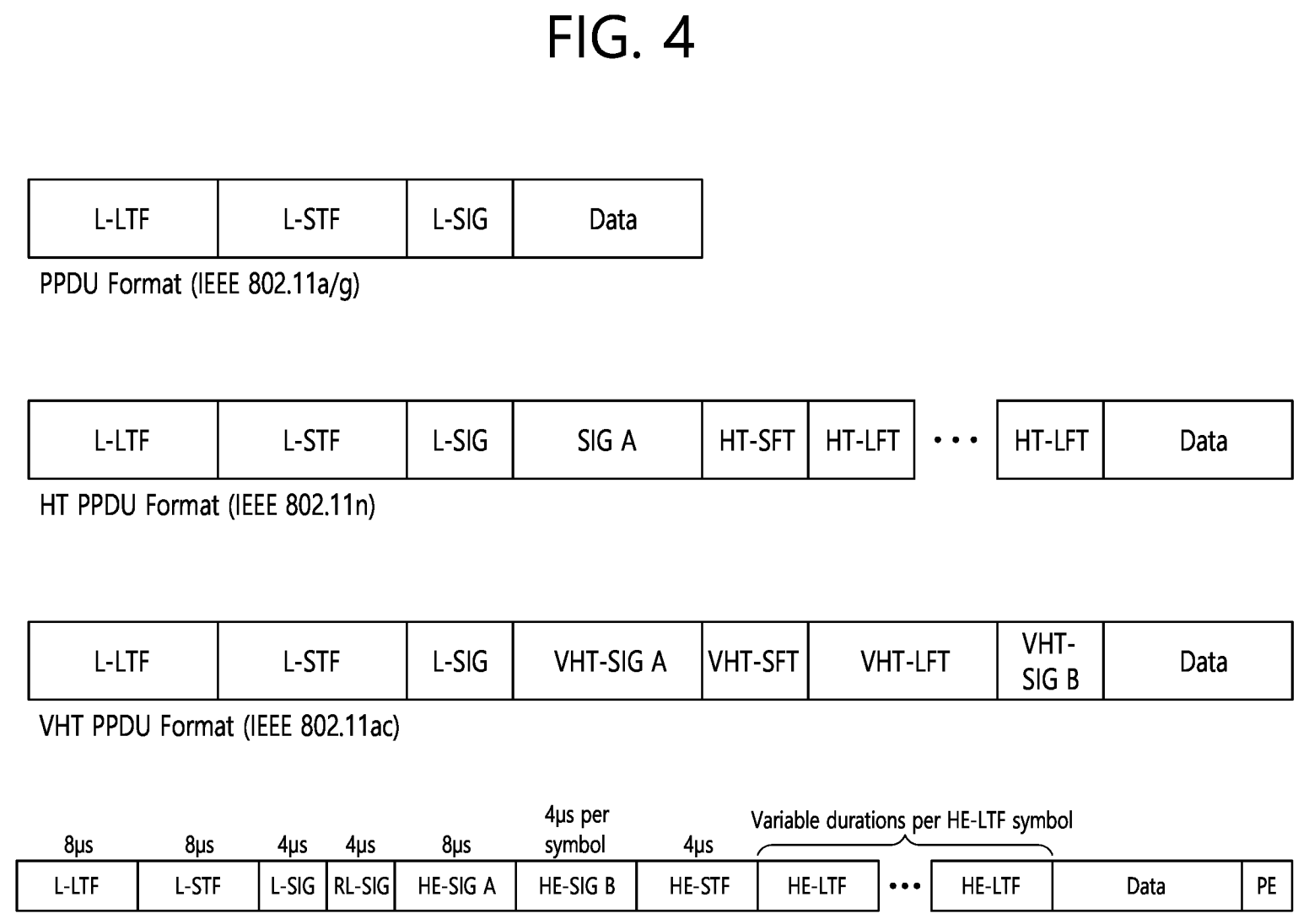

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ... | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| L-LTF | L-STF | L-SIG | RL-SIG | HE-SIG A | HE-SIG B | HE-STF | HE-LTF | ... | HE-LTF | Data | PE |
|---|---|---|---|---|---|---|---|---|---|---|---|

8μs | 8μs | 4μs | 4μs | 8μs | 4μs per symbol | 4μs

Variable durations per HE-LTF symbol

| Length | cascade indication | CS required | HE-SIG-A info | CP and LTF type | Trigger Type |
|--------|--------------------|-------------|---------------|-----------------|--------------|
| 12 | 1 | 1 | TBD | TBD | TBD |

Bits :

| L-STF | L-LTF | L-SIG | RL-SIG | U-SIG | EHT-SIG | EHT-STF | EHT-LTF | Data |

FIG. 12

| Multi-link STA | | |
|---|---|---|
| 5GHz | 6GHz | |
| STA 1 Link 1 | STA 2 Link 2 | STA 3 Link 3 |

FIG. 27

| Element ID | Length | Link Range | Info Range | Link Condition | Info Condition | . . . | Per-STA Profile (x) | Per-STA Profile (y) |
|---|---|---|---|---|---|---|---|---|

FIG. 28

| Element ID | Length | Requested Element IDs |
|------------|--------|-----------------------|
| 1 | 1 | variable |

Octets:

FIG. 31

| Element ID | Length | Element ID Extension | The number of Link ID | Link ID |
|---|---|---|---|---|
| 1 | 1 | 1 | 1 | variable |

Octets:

| Element ID | Length | Element ID Extension | The number of Link ID | Link ID | Requested Element IDs/ Requested Element ID extensions |
|---|---|---|---|---|---|
| 1 | 1 | 1 | 1 | variable | variable |

Octets:

FIG. 33

| Element ID | Length | Element ID Extension | Requested Element IDs/ Requested Element ID extensions |
|---|---|---|---|

FIG. 34

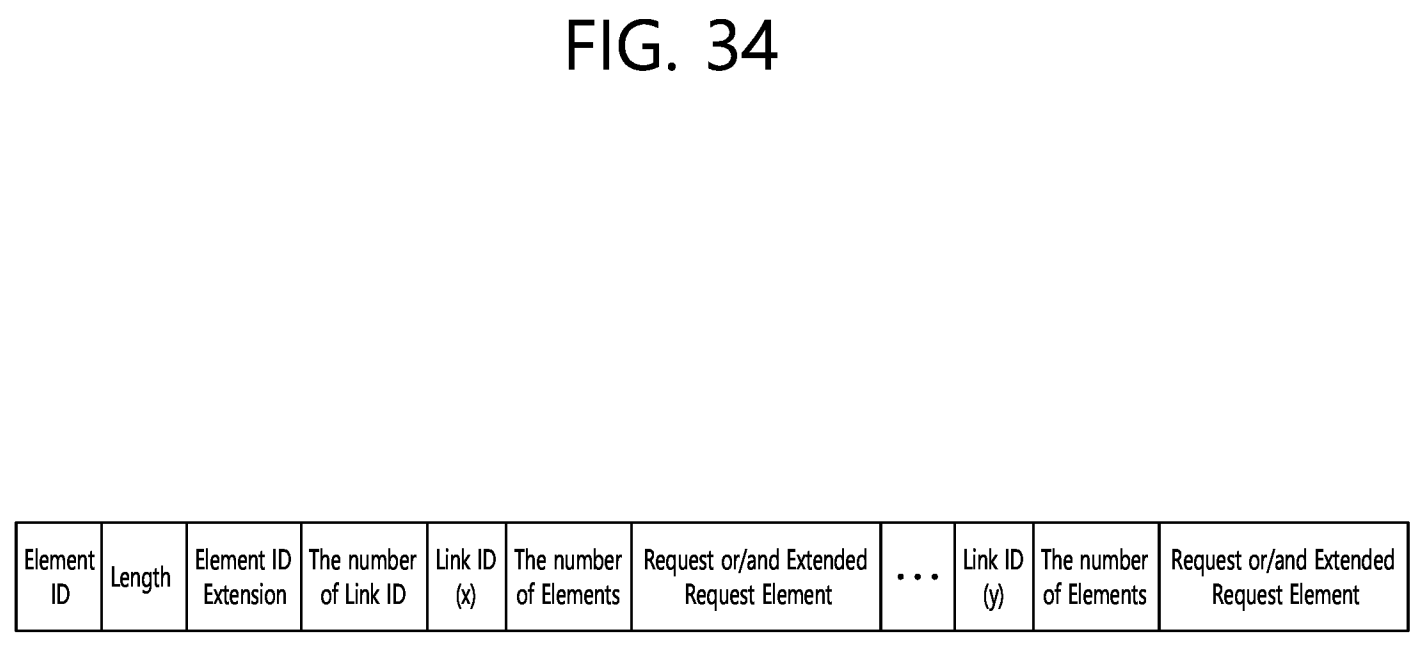

| Element ID | Length | Element ID Extension | The number of Link ID | Link ID (x) | The number of Elements | Request or/and Extended Request Element | . . . | Link ID (y) | The number of Elements | Request or/and Extended Request Element |
|---|---|---|---|---|---|---|---|---|---|---|

FIG. 35

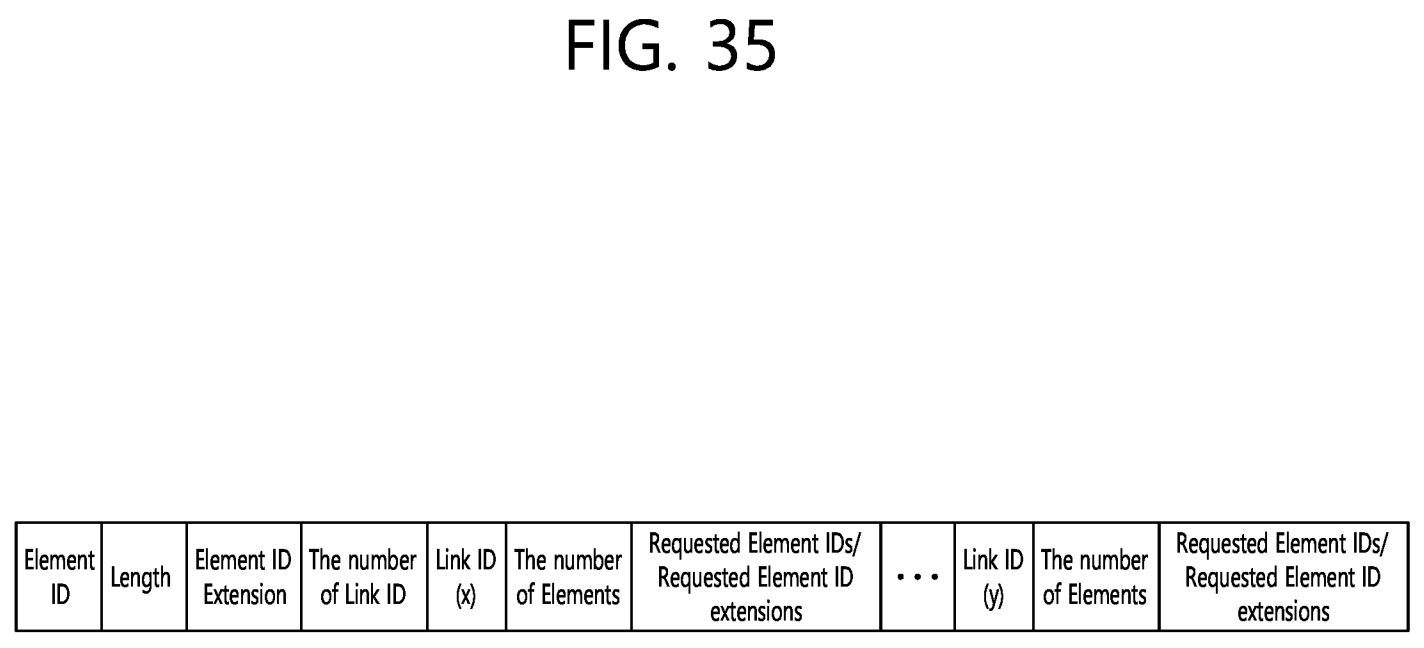

| Element ID | Length | Element ID Extension | The number of Link ID | Link ID (x) | The number of Elements | Requested Element IDs/ Requested Element ID extensions | ... | Link ID (y) | The number of Elements | Requested Element IDs/ Requested Element ID extensions |
|---|---|---|---|---|---|---|---|---|---|---|

FIG. 36

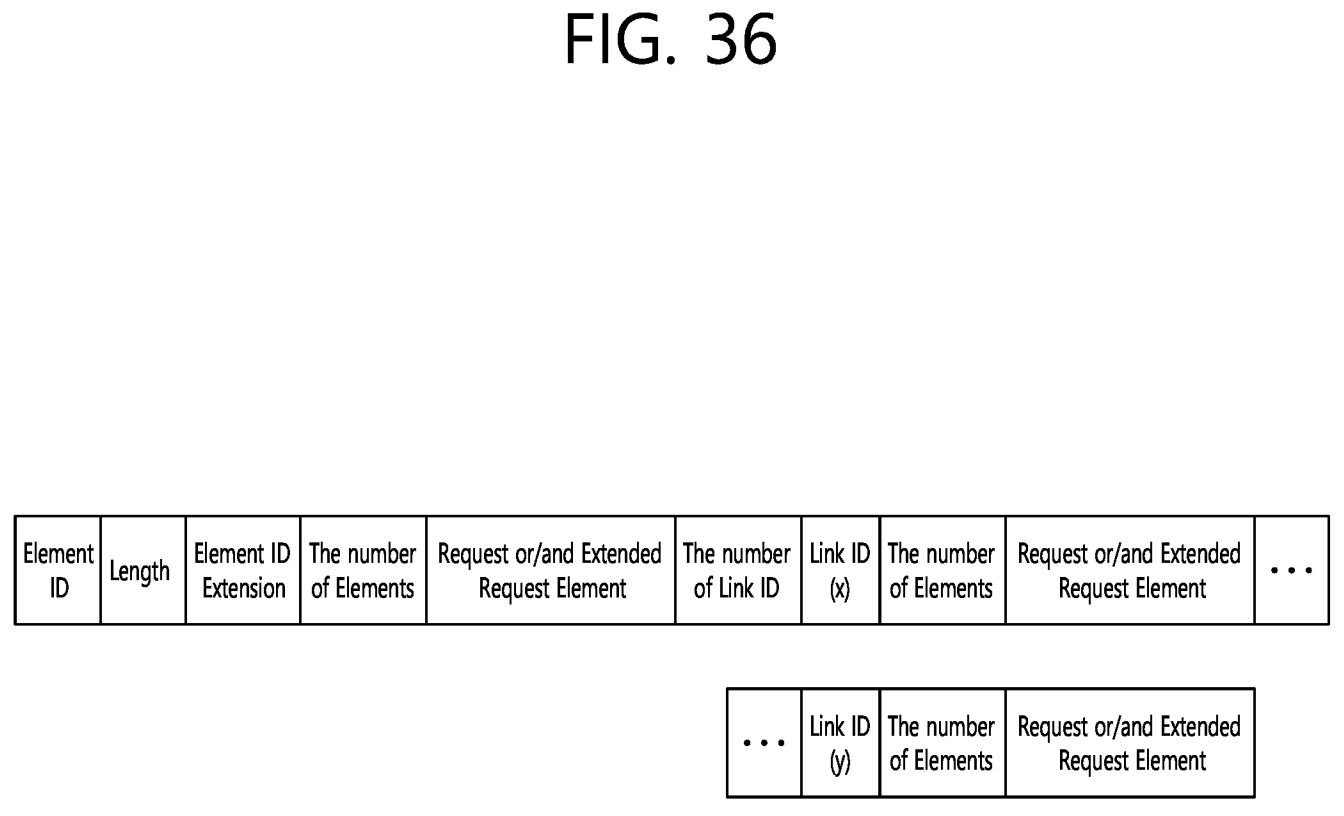

| Element ID | Length | Element ID Extension | The number of Elements | Request or/and Extended Request Element | The number of Link ID | Link ID (x) | The number of Elements | Request or/and Extended Request Element | ... |
|---|---|---|---|---|---|---|---|---|---|

| ... | Link ID (y) | The number of Elements | Request or/and Extended Request Element |
|---|---|---|---|

FIG. 37

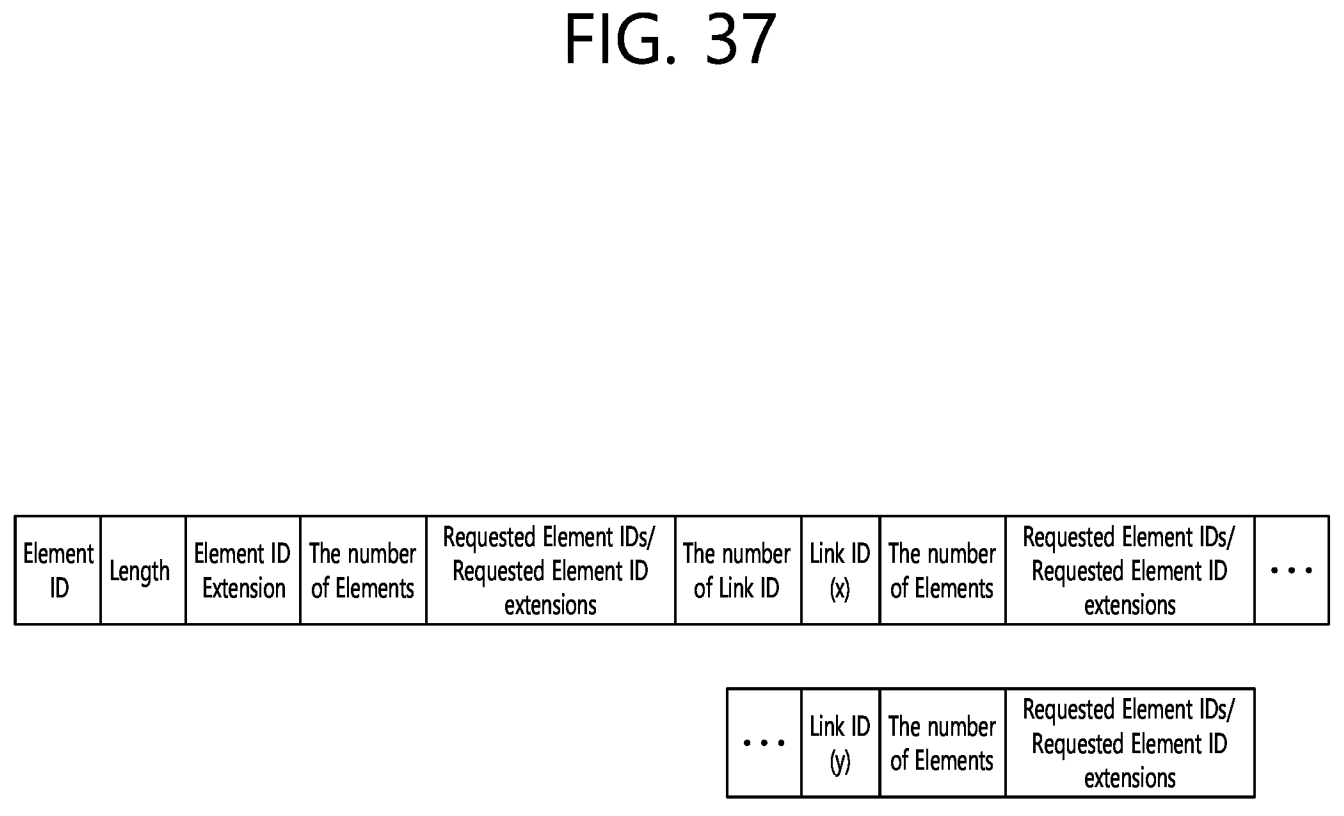

| Element ID | Length | Element ID Extension | The number of Elements | Requested Element IDs/ Requested Element ID extensions | The number of Link ID | Link ID (x) | The number of Elements | Requested Element IDs/ Requested Element ID extensions | ... |

| ... | Link ID (y) | The number of Elements | Requested Element IDs/ Requested Element ID extensions |

FIG. 38

| MLD Request Element | Request or/and Extended Request Element |
|---|---|

| Element ID | Length | Element ID Extension | Multi-Link Control | MLD MAC Address | TBD | Optional Subelements |
|---|---|---|---|---|---|---|
| 1 | 1 | 1 | 2 | 0 or 6 | TBD | variable |

Octets:

| MLD MAC Address Present | TBD |
|---|---|
| 1 | TBD |

B0 TBD

Bits:

FIG. 56

| Element ID | Length | Element ID Extension | Link ID (x) | Change Sequence(x) | . . . | Link ID (y) | Change Sequence(y) |
|---|---|---|---|---|---|---|---|

FIG. 57

| Element ID | Length | Element ID Extension | The number of Link ID | Link ID | Change Sequence |
|---|---|---|---|---|---|

FIG. 59

| Element ID | Length | Change Sequence |
|------------|--------|-----------------|

Octets:        1         1            1

METHOD AND APPARATUS FOR REQUESTING SIGNIFICANT UPDATE INFORMATION FROM APS WITHIN TRANSMISSION MLD IN WIRELESS LAN SYSTEM

CROSS-REFERENCE TO RELATED APPLICATIONS

This application is the National Stage filing under 35 U.S.C. 371 of International Application No. PCT/KR2021/016219, filed on Nov. 9, 2021, which claims the benefit of KR Patent Application No. 10-2020-0151313 filed on Nov. 12, 2020, KR Patent Application No. 10-2020-0163127 filed on Nov. 27, 2020, and KR Patent Application No. 10-2020-0178753 filed on Dec. 18, 2020, the contents of which are all hereby incorporated by reference herein in their entirety.

TECHNICAL FIELD

The present specification relates to a multi-link operation in a wireless LAN system, and more particularly, to a method and apparatus critical update information from APs in a transmitting MLD.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for requesting critical update information from APs in a transmitting MLD in a wireless LAN system.

An example of this specification proposes a method for requesting critical update information from APs in a transmitting MLD.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

In this embodiment, when a non-AP STA requests partial information about an AP other than a peer AP through a probe request frame in MLD communication, a method and apparatus for indicating that the partial information request is a request for important update information by including an important update request field (set to 1) in the probe request frame are proposed. Here, the transmitting MLD may correspond to the AP MLD, and the receiving MLD may correspond to the non-AP MLD. If the non-AP STA is a first receiving STA, a first transmitting STA connected to the first receiving STA through a first link may be referred to as a peer AP, and the second and third transmitting STAs connected through different links may be referred to as different APs.

A receiving multi-link device (MLD) transmits a probe request frame to a transmitting MLD through a first link.

The receiving MLD receives a probe response frame from the transmitting MLD through the first link.

The transmitting MLD includes a first transmitting station (STA) operating on the first link and a second transmitting STA operating on a second link. The receiving MLD includes a first receiving STA operating on the first link and a second receiving STA operating on the second link.

The probe request frame includes a profile field of the second receiving STA. The profile field of the second receiving STA includes a first critical update request field.

When the first receiving STA requests partial information on the second link and the first critical update request field is set to 1, the partial information on the second link is set as critical update information on the second link.

In this case, the probe response frame may include the critical update information on the second link. The critical update information on the second link may include a Basic Service Set (BSS) parameter of the second transmitting STA.

That is, in this embodiment, a method of requesting, by a non-AP STA (first receiving STA) critical update information of another AP (second transmitting STA) in the AP MLD by not simply requesting partial information through the above-mentioned critical update request field is proposed. Accordingly, the non-AP STA may receive the critical update information (BSS parameter information) of the other AP through the probe response frame.

According to the embodiment proposed in this specification, by directly including an critical update request field and CSN information stored by a non-AP STA in a probe response frame, it has a new effect of directly obtaining updated BSS parameter information through the probe response frame. In addition, there is an effect that frame overhead can be reduced because only updated BSS parameter information, not all BSS parameter information of a specific AP, can be included in the probe response frame based on the CSN information.

BRIEF DESCRIPTION OF THE DRAWINGS

FIG. 4 illustrates an example of a PPDU used in an IEEE standard.

FIG. 10 illustrates an example of a PPDU used in the present specification.

FIG. 12 shows an example of a structure of a non-AP MLD.

FIG. 27 shows an example of a newly proposed field to indicate link change and reconnection.

FIG. 28 shows an example of the Request IE format.

FIG. 31 shows an example of an MLD Request element.

FIG. 33 shows an example of defining a new element based on an MLD Request element.

FIG. 34 shows another example of an MLD Request element.

FIG. 35 shows another example of an MLD Request element.

FIG. 36 shows another example of an MLD Request element.

FIG. 37 shows another example of an MLD Request element.

FIG. 38 shows an example of a field requesting common information.

FIG. 56 shows an example of an MLD Change Sequence format.

FIG. 57 shows another example of an MLD Change Sequence format.

FIG. 59 shows an example of a change sequence element in the existing standard.

DETAILED DESCRIPTION

Figure 1:
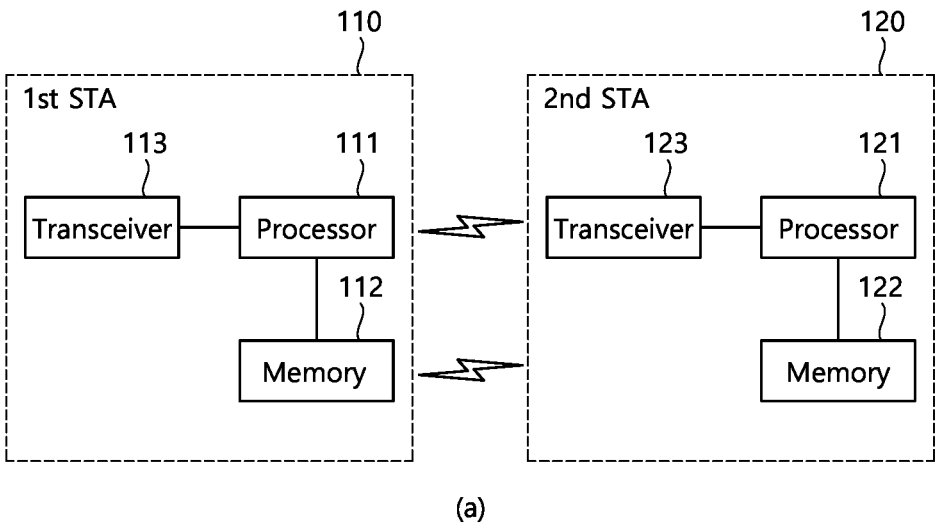
FIG. 1 shows an example of a transmitting apparatus and/or receiving apparatus of the present specification.
Figure 1:
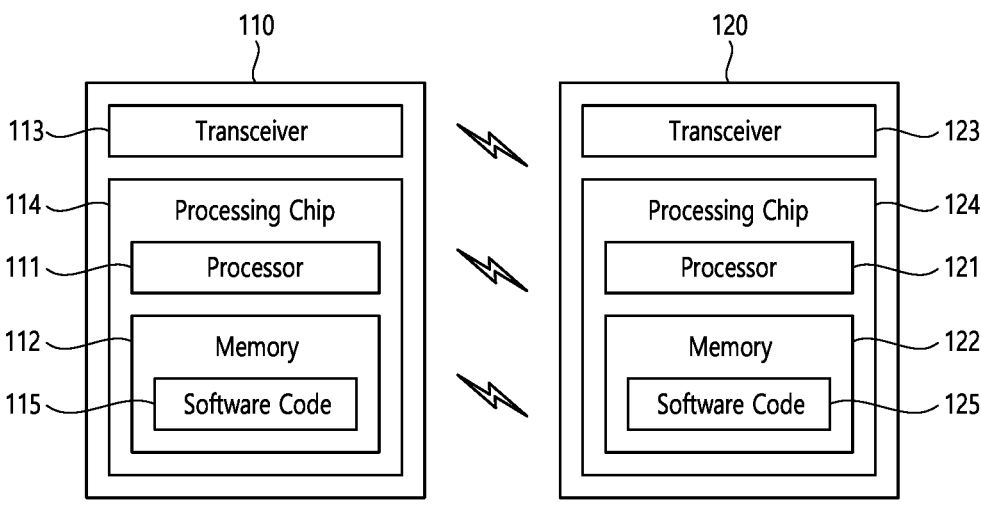

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
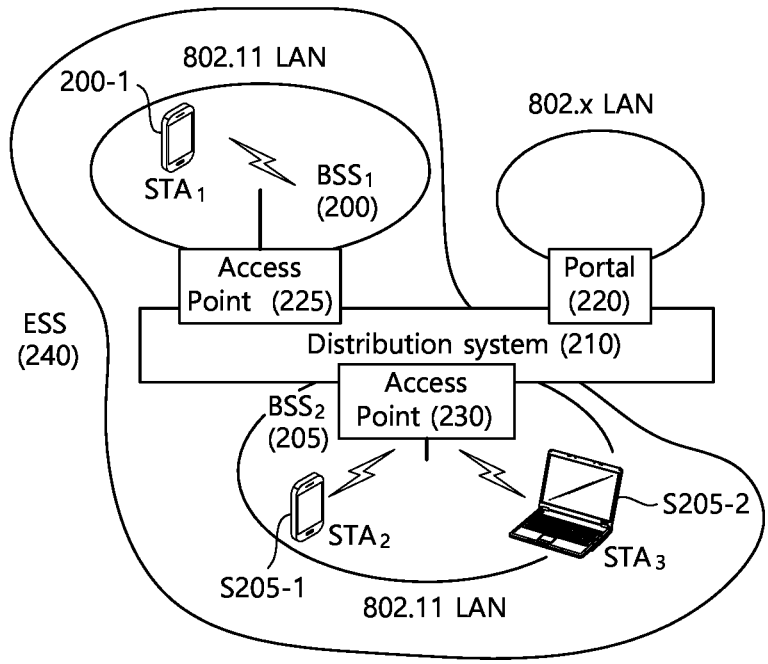
FIG. 2 is a conceptual view illustrating the structure of a wireless local area network (WLAN).
Figure 2:
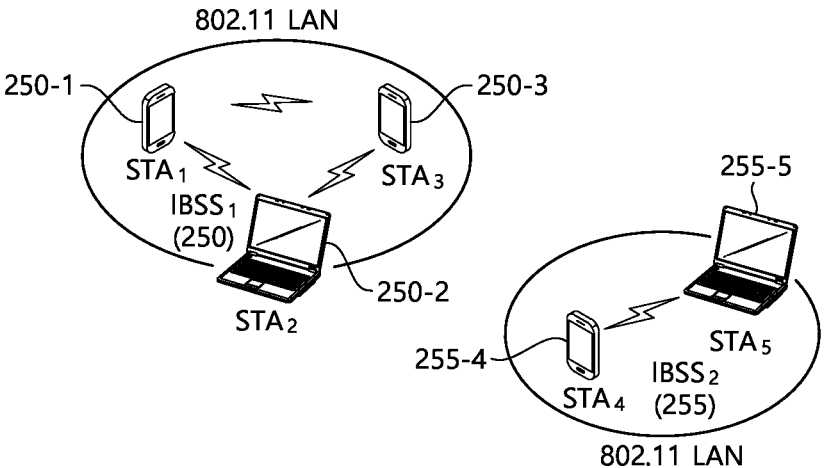

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
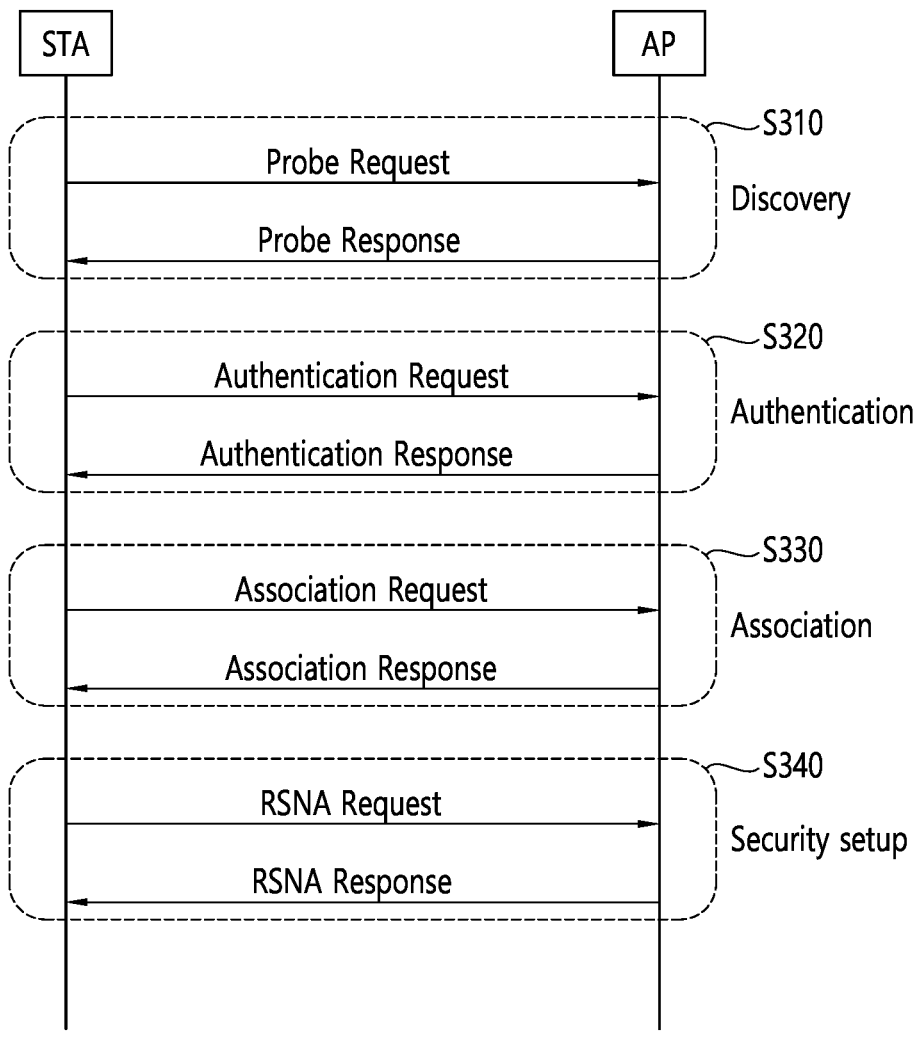
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
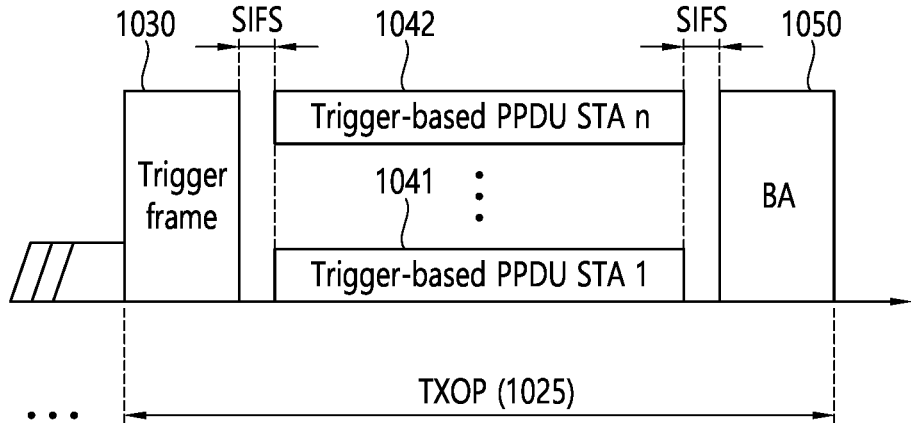
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
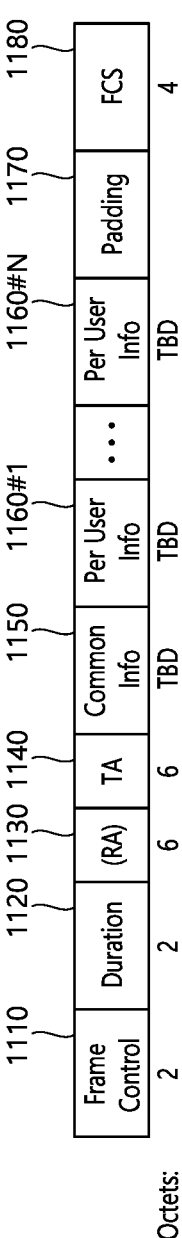
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
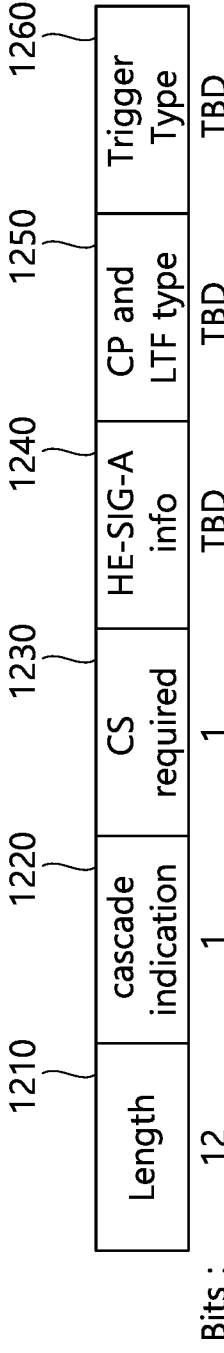
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
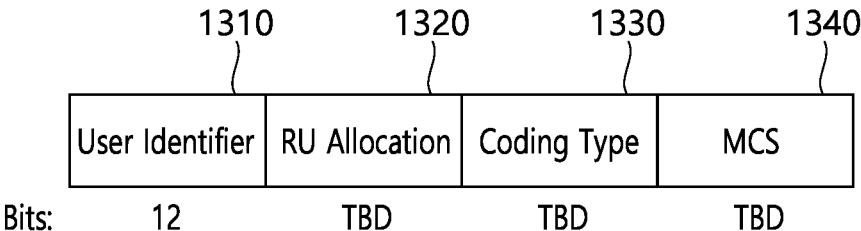
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL 01-DMA-based random access (UORA) scheme will be described.

Figure 9:
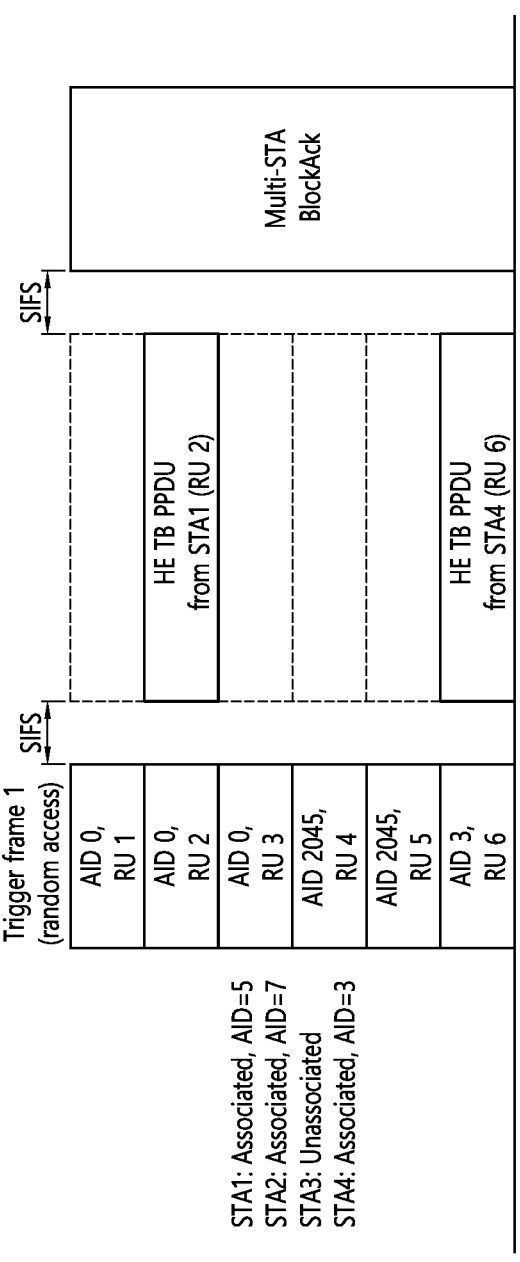
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

Figure 10:
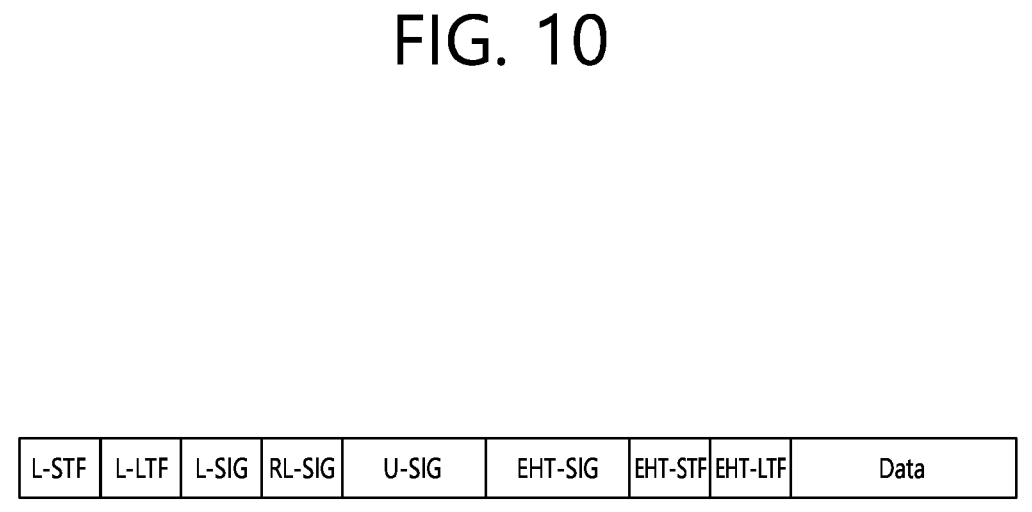

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to −28, −27, +27, +281.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
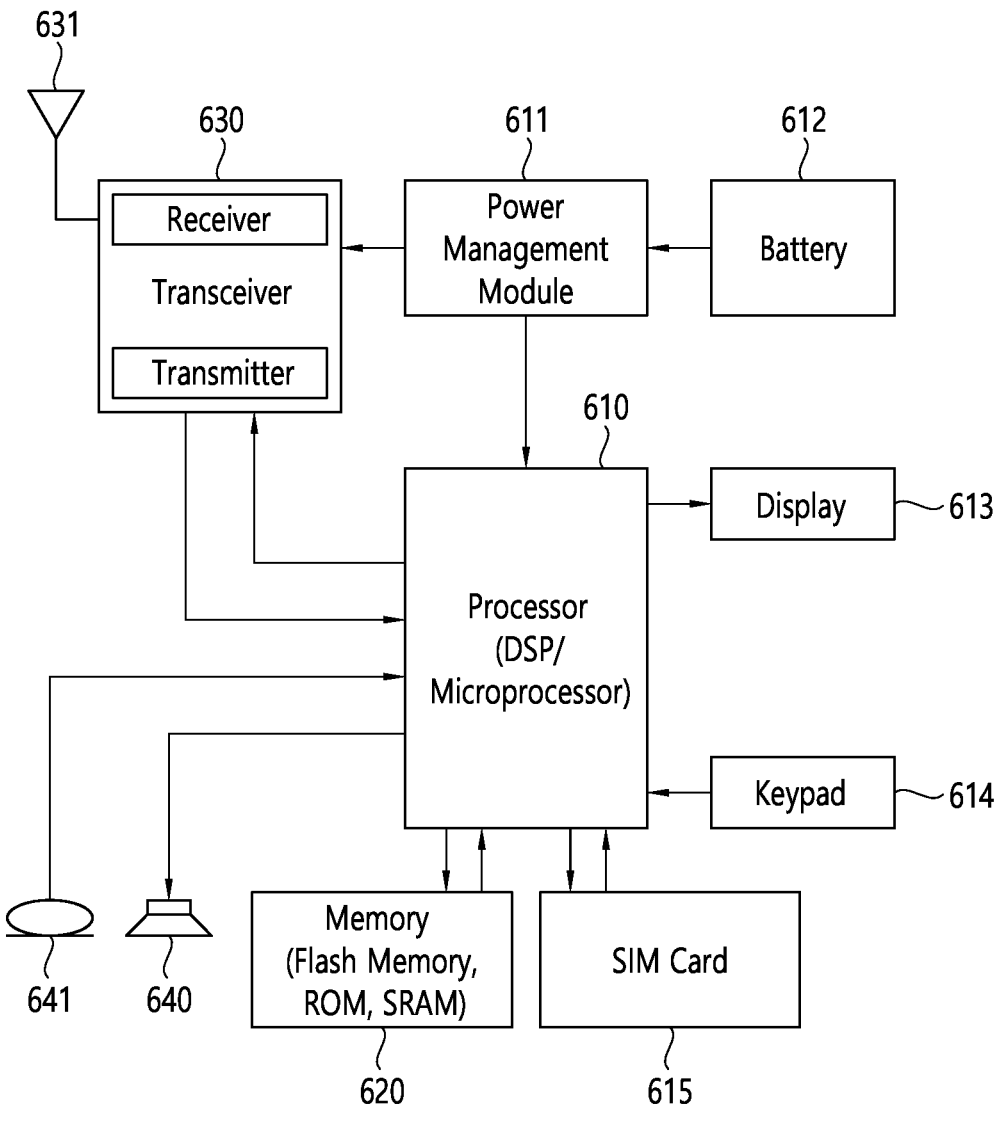
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHz/6 GHz band) and at least one channel within the 5 GHz band (or 2.4 GHz/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHz, 5 GHz, 6 GHz, 60 GHz, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

In the following specification, for convenience of explanation, it is described that the MLD (or the processor of the MLD) controls at least one STA, but is not limited thereto.

As described above, the at least one STA may transmit and receive signals independently regardless of MLD.

According to an embodiment, an AP MLD or a non-AP MLD may have a structure having a plurality of links. In other words, a non-AP MLD can support multiple links. A non-AP MLD may include a plurality of STAs. A plurality of STAs may have Link for each STA.

In the EHT standard (802.11be standard), the MLD (Multi-Link Device) structure in which one AP/non-AP MLD supports multiple links is considered as a major technology. STAs included in the non-AP MLD may transmit information about other STAs in the non-AP MLD together through one link. Accordingly, there is an effect of reducing the overhead of frame exchange. In addition, there is an effect of increasing the link use efficiency of the STA and reducing power consumption.

FIG. 12 shows an example of a structure of a non-AP MLD.

Referring to FIG. 12, a non-AP MLD may be configured with a plurality of links. In other words, a non-AP MLD can support multiple links. A non-AP MLD may include a plurality of STAs. A plurality of STAs may have Link for each STA. Although FIG. 12 shows an example of a non-AP MLD structure, the structure of the AP MLD may also be configured identically to the example of the structure of the non-AP MLD shown in FIG. 12.

For example, the non-AP MLD may include STA 1, STA 2, and STA 3. STA 1 can operate on link 1. link 1 may be included in the 5 GHz band. STA 2 can operate on link 2. link 2 may be included in the 6 GHz band. STA 3 can operate on link 3. link 3 may be included in the 6 GHz band. Bands included in link 1/2/3 are exemplary and may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link can be changed or reconnected to another link by AP MLD or non-AP MLD depending on the situation.

In addition, in the EHT standard, a link may be classified as an anchored link or a non-anchored link in order to reduce power consumption. An anchored link or non-anchored link can be called variously. For example, an anchored link may be referred to as a primary link. A non-Anchored Link can be called a Secondary link.

According to an embodiment, an AP MLD supporting multi-link can be managed by designating each link as an anchored link or a non-anchored link. The AP MLD may support one or more links among a plurality of links as an anchored link. A non-AP MLD can use it by selecting one or more of its own anchored links from the Anchored Link List (list of anchored links supported by the AP MLD).

For example, Anchored Link can be used for non-data frame exchange (i.e. Beacon and Management frame) as well as frame exchange for synchronization. Also, non-anchored links can only be used for data frame exchange.

The non-AP MLD can monitor only the anchored link for receiving beacons and management frames during the idle period. Therefore, in the case of non-AP MLD, at least one anchored link must be connected to receive beacon and management frame. The one or more Anchored Links must always maintain an enable state. In contrast, non-anchored links are used only for data frame exchange. Accordingly, an STA corresponding to a non-anchored link (or an STA connected to a non-anchored link) may enter doze during an idle period not using a channel/link. This has the effect of reducing power consumption.

Therefore, in the following specification, a protocol for recommending or requesting link reconnection by an AP MLD or a non-AP MLD dynamically according to circumstances may be proposed for efficient link connection. In addition, in the following specification, an anchored link reconnection protocol considering characteristics of an anchored link used for the purpose of power reduction as well as a general link may be additionally proposed.

Example for Link Change and Reconnection

According to an embodiment, each link between an AP MLD and a non-AP MLD may be determined in an Association or (re)Association process. At this time, the AP MLD and the non-AP MLD can perform frame exchange through the connected Link. A specific embodiment in which an AP MLD and a non-AP MLD are connected through a link setup process can be described with reference to FIG. 13.

Figure 13:
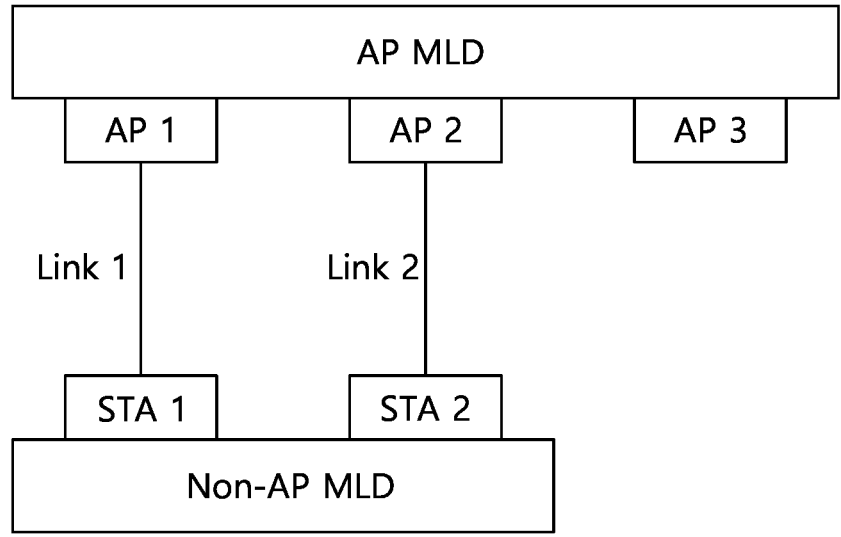
FIG. 13 illustrates an example in which an AP MLD and a non-AP MLD are connected through a link setup process.

FIG. 13 illustrates an example in which an AP MLD and a non-AP MLD are connected through a link setup process.

Referring to FIG. 13, the AP MLD may include AP 1, AP 2, and AP 3. The non-AP MLD may include STA 1 and STA 2. AP 1 and STA 1 may be connected through link 1. AP 2 and STA 2 may be connected through link 2.

For example, AP 1 and STA 1 may be connected through link 1 through a first link setup process. AP 2 and STA 2 may be connected through link 2 through a second link setup process. For another example, AP MLD and non-AP MLD may be connected through a one-time link setup process. In other words, the AP MLD and the non-AP MLD may be connected through link 1 and link 2 based on a link setup process once.

As described above, each AP and STA may perform frame exchange through the connected Link. In addition, information of other APs on a different link or other STAs on a different link may be transmitted and received through one link.

However, after this link setup process, the AP MLD or non-AP MLD may request link change or reconnection for more efficient frame exchange (e.g., load balancing or interference avoiding, etc.) depending on the situation/environment.

An embodiment of link change or reconnection may be described with reference to FIG. 14.

Figure 14:
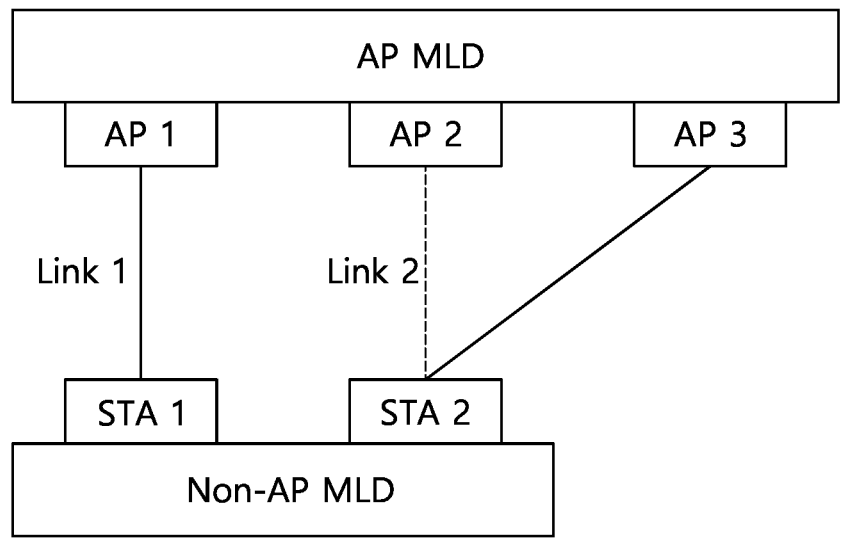
FIG. 14 illustrates an example in which Link is changed or reconnected.

FIG. 14 illustrates an example in which Link is changed or reconnected.

Referring to FIG. 14, conventionally, STA 2 is connected to AP 2. Thereafter, data load of AP 2 may be excessive. STA 2 may be reconnected to AP 3 having a relatively small data load. In this case, there is an effect that the AP MLD and the non-AP MLD can perform efficient data exchange.

Figure 15:
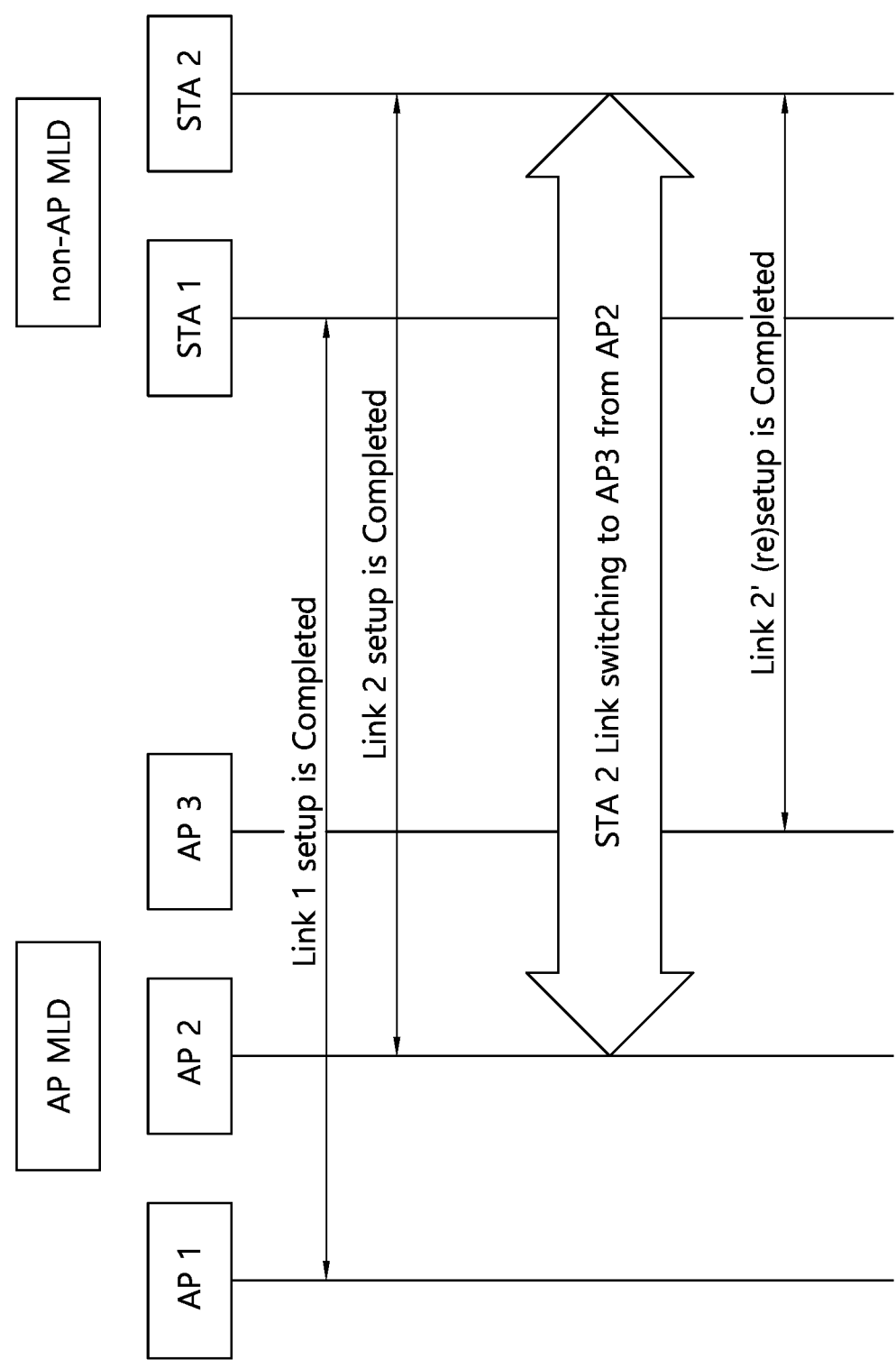
FIG. 15 illustrates a specific example in which Link is changed or reconnected.

FIG. 15 illustrates a specific example in which Link is changed or reconnected.

Referring to FIG. 15, AP 1 of the AP MLD may be connected to STA 1 of the non-AP MLD through link 1. AP 2 of the AP MLD may be connected to STA 2 of the non-AP MLD through link 2. Thereafter, STA 2 may attempt/request connection with AP 3 through link change or reconnection, and STA 2 may connect to AP 3 through link 2 based on the link change or reconnection.

According to an embodiment, the non-AP MLD and the AP MLD may request link transition to improve performance. The AP MLD and the non-AP MLD can transmit/receive/exchange various information and link state information for each current link. Therefore, the AP MLD and the non-AP MLD can select a link more suitable for transmitting and receiving signals based on various information and link states for each current link, and can transmit the above-described information to help the selection. For example, various types of information for each current link may include information about data traffic load for each link and channel access capability between links. For example, a link state may be set to disable or enable.

In the following specification, the process of negotiating with the non-AP MLD/AP MLD to request a change or reconnection to a link other than the link to which the AP MLD/non-AP MLD is connected to improve performance may be referred to as "Link switching negotiation". The name of the "Link switching negotiation" may be called variously, and may be changed.

In the link switching negotiation process, the non-AP MLD (or AP MLD) requests to change the Link connected to a specific STA to another Link, the AP MLD (or non-AP MLD) may respond to this request through a request acceptance or rejection message.

For example, as shown in FIG. 15, when link change is agreed upon through link switching negotiation, the STA may perform a link re-setup process in which the existing link is changed from AP 2 to AP 3 and reconnected.

Hereinafter, a link change or reconnection process can be described by dividing into a case requested by an AP MLD and a case requested by a non-AP MLD.

An Embodiment in which the AP MLD Requests Link Change or Reconnection

According to an embodiment, the AP MLD may request link change or reconnection from the non-AP MLD for efficient data transmission. For example, based on data traffic of each AP for load balancing, the AP MLD may request the STA to change or reconnect to a more efficient link.

For example, AP MLD is non-AP MLD based on data traffic load information for each AP and/or channel access capability information between each link (e.g., Simultaneous TX/RX (STR) capability information, etc.) Links suitable for STAs of can be calculated/confirmed/confirmed. Thereafter, the AP MLD may request link change or reconnection to the STA (or non-AP MLD) based on data traffic load information for each AP and/or channel access capability information between each link.

As described above, when requesting a Link change, the AP MLD may transmit Link information it considers most suitable to the non-AP MLD through a request message. For example, the request message may include a Beacon or a management frame.

In relation to the above-described embodiment, an element or field including link information that is considered most suitable may be newly proposed. A newly proposed element or field may be defined as a "recommended link". "Recommended link" is an example, and the name of a specific element or field may be changed.

recommend link (element/field): An element or field for the AP MLD to recommend the most suitable Link to the STA of the non-AP MLD based on various information (e.g., data load for each Link) for each Link. For example, recommend link (element/field) may be indicated by Link ID information of AP MLD or AP BSS information. In other words, the recommend link (element/field) may include AP MLD Link ID information or AP BSS information.

According to one embodiment, the recommend link (element/field) may optionally be included in a link switching response and transmitted. For example, the STA may establish a connection with the Link recommended by the AP based on the element/field (i.e., recommend Link). For another example, the STA may perform a connection request to a Link different from the indicated Link based on the element/field (i.e., recommend Link) and additional information possessed by the STA.

A detailed signal exchange process between an AP MLD and a non-AP MLD according to the above-described embodiment may be described with reference to FIG. 16.

Figure 16:
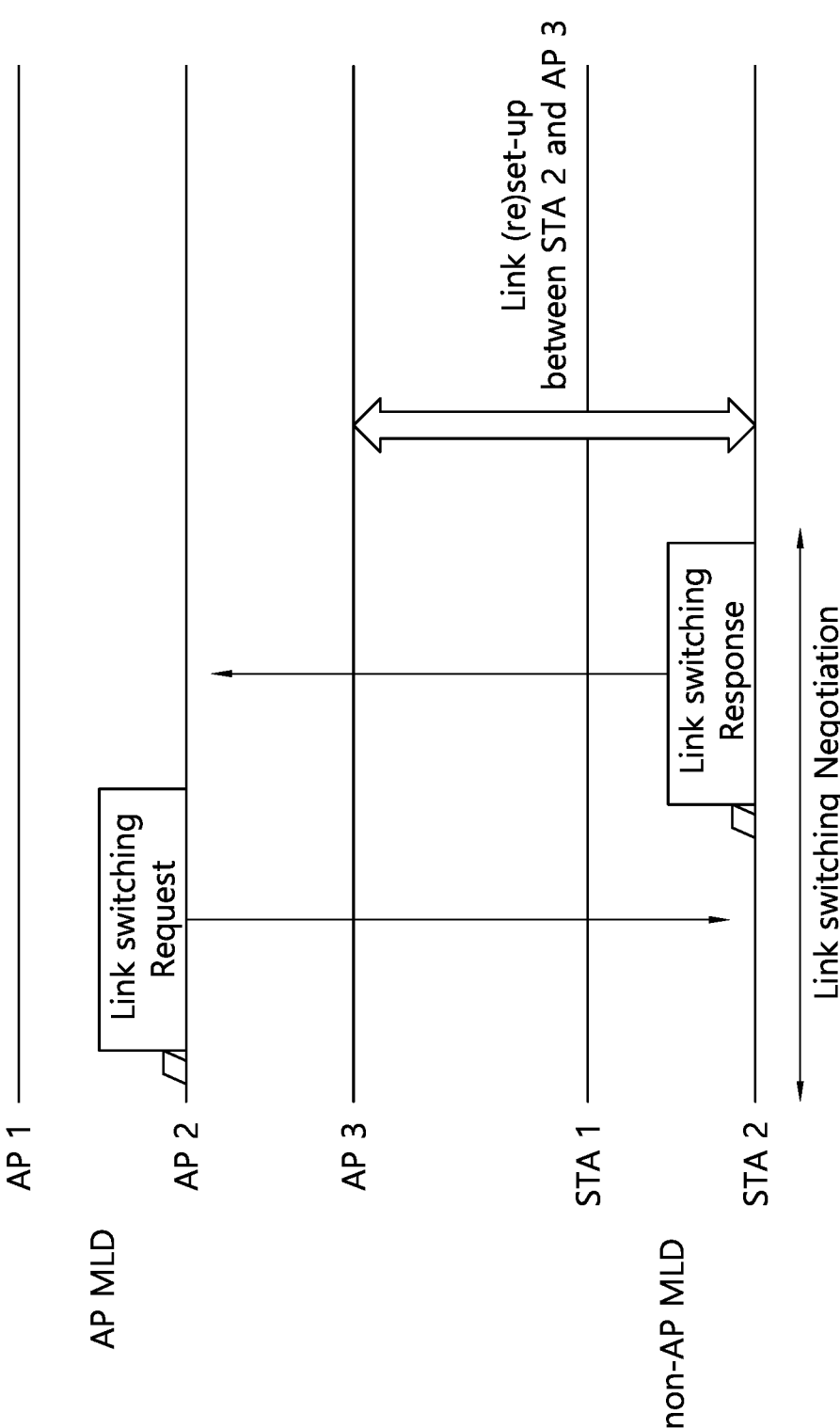
FIG. 16 illustrates operations of an AP MLD and a non-AP MLD for link change or reconnection.

FIG. 16 illustrates operations of an AP MLD and a non-AP MLD for link change or reconnection.

Referring to FIG. 16, in a situation in which STA 2 is connected to AP 2 through link 2, a lot of data traffic may flow to AP 2. In other words, in a situation where STA 2 is connected to AP 2 through link 2, a lot of data traffic may be generated in AP 2.

The AP MLD (or AP 2) may request the non-AP MLD (or STA 2) to reconnect to AP 3 having relatively few STA connections. In general, a message for requesting reconnection is transmitted to the STA (i.e., STA 2) that wants to reconnect, but depending on the situation (e.g., channel status or link status), the message may be transmitted to any STA (i.e., other STA). In other words, based on the channel condition or link condition, the STA to which the request message for requesting reconnection (e.g., Link switching request frame) is transmitted may be changed.

For example, when the STA (i.e., STA 2) receiving the request message for requesting reconnection accepts the request, an "Accept" response message (e.g., Link switching response frame) may be sent. For another example, the STA (i.e., STA 2) may transmit a "Decline" response message when rejecting the request.

In general, the STA accepting reconnection (i.e., STA 2) sends a response message to the existing link (connection link prior to reconnection), the response message may be transmitted through any Link (i.e., another STA) using the multi-link characteristic.

If STA 2 accepts the link reconnection request, after transmitting the response message, STA 2 may disconnect from the existing AP 2 and request link reconnection to AP 3. At this time, the reconnection request process may be performed in the same way as the link setup process between existing MLDs. After the link setup process between AP 3 and STA 2 is completed, STA 2 may perform frame exchange with AP 3 through Link 2.

Conversely, when STA 2 rejects the link reconnection request, STA 2 and AP 2 may use the existing linked link (i.e., link 2) as it is.

According to an embodiment, when an AP requests a link change from an STA, if a suitable link is recommended, the STA may or may not change the link to the recommended link. For example, the above-described recommend link may be used for the AP to recommend a link suitable for the STA.

For example, the STA may approve a link change as a response message to a request message for requesting reconnection of the AP. The STA may approve/confirm the link change with the recommended link, and may request another link change from the AP based on information other than the information included in the request message.

Therefore, the AP needs to inform the STA whether or not to accept the response message. To this end, the AP may transmit a Confirmation message (e.g., link switching confirmation frame) for the STA's response message (e.g., Link switching Response frame) to the STA.

Specific operations of the AP MLD and non-AP MLD of the above-described embodiment may be described with reference to FIG. 17.

Figure 17:
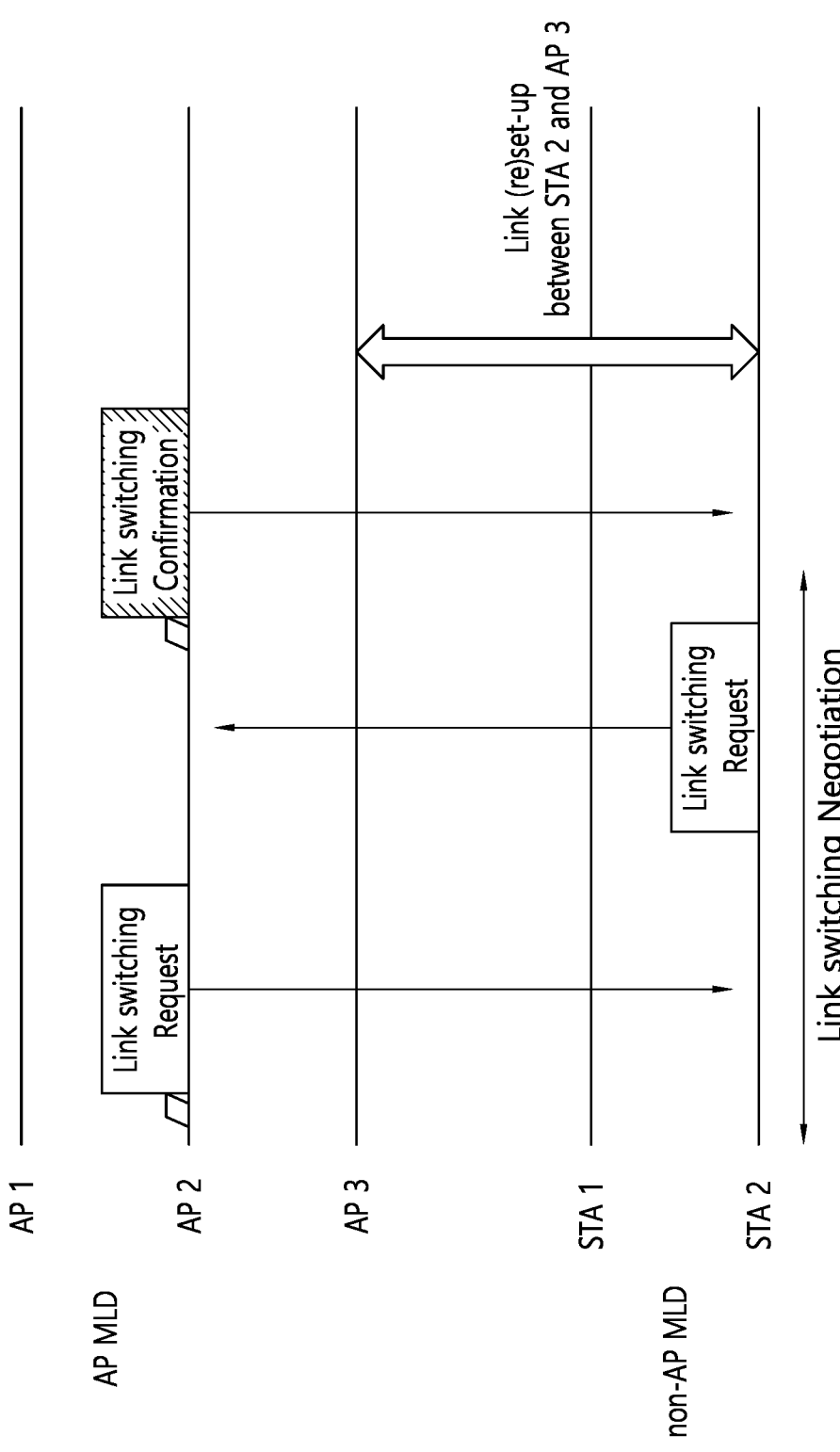
FIG. 17 illustrates operations of an AP MLD and a non-AP MLD for link change or reconnection.

FIG. 17 illustrates operations of an AP MLD and a non-AP MLD for link change or reconnection.

Referring to FIG. 17, AP 2 may request link change from STA 2 including recommended link information. In other words, AP 2 may transmit a link switching request frame including recommended link information to STA 2.

STA 2 may transmit whether to accept the link request through a Link switching Response frame.

For example, when Link switching is accepted, STA 2 may transmit Link switching response frame including Link information to be changed. At this time, Link information to be changed may or may not be the same as the recommended link.

For another example, when STA 2 selects a link other than the recommended link provided by AP 2 and responds with a link switching response frame, the AP may transmit a message on whether or not to approve the final to the STA. The message may be referred to as a Link switching confirmation frame.

For example, AP 2 may accept link change to a link designated by STA 2 through a Link switching Confirmation frame. Based on the Link switching Confirmation frame, STA 2 may attempt to change the link to a link designated by itself.

As another example, AP 2 may reject link change to a link designated by STA 2 through a Link switching Confirmation frame. STA 2 and AP 2 can maintain a connection with an existing Link without changing the link.

The embodiment shown in FIG. 17 can be applied even when the AP transmits the link switching request frame without including recommended link information. For example, when an AP (e.g., AP 2) transmits a Link switching request frame without recommendation link information to an STA (e.g., STA 2), the STA may directly designate a changed Link based on its own information, and then respond to the AP through a Link switching response frame. Even in this case, the AP must finally transmit a Link switching Confirmation frame for approval. Therefore, an embodiment in which the AP transmits a Link switching Confirmation frame even when the recommended link information is not included in the Link switching request frame may be applied.

An Embodiment in which a Non-AP MLD Requests Link Change or Reconnection

According to an embodiment, the non-AP MLD may request link change or reconnection to the AP MLD for efficient data transmission. For example, in order to use the STR capability during data transmission, the non-AP MLD may request connection link change or reconnection from the AP MLD.

Figure 18:
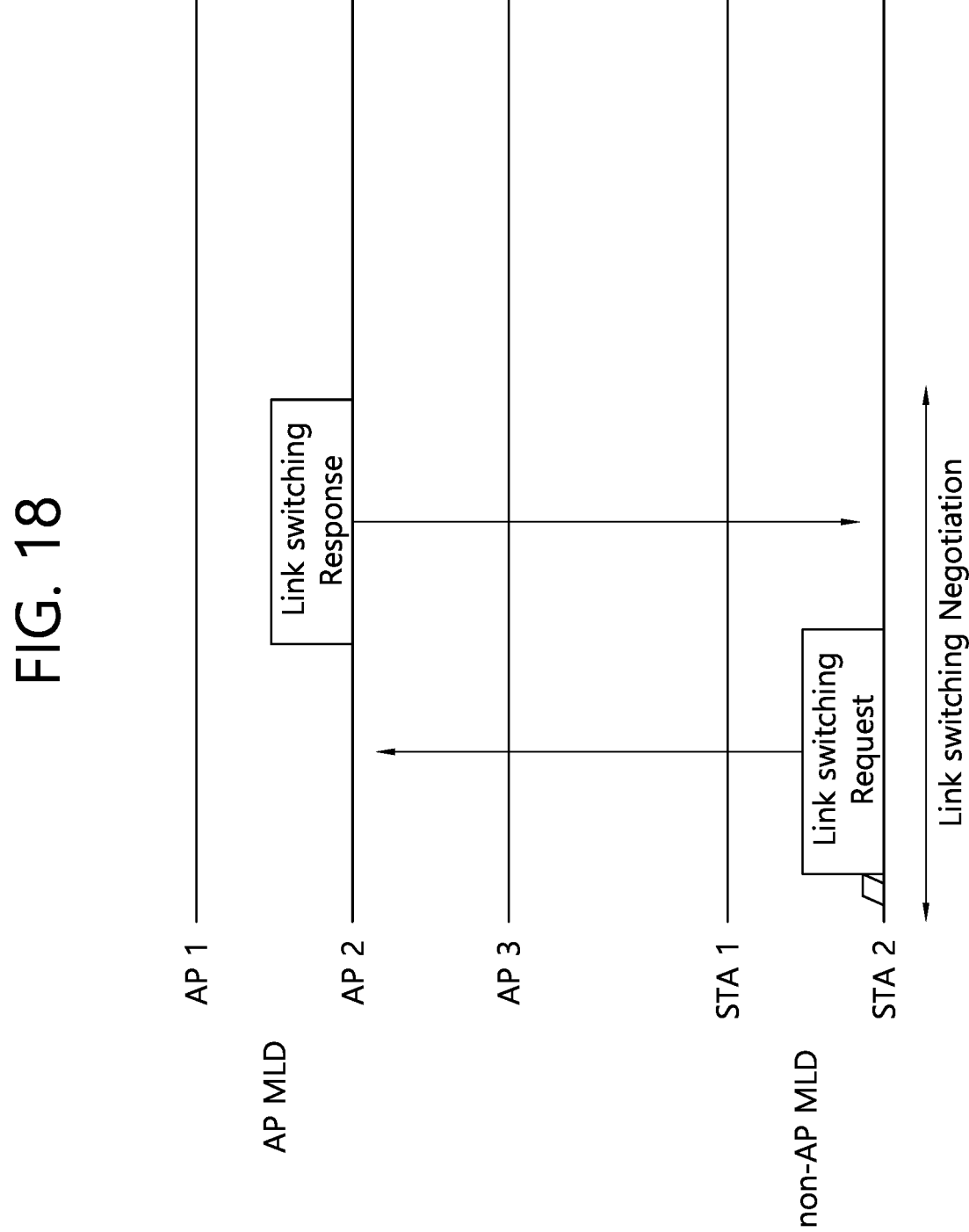
FIG. 18 illustrates operations of an AP MLD and a non-AP MLD for link change or reconnection.

FIG. 18 illustrates operations of an AP MLD and a non-AP MLD for link change or reconnection.

Referring to FIG. 18, an AP MLD and a non-AP MLD may perform link switching negotiation. STA 2 of the non-AP MLD may transmit a link switching request frame to AP 2 of the AP MLD. AP 2 of the AP MLD may transmit a link switching response frame to STA 2 of the non-AP MLD in response to the link switching request frame. The link switching request frame or link switching response frame may be transmitted and received through a link to be changed, but is not limited thereto. A link switching request frame or a link switching response frame may be transmitted and received through various links as well as a link to be changed.

The non-AP MLD may request link change or reconnection through various methods. Hereinafter, three methods for non-AP MLD to request link change or reconnection may be proposed. Specifically, the above three methods can be sequentially described as a solicited method, an unsolicited method, and a general method.

1) Solicited method: A method in which a non-AP MLD requests various information for Link (re)selection from the AP MLD and receives various information through this. For example, various pieces of information may include information about capabilities, operation elements, and BSS parameters.

According to an embodiment, a method in which an STA requests information of other APs of a connected AP MLD may be used in various cases, not only when a link is reconfigured. For example, after multi-link setup, the STA may request BSS parameter information of other APs for link switching and select the best link based on the received information. Alternatively, in the discovery process, the STA may request BSS load information of each AP from the AP MLD and select a link to perform link setup based on the received information. (However, it is assumed that the number of APs in the AP MLD is greater than the number of STAs in the non-AP MLD.)

Accordingly, the AP receiving the information request message may transmit any information such as capability information, BSS parameter information, critical parameters, and/or operation element information for all APs in the AP MLD. The above-described examples may be applied to all embodiments described below.

2) Unsolicited method: A method in which the AP transmits various information for Link (re)selection without a separate information request from the non-AP MLD. The STA may utilize the received information in various situations. According to an embodiment, a method in which an AP of an AP MLD transmits information of other APs without a request for separate information from an STA may be used in various cases as well as when a link is reconfigured. Accordingly, the AP receiving the information request message may transmit any information such as capability information, BSS parameter information, critical parameters, and/or operation element information for all APs in the AP MLD. The above-described examples may be applied to all embodiments described below.

3) General method: A method in which a non-AP MLD requests Link (re)selection without additional information based on information acquired through previous Beacon frames, etc.

1) Solicited Method

Hereinafter, an embodiment of the solicited method described above may be described first.

According to an embodiment, the non-AP MLD may request information for selecting a suitable link from the AP MLD before link change or reconnection. The STA may utilize data load information for each AP or capability information of each link (or information of other links) in order to select an appropriate link.

For example, the capability information for each link may be included in a beacon frame and transmitted periodically.

For another example, capability information for each link is optional information and may not be included in a beacon frame transmitted every period. Alternatively, in order to reduce frame overhead, only information on a link to which the STA is connected or some links to which the STA is connected may be received. Alternatively, if the beacon reception period is long due to the nature of the non-AP MLD (e.g., low-power device), the non-AP MLD may not be able to receive capability information for each link for more appropriate link selection. In the above cases, the non-AP MLD may request the latest information of capability information for each link and information for each link of the AP MLD (e.g., BSS parameter information or operation element information, etc.). The link of the capability information for each link and the information for each link may include not only a transmitted/received link but also other links. For example, a QoS data frame field (A-Control field of the 11ax standard), a management frame, a probe response/request frame, a PS-Poll frame, or a null frame may be used to request/transmit the latest information. Alternatively, a separate new frame may be defined to request/transmit the latest information.

According to an embodiment, in order to request capability information for each link and latest information for each link of the AP MLD, the STA may transmit a request message requesting information necessary for link reselection to the AP. For example, a conventionally defined probe request frame for the request message may be reused. For another example, a new frame for the request message may be defined.

According to an embodiment, through the request message, the STA may specify necessary specific information and request it from the AP. Specific information that can be designated may be changed according to circumstances. That is, the STA may request only information corresponding to a specific link or information corresponding to a specific capability. For example, information corresponding to a specific link may include information about BSS load/parameters of the specific link. Also, information corresponding to capability may include BSS load information of all links (all links) or BSS load information of a specific link. In this case, the AP may transmit only information designated by the STA through a response message. A specific embodiment of a specific information request and response may be described through an embodiment of an IOM definition and operation.

As another example, the STA may request all capability information currently possessed by the AP MLD (e.g., including information on other links) through the request message.

As in the above example, an embodiment for transmitting all information possessed by an AP or an embodiment for transmitting only specific information designated by an STA may be defined/configured in various ways. For example, the AP may transmit all information or designated information based on a separate field or bitmap to indicate (or transmit) only specific information.

In general, a message requesting information from the AP MLD may be transmitted through an STA that wants reconnection, but may be transmitted to any STA (i.e., other STA) depending on circumstances (channel condition or link condition).

The AP MLD receiving the request message sends a response message (i.e., information message) including information requested by the STA (e.g., data load information for each link, STR capability information between links, etc.) to the non-AP MLD. there is. For example, when a probe request frame of a conventional standard is reused for the request message, the AP (or AP MLD) must respond using a probe response frame as the response message.

The response message may also be generally transmitted through the AP that has received the request message, but may be transmitted to any AP (i.e., other AP) using multilink characteristics.

Optionally, the AP MLD may transmit a "recommend link" element recommending a suitable link to the STA through a response message including various pieces of information (e.g., latest information necessary for link reselection).

In this specification, a case where an STA of a non-AP MLD requests information of another AP is defined in detail.

When an STA of a non-AP MLD transmits an MLD Probe request frame to request complete information of other APs from a peer AP, the peer AP responds with an MLD Probe response frame including complete information on APs requested by the STA. will be. In this case, the peer AP may respond with the entire information about the requested AP to the MLD Probe Response frame as follows.

1-1) when the STA Requests Complete Information on the Other AP, a Method of Including the Complete Information of the Peer AP as Mandatory in the MLD Probe Response This method is a method of putting all information of the peer AP together even when the STA requests all information of other APs of the same AP MLD except for the peer AP. Currently, 802.11be uses an inheritance model to reduce the overhead of MLD Probe Response. Therefore, when the STA requests complete information of other APs, if the AP always includes the complete information of the peer AP, the inheritance model can be applied. In other words, if the AP MLD includes peer AP information in response to a request for all information about specific APs, the value common within the same MLD is included as common info in the ML I.E., and the information different for each AP is the ML IE Different information can be included for each AP as a non-inheritance element in My Per-STA Profile. When the STA requests all information about several other APs, the overhead of the entire MLD Probe response frame can be reduced by composing the same information with Common info only once. However, in this case, if the STA does not request all information about peer APs, there is some overhead because unrequested information about peer APs is also included, but when information about multiple other APs is requested, inheritance model It can be useful because the overhead reduced by using can be larger.

1-2) when the STA Requests Complete Information about the Other AP, a Method of not Including the Entire Information of the Peer AP as Mandatory in the MLD Probe Response (i.e., a Method of Transmitting Including Only the Entire Information of the Requested Other APs)

In this method, when an STA requests complete information about other APs from a peer AP, only entire information about the requested APs is included in the MLD Probe response and transmitted. In this method, when an STA requests information about a peer AP together, overhead can be reduced by applying an inheritance model, if the STA requests only information about other APs of the same AP MLD, excluding information about peer APs, the inheritance model cannot be applied. Therefore, if the peer AP information is not included, the inheritance model is not applied, which may increase the overhead somewhat. When the STA requests complete information only for a specific AP rather than multiple APs, overhead may be rather small because unnecessary peer AP information is not included. It is a method of responding with only the information of the APs requested by the STA. Although it may be somewhat simpler than the first Mandatory method, as the number of other APs within the same AP MLD to which the STA requests complete information increases, the first mandatory method using the inheritance model may be more efficient.

1-3) how the Peer AP Transmits the Entire Information by Configuring the Side with Less Overhead Depending on the Case In the first case according to the configuration of the MLD Probe Response frame according to the common info information of the AP requested by the AP by the STA (if the STA does not request information about the peer AP together, the method of including the information of the peer AP in the response as mandatory) and the second case (when the STA does not request information about the peer AP together, this method is a method of constructing and transmitting an MLD Probe Response in an efficient way by comparing frame overhead occurring in a method in which peer AP information is not included as mandatory in the response). In other words, the STA responds by configuring a format with less overhead by comparing the efficiency of applying the inheritance model according to the information of the APs requested by the STA. However, in this method, the criterion considered to be efficient by comparing the two cases may be determined according to the implementation of the AP.

The method for the various options described above is a method for the case where the STA requests complete information on other APs, and when the STA requests partial information on other APs, it may not apply because information on a specific IE is requested. However, when the STA requests complete information for some APs and partial information for some APs in one MLD Probe Request frame, the three methods mentioned above can be used because the inheritance model can be applied.

The solicited method described above may be used for link change or reconnection in an STA of a non-AP MLD. For example, when an STA of a non-AP MLD wants Link reselection due to Link congestion, the STA of the non-AP MLD may request BSS load information and BSS parameter information for each link of the connected AP MLD through a solicited method. Upon receiving this request message, the AP may transmit the link and information indicated by the STA in a response message.

Hereinafter, the above-described request message and response message may be described as an information request message and an information response message in order to be distinguished from a request message for link change and a response message for link change.

Based on the information included in the above-described information response message, the STA may reselect an appropriate link and request link change or reconnection to the AP MLD through a link change request message. The request message for link change may include AP information and Link information to be reconnected to.

Upon receiving the request message, the AP MLD may transmit a response message of "Accept" when accepting the request. When the AP MLD rejects the request, it may transmit a response message of "Decline".

If the request is accepted, the AP may perform Link (re)setup based on frame exchange through the Link of the reselected AP after transmitting the response message. Conversely, when rejecting the request, the STA can use the existing connected Link as it is.

Figure 19:
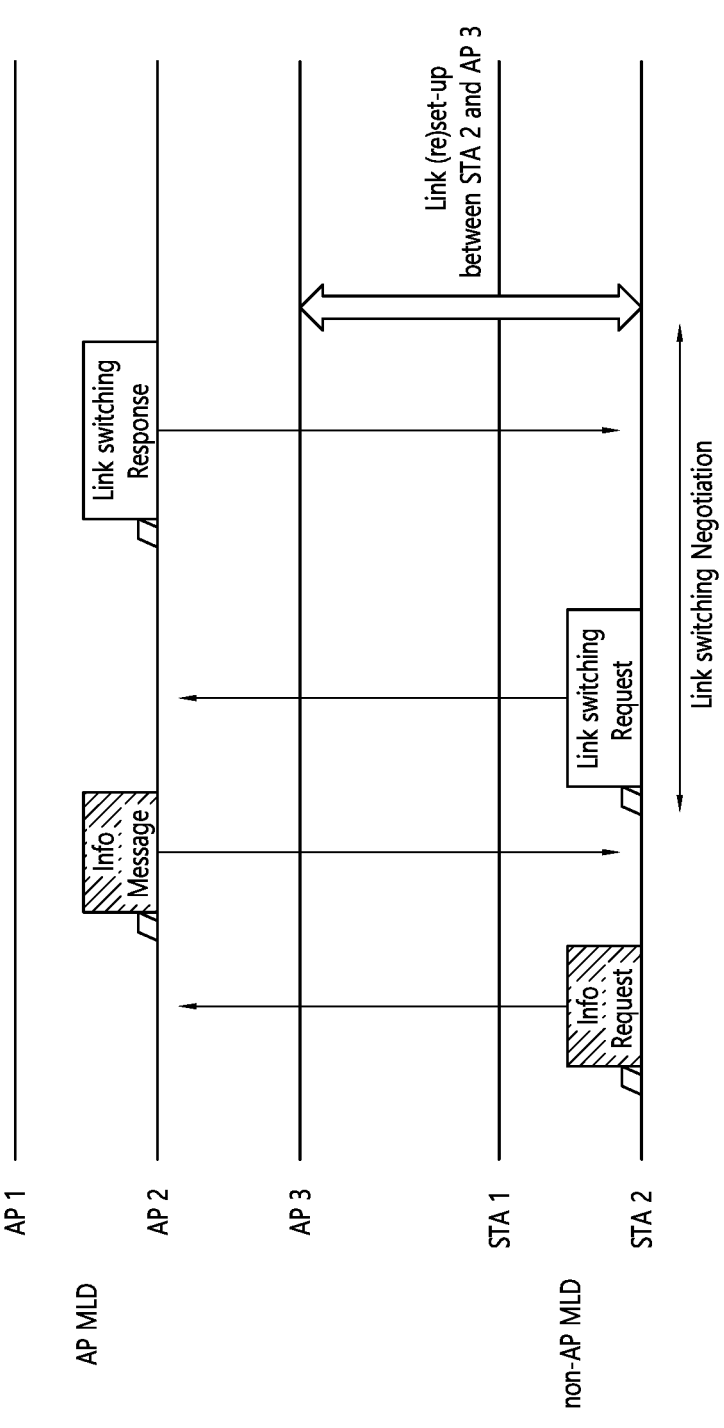
FIG. 19 illustrates operations of an AP MLD and a non-AP MLD for link change or reconnection.

An example of specific AP MLD and non-AP MLD operations according to the solicited method may be described through FIG. 19.

FIG. 19 illustrates operations of an AP MLD and a non-AP MLD for link change or reconnection.

Referring to FIG. 19, when STA 2 of the non-AP MLD wants to reselect a connected Link, STA 2 may transmit an Info request message to the AP MLD through Link 2. Upon receiving this, the AP MLD may transmit an Info response message including information necessary for link reselection of the non-AP MLD. Based on the information included in the above-described Info response message, STA 2 of the non-AP MLD may transmit a link change request message (i.e., link switching request frame) to AP 2 of the AP MLD.

Thereafter, STA 2 may receive a response message for link change (i.e., link switching request frame) and perform link (re)set-up for link change.

An embodiment of an information request proposed in this specification may be used/applied even when an STA requests necessary information from an AP. When information included in a frame (e.g., beacon) received by the STA from the AP is insufficient, the STA may request the AP for the insufficient information. For example, when the AP transmits only information on a connected link without including information on the other link or transmits information on whether or not information on the other link is updated, the STA may request the AP for insufficient information.

Figure 20:
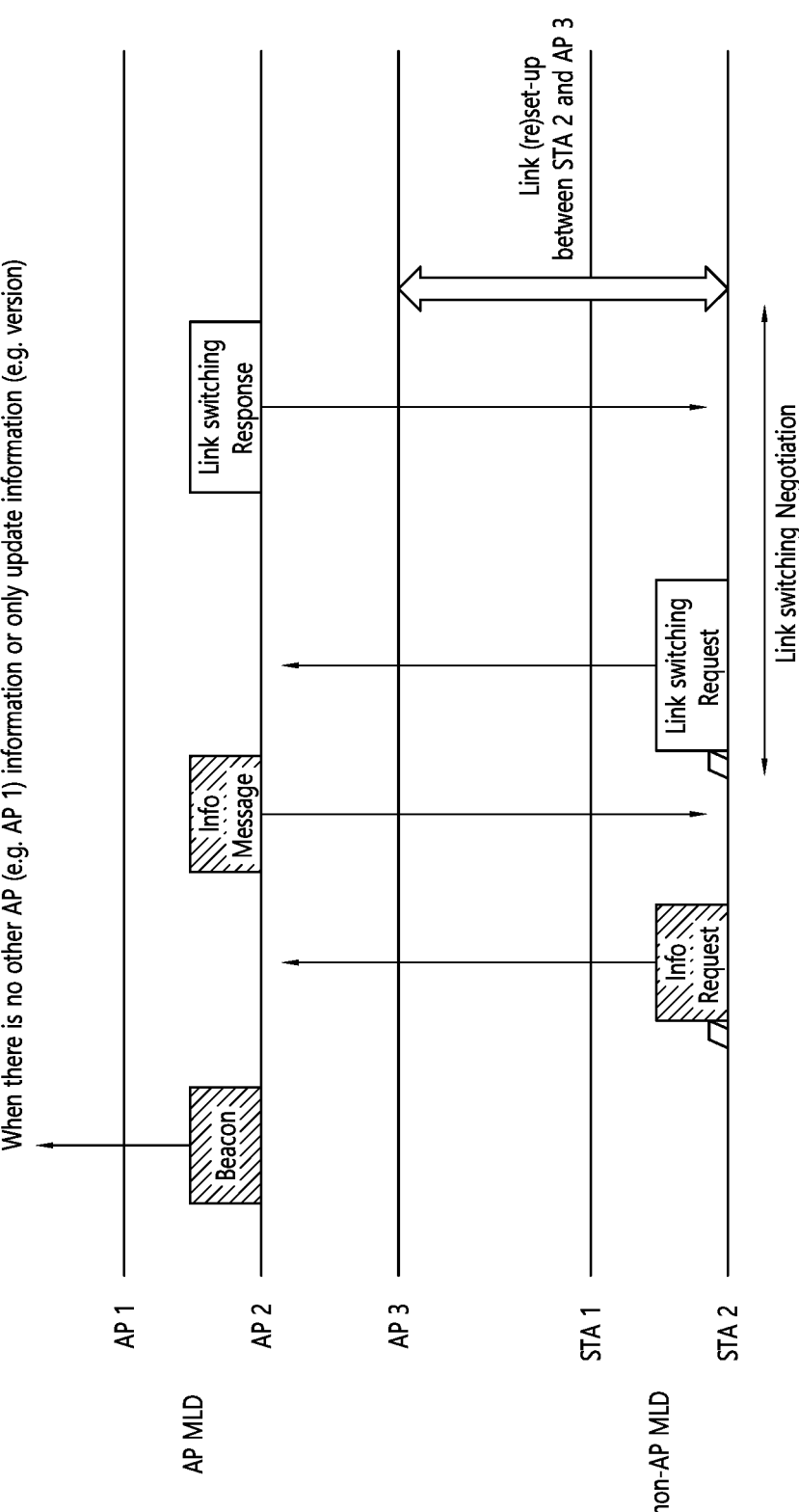
FIG. 20 illustrates an operation of a non-AP MLD for requesting information on other APs.

A specific example of the above embodiment may be described through FIG. 20.

FIG. 20 illustrates an operation of a non-AP MLD for requesting information on other APs.

Referring to FIG. 20, an AP MLD (or AP 1 to AP 3) may transmit only information about whether other APs (i.e., links) information is updated to the STA through a beacon frame. Accordingly, STA 2 may transmit an Info request message (or Info request frame) to AP 2. STA 2 may receive an Info response message (or Info message) based on the Info request message. STA 2 may receive/obtain information about the other AP based on the Info response message.

For example, if Beacon does not include other AP information (e.g., BSS load information, etc.) of AP MLD, or information about whether AP 2 has updated other AP information (e.g., version/update version) can only be transmitted.

STA 2 may need information about AP 1 (or information about AP 1). STA 2 may request necessary information through AP 2. STA 2 may obtain information of AP 1 through a response message to the request. STA 2 can use the information of AP 1 to reselect an appropriate link for link switching. For example, frames for link switching can be set in various ways.

Additionally, the above-described solicited method may be used for the STA to acquire information of APs possessed by the AP MLD even before multi-link setup. In the multi-link setup process of non-AP MLD and AP MLD, if the number of APs in the AP MLD is greater than the number of STAs in the non-AP MLD, STAs of the non-AP MLD must decide which AP of the AP MLD to establish a link with. In this case, the STA of the non-AP MLD may request link-specific information (e.g., BSS load information of APs possessed by the AP MLD, etc.) to the AP of the AP MLD to know the status of each link before multi-link setup. For example, the STA may use a probe request as a request message. As another example, a new frame for a request message may be defined. The STA may transmit the request message by including an indicator for requesting a specific element in the request message (e.g., Request element, Extended Request element, PV1 Probe Response Option element, etc.) and an indicator for indicating specific link information (e.g., Link ID, etc.).

For example, an STA of a non-AP MLD may transmit a request message including instructions for requesting current BSS load information for all APs in the AP MLD to be connected. Upon receiving the request message, the AP may transmit necessary information (BSS load information of all APs of the AP MLD to which the AP is connected) in a response message based on the instructions of the STA to the STA. At this time, the STA checking the BSS load information for each AP may select a link to be connected in order of the BSS (i.e., AP) having the smallest BSS load.

The STA may indicate the selected link during multi-link setup. In other words, information on a selected link may be transmitted to the AP during multi-link setup.

In this way, the STA may use the above-described solicited method as a method for acquiring information for each AP of the AP MLD in order to select a link to be connected before multi-link setup.

Hereinafter, a new element/field including information for an STA of a non-AP MLD to select an appropriate link may be proposed.

For example, "ratio per Link" (element/field) may be suggested. "STA ratio per Link" may include information about the ratio of the number of STAs connected to each link. Specific details of "STA ratio per Link" An example can be described through FIG. 21.

Figure 21:
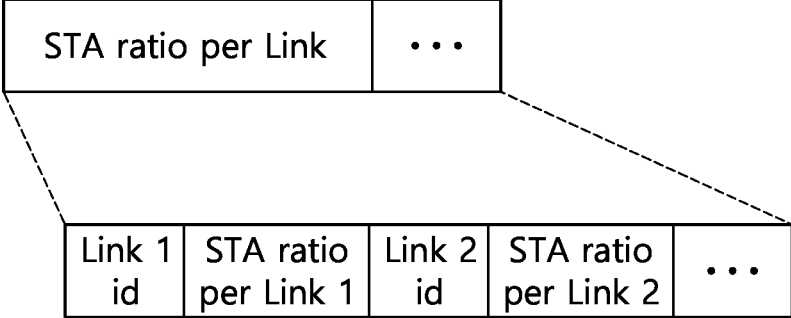
FIG. 21 shows a specific example of STA ratio per Link.

FIG. 21 shows a specific example of STA ratio per Link.

Referring to FIG. 21, STA ratio per Link (element/field) may include information about the number or ratio of STAs connected to each link in the entire AP MLD.

For example, if a total of 50 STAs are connected to an AP MLD with 3 Links, 10 STAs can be connected to Link 1 and 20 STAs can be connected to Link 2. The AP MLD may transmit information about a value or ratio (%) of information about an STA connected to each Link to a non-AP MLD through STA ratio per Link (element/field).

For example, when information about an STA connected to each Link is expressed as a value, Link 1 may be expressed/set as 10 and Link 2 as 20. Accordingly, the value of STA ratio per link 1 may be set to 10. In addition, the value of STA ratio per link 2 may be set to 20.

As another example, when information on STAs connected to each Link is expressed as a ratio, Link 1 may be expressed/set as 20 (10/50)% and Link 2 as 40 (20/50)%. Accordingly, the value of STA ratio per link 1 may be set to 20. In addition, the value of STA ratio per link 2 may be set to 40.

The above example is illustrative, and information on STAs connected to each link can be set in various ways. In addition to the above examples, information on STAs connected to each link may be set as a relative value.

Based on the information about the STAs connected to each link described above, the STA can check/acquire the number and ratio of STAs connected to each link, and can use this as information for link selection.

According to one embodiment, various information/element/fields may be included in the information response message in addition to the above-described "ratio per Link" (element/field). For example, the following information/element/field may be included in the information response message can be included in BSS load information for each AP STR Capability information between Links TXOP information for each link NAV information for each link Recommended Link information (i.e. "recommend Link" element)

Link-specific STA ratio information (i.e., "STA ratio per Link" element)

Etc.

In addition to the information/element/field described above, various information required for link selection may be included in the information response message and transmitted.

Upon receiving information such as the above example, the STA may select an AP to be changed or reconnected to based on the received information, and then transmit a request message for requesting link reconnection. Upon receiving the request message, the AP MLD may transmit a response message of "Accept" when accepting the request. When the AP MLD rejects the request, it may transmit a response message of "Decline".

If the request is accepted, the AP can perform frame exchange through the link with the reselected AP after sending the response message. Conversely, in case of rejection, the STA can use the existing linked Link as it is.

2) Unsolicited Method

Unlike the solicited method in which the non-AP MLD directly requests additional information, according to the unsolicited method, a beacon frame or a separate frame (e.g., a field of the QoS data frame (11ax standard A-Control field), management frame, FILS discovery frame, unsolicited probe response frame, PS-Poll frame or Null frame, etc.), the AP MLD may transmit additional information to the non-AP MLD. For another example, a new frame may be defined as a frame for transmitting additional information to a non-AP MLD.

For example, if the beacon period is rather long, essential information required for link switching in the non-AP MLD may be insufficient or may not be the latest information. Accordingly, the AP may transmit a frame including link capability information of the AP MLD to the non-AP MLD. After that, the non-AP STA may obtain the latest information on the capability of each link of the AP MLD. The frame may be transmitted periodically or aperiodically.

For example, when the frame is transmitted periodically, the AP may transmit the frame to share the latest information of the AP at regular time intervals. At this time, the time interval should be shorter than the beacon period transmitted by the AP. In addition, when a FILS discovery frame is used as the frame, the frame may be transmitted every 20 us. As another example, a period agreed between the AP and the STA through capability negotiation may be used. For example, the transmission period may be indicated through the "periodic" field and the "interval" field/subfield value of the IOM capability element.

As another example, when the frame is transmitted aperiodically, the AP may transmit the frame whenever an update event occurs in information (capability, BSS parameter, operation element) of the AP. As a specific example, whenever the link capability of the AP of the AP MLD is changed, changed information may be transmitted to the connected STA. In this case, the STA may maintain up-to-date information on link capability.

According to the above-described example, since the non-AP STA does not transmit a request message for acquiring a separate link capability, there is an effect of relatively less frame exchange overhead than the solicited method. In addition, since the STA can receive the updated information whenever the main information is updated, there is an effect that the STA can use the received information usefully.

An example of specific AP MLD and non-AP MLD operations according to the unsolicited method can be described with reference to FIG. 22.

Figure 22:
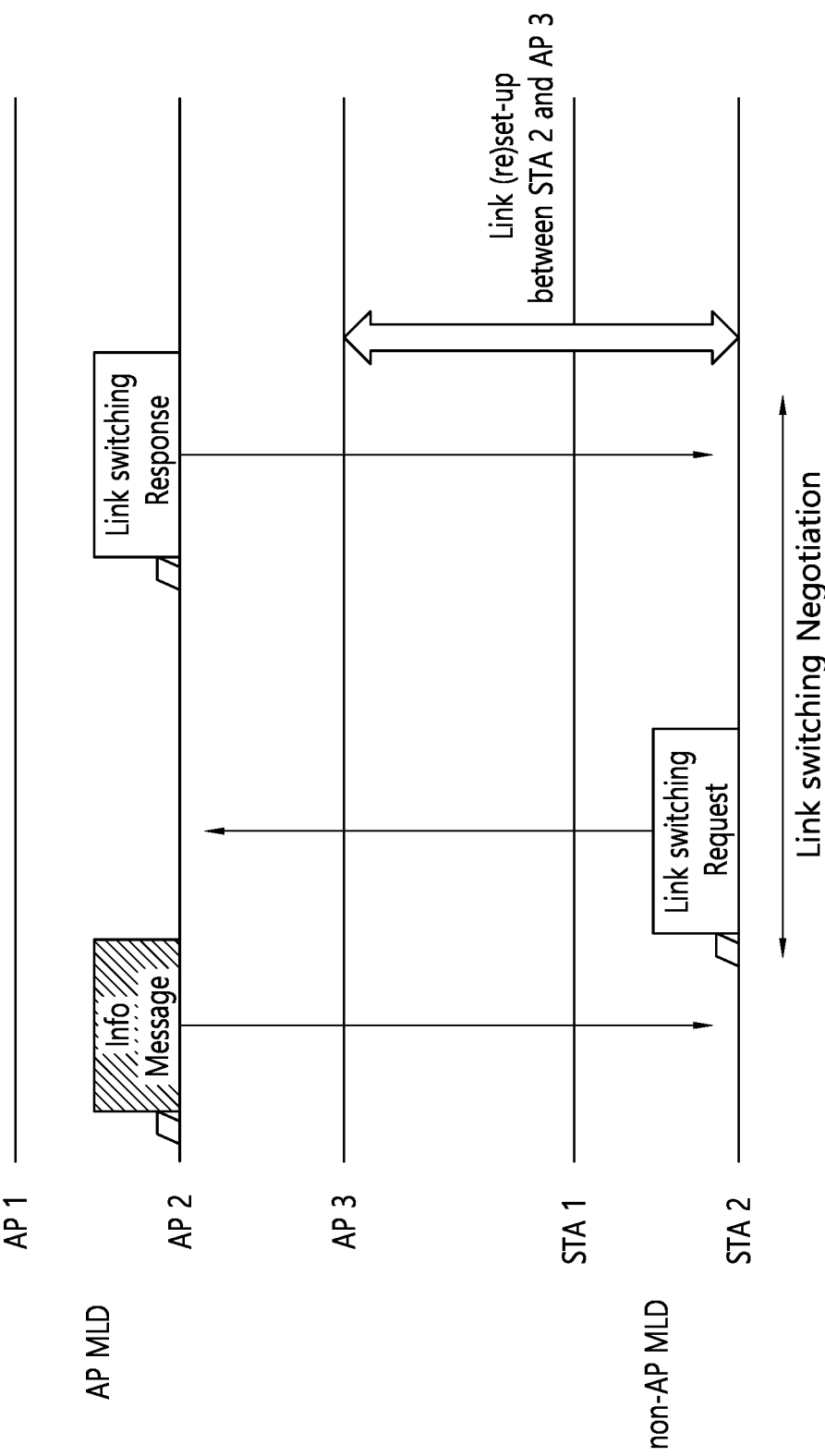
FIG. 22 illustrates operations of an AP MLD and a non-AP MLD for link change or reconnection.

FIG. 22 illustrates operations of an AP MLD and a non-AP MLD for link change or reconnection.

Referring to FIG. 22, the AP MLD may transmit essential information necessary for link reselection in a separate frame (e.g., PS-Poll frame or Null frame) without a separate request message from the non-AP MLD to the non-AP.

According to an embodiment, unlike FIG. 22, the AP MLD transmits information about link capability to the non-AP MLD without a separate request message of the non-AP MLD, and the fields of the DL frame (e.g. QoS data frame) transmitted by the AP MLD. It may also be transmitted to the STA through. Operations of the AP MLD and non-AP MLD according to the above embodiment may be described with reference to FIG. 23.

Figure 23:
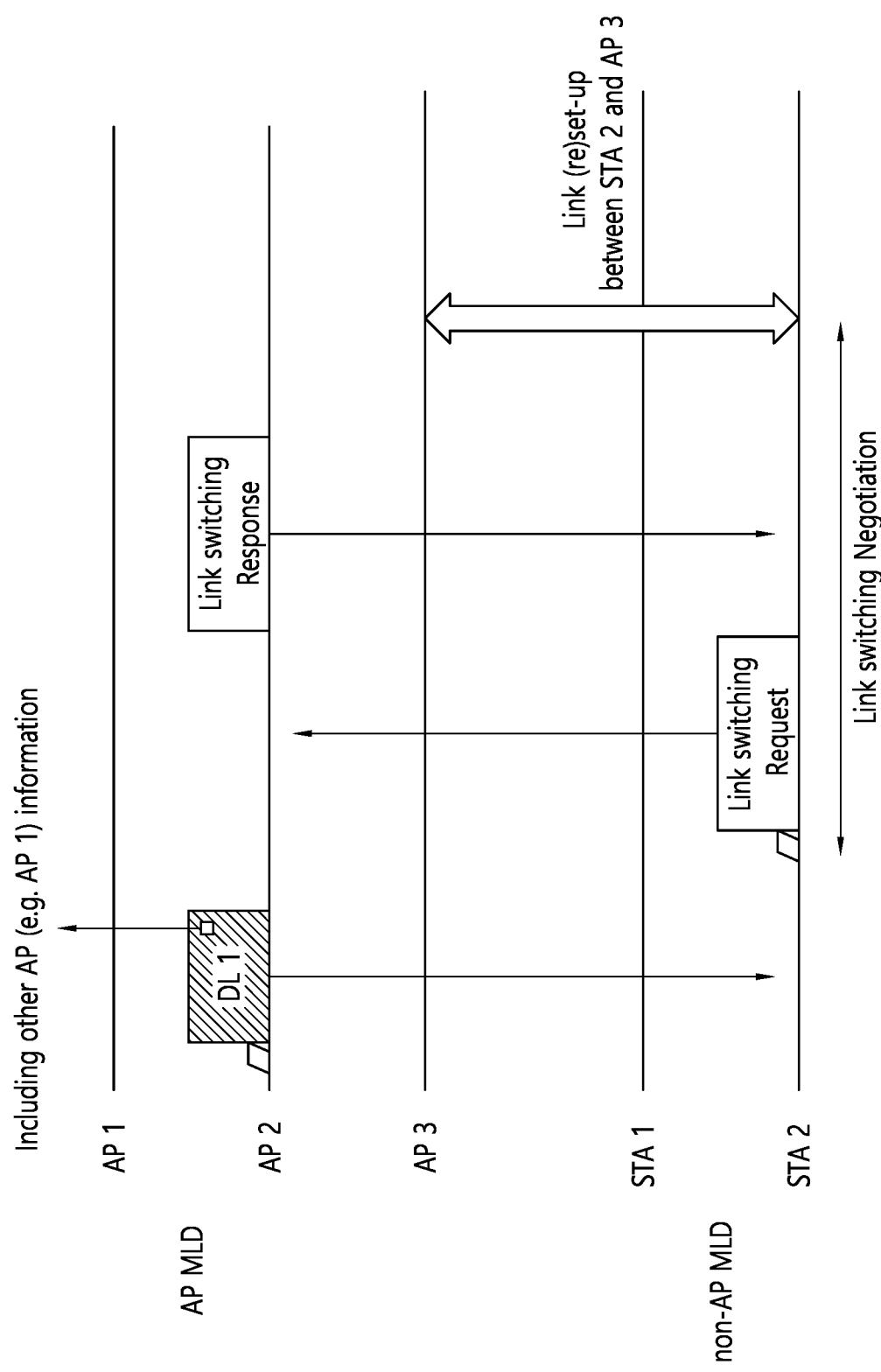
FIG. 23 illustrates operations of an AP MLD and a non-AP MLD for link change or reconnection.

FIG. 23 illustrates operations of an AP MLD and a non-AP MLD for link change or reconnection.

Referring to FIG. 23, AP 2 may transmit information on another AP (or information about the other AP) to STA 2 based on a DL frame (i.e., DL 1). In other words, the DL frame may include information about other APs. For example, information about other APs may be included in an A-Control field of the 802.11ax standard. According to the above embodiment, since an existing DL frame is used without a separate message, frame overhead can be reduced. If the critical information of the other AP is changed and real-time information is required, the update information may be transmitted through a separate message as in the embodiment of FIG. 23.

For example, Critical information of an AP may include the following A to Q.

A. Inclusion of a Channel Switch Announcement element

B. Inclusion of an Extended Channel Switch Announcement element

C. Modification of the EDCA parameters element

D. Inclusion of a Quiet element

E. Modification of the DSSS Parameter Set

F. Modification of the CF Parameter Set element

G. Modification of the HT Operation element

H. Inclusion of a Wide Bandwidth Channel Switch element

I. Inclusion of a Channel Switch Wrapper element

J. Inclusion of an Operating Mode Notification element

K. Inclusion of a Quiet Channel element

L. Modification of the VHT Operation element

M. Modification of the HE Operation element

N. Insertion of a Broadcast TWT element

O. Inclusion of the BSS Color Change Announcement element

P. Modification of the MU EDCA Parameter Set element

Q. Modification of the Spatial Reuse Parameter Set element

Therefore, the non-AP MLD can acquire the latest Link capability information regardless of the Beacon frame period. Based on the received information, the non-AP MLD may select an appropriate Link during Link Switching. Based on the received information, the STA may request link change or reconnection to the AP MLD by reselecting an appropriate link. The request message may include AP information and Link information to be reconnected. In addition, the AP MLD receiving this message may transmit a response message of "Accept" when accepting the request, and may transmit a response message of "Decline" when rejecting the request.

If the request is accepted, the AP can perform Link (re)setup through frame exchange with the Link of the reselected AP after sending the response message. Conversely, in case of rejection, the STA can use the existing linked Link as it is.

3) General Method

According to the general method, the non-AP MLD can request link change or reconnection without requesting additional information based on the information it currently possesses. The information used at this time may include AP MLD information and non-AP MLD information included in the previously received Beacon or Management frame (e.g., STR capability information for each link, Link state (enable/disable) information, etc.).

Unlike the solicited method, the STA may directly transmit a link change or reconnection request message to the AP MLD without requesting separate information from the AP MLD. The request message may include AP information to be reconnected with and Link information. Upon receiving the request message, the AP MLD may transmit a response message of "Accept" when accepting the request, and a response message of "Decline" when rejecting the request.

If the request is accepted, the AP can perform frame exchange through the link with the reselected AP after sending the response message. Conversely, in case of rejection, the STA can use the existing linked Link as it is.

Examples of specific AP MLD and non-AP MLD operations according to the general method may be described with reference to FIG. 24.

Figure 24:
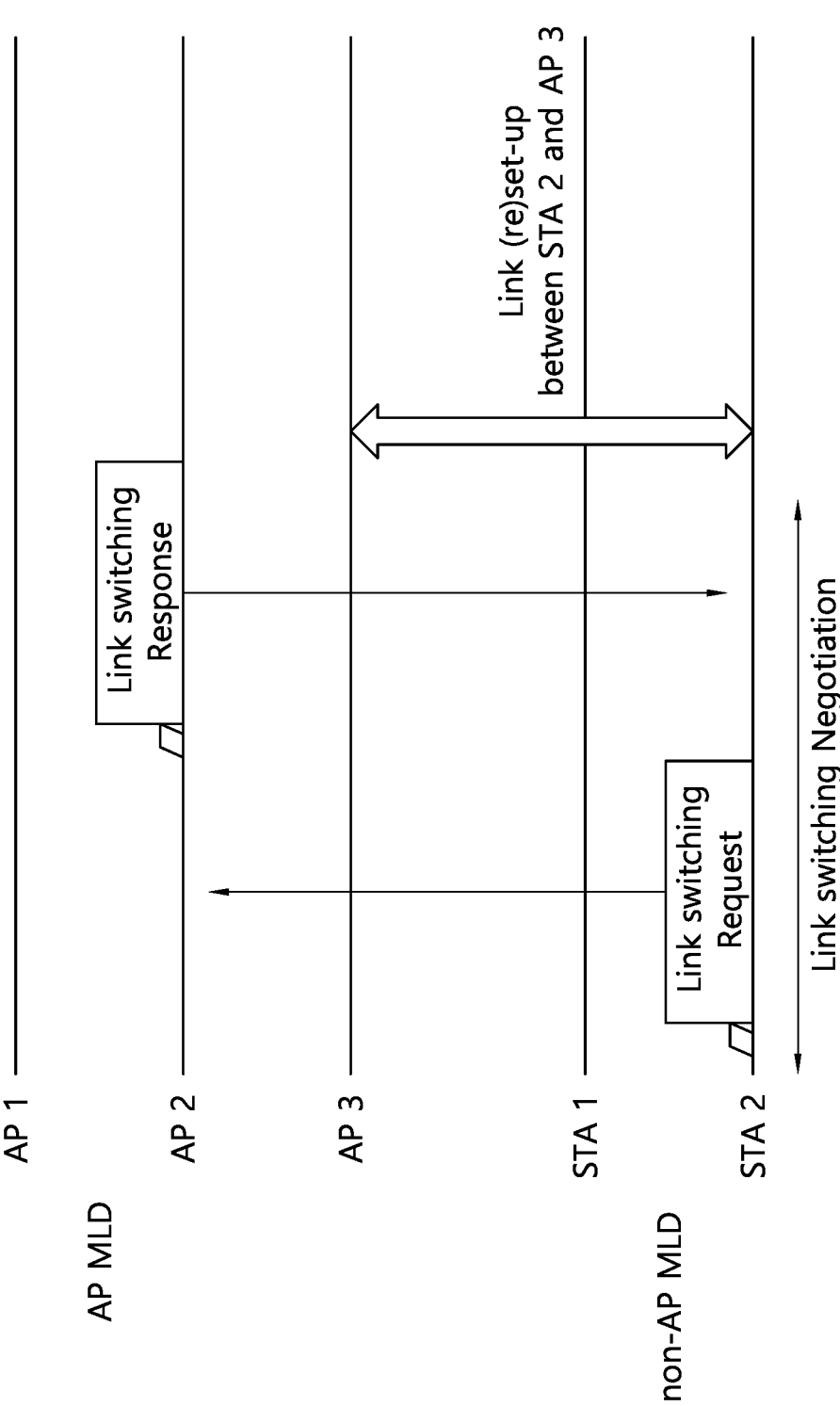
FIG. 24 illustrates operations of an AP MLD and a non-AP MLD for link change or reconnection.

FIG. 24 illustrates operations of an AP MLD and a non-AP MLD for link change or reconnection.

Referring to FIG. 24, STA 2 may want to directly change Link for reasons of QoS guarantee. If STA 2 has previously received information from AP MLD (for example, information received through Beacon frame or Management frame) or has already determined the Link it wants to reconnect to, STA 2 may request link change or reconnection without a separate information request.

STA 2 may transmit STA information (e.g. STA ID, etc.) and Link information to be changed (e.g. Link ID or AP BSS information, etc.) in the Link switching request frame. Upon receiving this, the AP MLD may transmit a Link switching response frame of "acknowledgment" to STA 3 through the existing Link 2 when accepting the change. Thereafter, STA 2 of the non-AP MLD may reconnect to AP 3 after performing a Link (re) setup process.

Signaling to Indicate Link Change and Reconnection Method

In order to indicate the methods proposed above, a mutual agreement process may be required through negotiation between the AP MLD and the non-AP MLD. To this end, in the following specification, a signaling method for enabling methods to be proposed may be proposed.

First, a new element may be proposed to indicate the method proposed above. Hereinafter, an embodiment of signaling for indicating a link change and reconnection method is described, but the above embodiment can also be applied to an embodiment of signaling for indicating an anchored link change and reconnection method.

The signaling process for indicating the link change and reconnection method can be performed after multi-link setup or multi-link setup. In addition, new elements proposed below can be used in a signaling process for indicating a link change and reconnection method. For example, the elements may be included in a (re)association frame of a conventional standard or a new frame.

IOM (Information Obtain Method) Capability Element

The IOM Capability Element may include information on whether a method for acquiring additional information for multi-link is enabled. For example, in a process in which an AP MLD and a non-AP MLD exchange messages for operation agreement in a multi-link setup process (e.g., capability negotiation process), an IOM capability value may exist in an element of a message. The existence of an IOM capability value in an element of the message may mean that the IOM capability is supported.

According to an embodiment, when the AP MLD supports the IOM capability, the AP may internally share information of the other AP and have information of the other AP. An MLD in which other AP information is not shared cannot support the IOM capability.

According to an embodiment, when the value of the IOM capability element is set to a first value (e.g., 1), the IOM capability element may mean activating the IOM and operating with the indicated function. Conversely, when the value of the IOM capability element is set to a second value (e.g., 0), the IOM capability element may mean inactivating the IOM.

According to one embodiment, the IOM capability element may include various fields/elements to indicate various operations. For example, the IOM capability element may include various fields/elements described below. However, the field/element added to the IOM capability element may be set differently depending on the case where the AP MLD requests the link change and the case where the non-AP MLD requests the link change. In addition, at least some of the fields/elements added to the IOM capability element may be omitted. For example, among fields/elements added to the IOM capability element, a field/element including information that does not need to be indicated may be omitted.

Hereinafter, examples of various fields/elements defined/configured to obtain additional information on multi-links can be described. Various fields/elements described below may be configured independently, or two or more fields/elements may be combined and transmitted through various frames. For example, various fields/elements described below may be included in other elements to perform defining operations. For another example, various fields/elements described below may be added to other elements as individual elements or independent fields and used.

Method Type (or Method) Field/Element

The method type field/element (hereinafter, Method field/element) may include information about an operation method of the IOM. In other words, the Method field/element may indicate an operating method of the IOM. For example, when the Non-AP MLD activates the IOM method to obtain information from the AP, non-AP MLD can select and indicate the method to be used among the methods proposed above (e.g., Solicited method, Unsolicited method, General method).

For example, a Solicited method may be indicated/used based on the first value (e.g., 0) of the Method field/element. Based on the value of the method field/element being the second value (e.g., 1), the unsolicited method may be indicated/used. Based on the value of the method field/element being the third value (e.g., 2), the general method may be indicated/used. Based on the value of the Method field/element being the fourth value (e.g., 3), both the Solicited method and the Unsolicited method may be indicated/used.

As another example, 1 bit may be used as a method field/element. In this case, based on the value of the method field/element being the first value (eg: 0) (eg: 0), the Solicited method may be indicated/used. Based on the value of the method field/element being the second value (e.g., 1), the unsolicited method may be indicated/used.

As another example, 2 bits may be used as a method field/element. In this case, single use or overlapping use for each method may be indicated.

Link Range Field/Element

When requesting information from the AP MLD, the non-AP MLD may indicate the range of the requested link through a link range field/element. The link range field/element may include information about whether the STA wants to request information on all links within the AP MLD or information on some links within the AP MLD.

For example, when the value of the link range field/element is a first value (e.g., 0), the link range field/element may mean that information on all links within the AP MLD is requested. When the value of the link range field/element is a second value (e.g., 1), the link range field/element may mean that information on some links within the AP MLD is requested.

At this time, if the value of the link range field/element is the first value (e.g., 0), since it is a request for all links in the AP MLD, a separate link indication (e.g. "Link condition" field) information is not required. Conversely, when the value of the link range field/element is the second value (e.g., 1), link indicator information is required because information is requested for some links within the AP MLD. For example, this field can be included and used in the multi-link element defined in 802.11be. The currently defined multi-link element is shown in FIG. 25.

Figure 25:
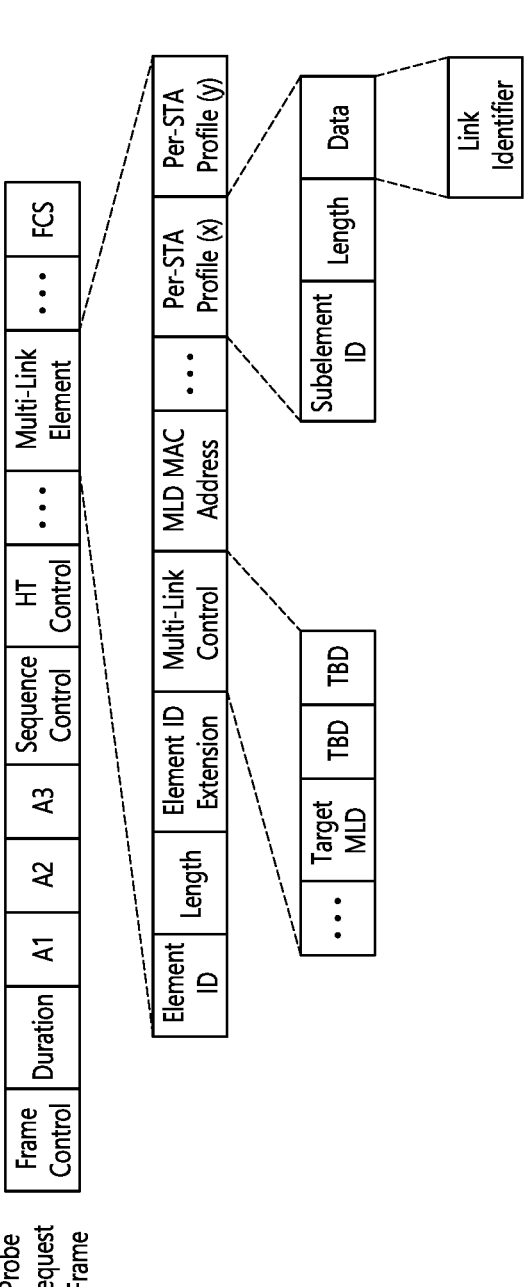
FIG. 25 shows an example of a multi-link element added in a probe request.

FIG. 25 shows an example of a multi-link element added in a probe request.

As shown in FIG. 25, when a non-AP MLD transmits a request message to request AP MLD information, a "Range" field can be added and used in the Multi-link Element. An example of this is shown in FIG. 26.

Figure 26:
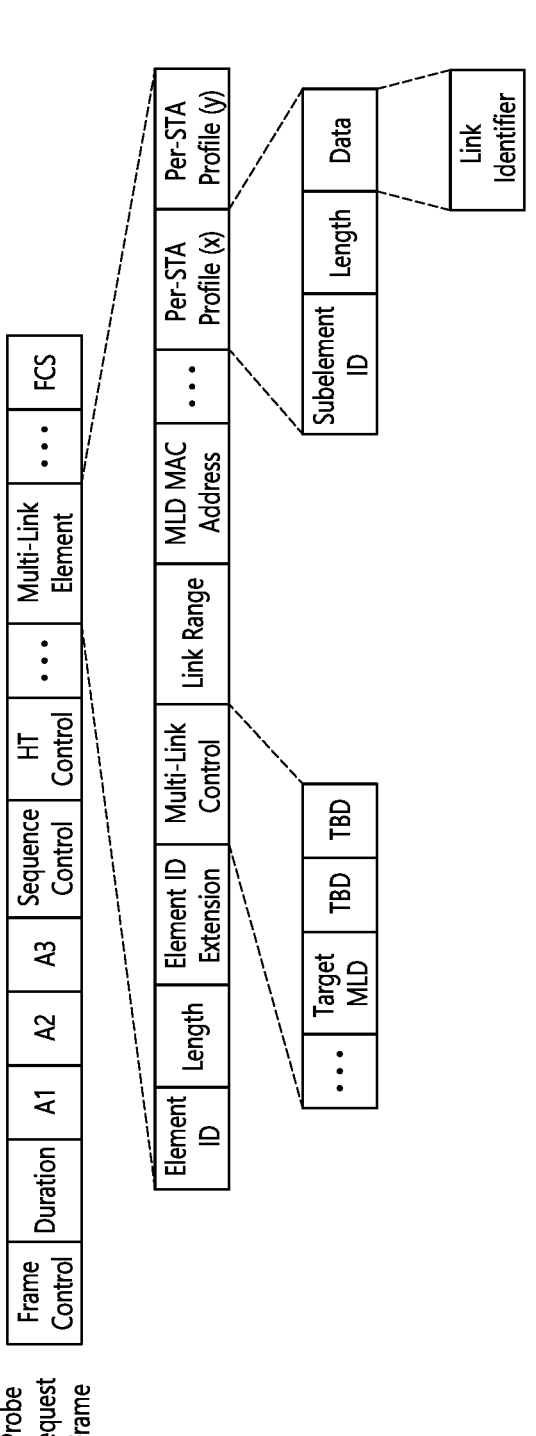
FIG. 26 shows an example of using a Link Range field in a multi-link element.

FIG. 26 shows an example of using a Link Range field in a multi-link element.

As shown in FIG. 26, the Link Range may be used together with the MLD MAC address field to indicate whether information of all links within the MLD is requested or information of some links is requested. At this time, if the field value is 0, it means requesting information of all links, so additional link indicator information is not needed, so the "Per-STA Profile (x)" sub-element can be omitted.

In addition, this field may be used by being added to another element without being included in the multi-link element defined by 802.11be. An example of this is shown in FIG. 27.

Figure 27:
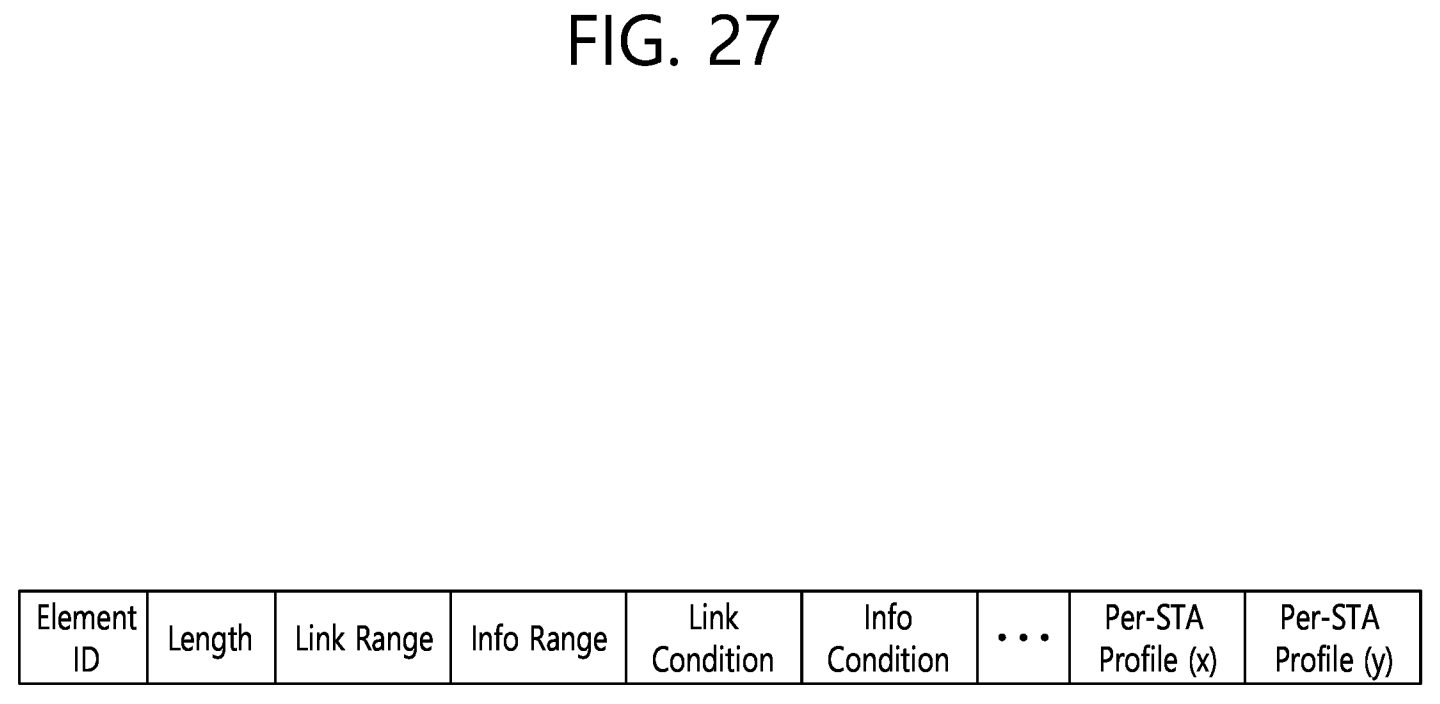

FIG. 27 shows an example of a newly proposed field to indicate link change and reconnection.

As shown in FIG. 27, several fields proposed in this specification may be used together to indicate the range and conditions of information requested by the STA to the AP MLD in an integrated form as shown in FIG. 27. Alternatively, the STA may independently include each proposed field in the request message when requesting information from the AP MLD, and may be omitted if unnecessary.

Info Range Field/Element

The Info range field may be used to indicate a range of information when a non-AP MLD requests information.

For example, when the value of the Info range field is a first value (e.g., 0), the Info range field may indicate that only partial information possessed by the AP is provided. When the value of the Info range field is the second value (e.g., 1), the Info range field may represent that all information (or all information) possessed by the AP is provided.

According to one embodiment, an information range field may be defined to indicate a request for all or part of information (elements) possessed by the AP, but the STA may request more detailed information through an additional subfield. For example, a subfield for indicating a range of information to be provided (e.g., all information or partial information) may be included in the information range field. For example, a subfield for indicating the range of information to be provided may be defined/set as an all/partial subfield.

According to an embodiment, a subfield for indicating whether to receive all information or whether to receive only changed information among all the information may be newly proposed. In other words, the newly proposed subfield may indicate whether to receive all information or only changed information among all the information.

For example, a subfield indicating whether to receive all information or only changed information among all the information may be defined/set as an only updated subfield.

If the STA wants to receive only changed information, the only updated subfield value may be set to 1. In other words, if the STA wants to receive only changed information, the STA may set the only updated subfield value to 1. For example, when the only updated subfield value is set to 1, according to the solicited method, when the STA requests information, the AP (or AP MLD) can transmit only changed information (i.e., updated information) among the requested information. For another example, when the only updated subfield value is set to 1, according to the unsolicited method, the AP may notify only information changed within the information range set by the STA.

According to the above example, in order to receive only changed information, an only updated subfield in an information range field has been proposed, but is not limited thereto. In order to receive only changed information, a separate field or element may be defined/configured.

According to the above-described embodiment, the range of information that can be requested by the STA may be set to updated information or all information. In this case, an STA that does not want a lot of frame overhead may request to receive only changed information. Therefore, there is an effect of reducing overhead.

Link Condition Field/Element

The Link condition field can be used to indicate the specific link being requested. In other words, the link condition field may include information about a specific link requested. The link condition field may be used when the STA wants to receive only specific link information from the AP.

The link condition field may be displayed as a link identifier (e.g. Link ID, BSS ID). In other words, the link condition field may include information about a link identifier (e.g. Link ID, BSS ID). In other words, a link identifier may be used to specify a link for obtaining information.

For example, if an STA connected to Link 1 wants to request only information about Link 2 and Link 3 from the AP, the STA may request information on Link 2 and Link 3 from the AP by indicating link 2 and link 3 in the link condition field. For example, when the value of the aforementioned info range field is 1, all information corresponding to link 2 and link 3 can be transmitted. For another example, when the value of the aforementioned info range field is 0, partial information designated by the STA may be transmitted on link 2 and link 3. According to an embodiment, partial information designated by the STA may be determined through the following Info condition field.

According to an embodiment, when there is no value of the link condition field or is 0, the AP may determine that there is no link condition. Accordingly, the AP may provide/transmit information about all links to the STA.

Info Condition Field/Element

The Info condition field can be used to indicate the specific type of information being requested. In other words, the Info condition field may be used when the STA wants to receive only specific information from the AP.

For example, the information condition field can be used only when the info range field is set to 0. For another example, the information condition field may be used by the STA to indicate specific information even when there is no info range field.

For example, within the information condition field, information that can be designated by the STA (e.g. BSS Load, STR Capability, etc.) may be displayed as a Bitmap. For example, the type of information provided by the AP and the instruction method or order within the bit may be set in various ways.

According to an embodiment, the information condition field may be used together with the above-described link condition field. According to an embodiment, the information condition field may transmit request information of various conditions to the STA (or AP) based on a combination of various fields/elements.

In this regard, the element of the existing standard may be reused to request that the STA indicate specific information. For example, Request IE or Extended Request IE can be used. Element information for this is as shown in FIGS. 28 and 29.

FIG. 28 shows an example of the Request IE format.

Figure 29:
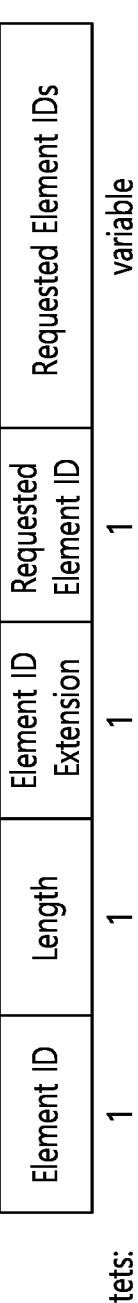
FIG. 29 shows an example of the Extended Request IE format.

FIG. 29 shows an example of the Extended Request IE format.

The elements of FIGS. 28 and 29 may be used to request specific information in a probe request frame or an information request frame. When the STA indicates a list of information desired to be responded to as requested element IDs, the AP transmits the corresponding information by including it in a probe response frame or information response frame. Therefore, in this specification, this element can be reused as an indicator for requesting specific information, and can also be used to request desired information of a desired link together with a link identifier (e.g. Link identifier). For example, if the element ID for BSS load information is indicated in the request element mentioned in FIGS. 28 and 29 and information on AP 2 is indicated as a link identifier, only BSS load information of AP 2 can be requested. This element ID information may be used to indicate specific information of a specific AP in various combinations together with Link ID information. If, in the present disclosure, a new frame for information request is defined instead of an existing frame, the Request element and Extended Request element of FIGS. 28 and 29 can be reused.

In addition, the existing standard provides a PV1 Probe Response Option element to request specific information, and this element can be reused as a method of indicating specific information. This is a method used by the STA to request optional information with the desired information as a probe request. For frequently used information, each information is indicated with the probe response option bitmap as shown below. However, in the case of 11be, since multi-link information must be provided in consideration of MLD, the STA can request specific information of a specific link in various combinations using a link identifier along with a bitmap indicator as shown below. However, in this case, since there may be optional information (e.g. STR capability) newly defined along with multi-link in 802.11be, if this PV1 Probe response option element is reused, information newly defined in 11be or additionally required to be acquired A bitmap for these must be newly defined or additionally defined.

Figure 30:
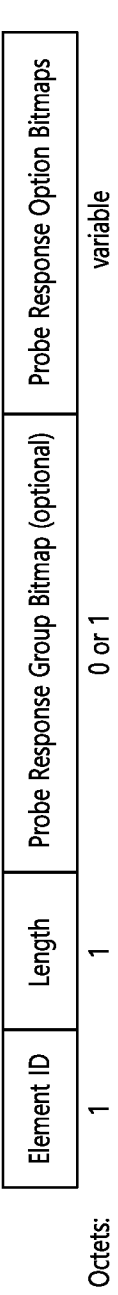
FIG. 30 shows an example of a PV1 Probe Response Option element format.

FIG. 30 shows an example of a PV1 Probe Response Option element format.

Transmission Periodic Field/Element

If the STA wants to receive information in an unsolicited manner, it may indicate whether to periodically or aperiodically receive a message including the information through a transmission periodic field.

For example, when the STA wants to receive the information non-periodically, the AP may notify the updated information whenever information of other APs is updated.

For another example, when the STA instructs to periodically receive the information, the STA may receive a message including the information at a set periodic interval.

According to an embodiment, a transmission periodic field may be set to 1 bit. When the value of the transmission periodic field is set to 1, the STA may receive/obtain information through a periodic method of periodically receiving messages. When the value of the transmission periodic field is set to 0, the STA may receive/obtain information through a method of receiving messages aperiodically.

Transmission Interval (Interval) Field/Element

According to an embodiment, when the STA wants to periodically receive information from other APs, the STA may directly set the period. The STA may transmit information about a period for receiving other AP information based on the transmission interval field. However, the period must be set shorter than the beacon transmission period. For example, when the FILS Discovery frame is used, the period must be set to 20 us.

As described above, it may be defined as a separate field within an element indicating a transmission period, or may be defined as a subfield within a transmission periodic field.

According to an embodiment, a field/element defined/configured to obtain additional information about multi-link is not limited to the above-described field/element, and various fields/elements may be further set.

Therefore, the MLD (AP MLD or non-AP MLD) can indicate the IOM capability through negotiation between the AP MLD and the non-AP MLD using at least one of the elements/fields described above in the multi-link setup process. In addition, the MLD can update the contents of the agreement between the MLDs through a separate message exchange after the multi-link setup is completed.

According to an embodiment, when an IOM capability is activated, an AP MLD and a non-AP MLD may operate based on an embodiment for link change and reconnection.

Hereinafter, examples of operations of the AP MLD and the non-AP MLD when the IOM capability is activated may be described. For example, the non-AP MLD may request additional information for multi-link by transmitting the above-described fields/elements to the AP MLD. The non-AP MLD may transmit an IOM Capability element including the aforementioned fields/elements to the AP MLD. The inclusion of the above-mentioned fields/elements in the IOM Capability element is exemplary, and may be transmitted as an independent field/element.

For example, in the multi-link setup process, the non-AP MLD may transmit an IOM Capability element including "Method field=0" and "Info range field=1" to the AP MLD and agree with the AP MLD. In this case, after multi-link setup, the non-AP MLD operates in a solicited method, and when requesting information, information for multi-link including all information included in beacon (for example, information about other APs) may be requested. there is. Therefore, the AP MLD only receives a request message from the STA. Link information can be provided/sent as a response message. Upon receiving the request message, the AP MLD may transmit a response message including information on all links within the AP MLD to the STA. Information on all links in the AP MLD may include all information included in beacons.

For another example, the non-AP MLD may transmit an IOM Capability element including "Method field=1", "Info range field=0", "Link range=Link id 2", "Info condition field=(value of BSS load displayed through bitmap), and may agree on this with the AP MLD. In this case, after multi-link setup, the non-AP MLD may operate in an unsolicited method. Accordingly, the AP may transmit the BSS load information of Link 2 to the STA through a separate message without a separate request message.

For another example, the non-AP MLD may transmit an IOM Capability element including "Method field=0", "Info range field=0", "only updated field or subfield=1", "Info condition field=(BSS Load displayed through bitmap value)" and may agree on this with the AP MLD. In this case, after multi-link setup, the non-AP MLD can operate in the Solicited method. Accordingly, when the STA requests information, the AP MLD (or AP) may include only updated (changed) information among BSS load information of all APs of the connected AP MLD in a response message and transmit it to the STA.

In this specification, several options for a new element are proposed in order for the STA to request partial information (i.e., target information) of other APs of the connected AP MLD.

FIG. 31 shows an example of an MLD Request element.

Referring to FIG. 31, "The number of Link ID" is a field for indicating the number of requested APs (i.e., links) when the STA requests information on a specific AP.

"Link ID" is a field including indicator information of APs requested by the STA.

For example, when the STA transmits the probe request frame including the above MLD request element, the AP receiving the request message responds with a probe response including all information of the APs indicated in the corresponding element. If the STA wants to request partial information, not all information of the indicated APs, transmits the Probe request frame along with the MLD request element and the Request element or Extended request element defined in the existing standard. Upon receiving this, the AP responds with a Probe response including only the information indicated by the Request element or Extended request element.

Figure 32:
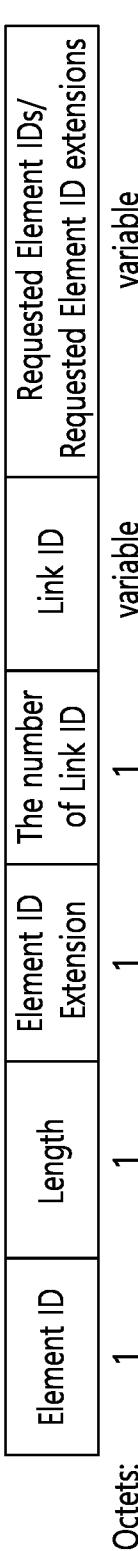
FIG. 32 shows another example of an MLD Request element.

Additionally, a new element in FIG. 32 is also proposed.

FIG. 32 shows another example of an MLD Request element.

Referring to FIG. 32, "The number of Link ID" is a field for indicating the number of requested APs (i.e., links) when the STA requests information on a specific AP.

"Link ID" is a field including indicator information of APs requested by the STA.

Figure 33:
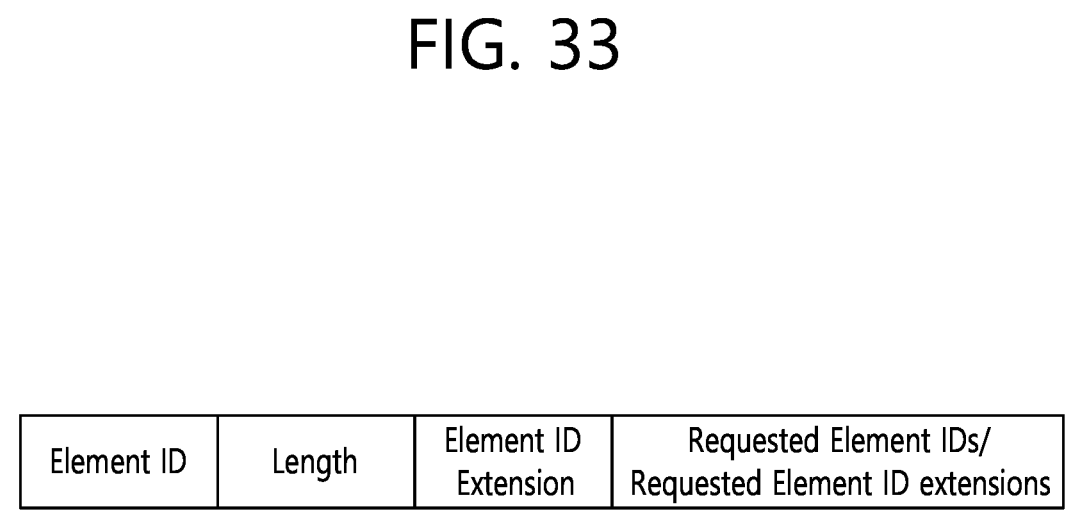

"Requested Element IDs/Requested Element ID extensions" is a field including Element ID information of requested information when the STA requests specific information (i.e., element). This field includes only element ID information when the Element ID corresponds to 0-254, and when the value is 255 or more, it is recognized as an Extended Element ID and Requested Element ID extensions information must be included together. At this time, information corresponding to "Requested Element IDs/Requested Element ID extensions" may be defined in the form of a field, but may be defined as a new element as shown in FIG. 33 and included in the form of a sub-element in the MLD Request element. A new element for this can be defined as shown in FIG. 33. This element has the advantage of reducing overhead as it can be indicated as one element without distinguishing between existing request elements or extended request elements.

FIG. 33 shows an example of defining a new element based on an MLD Request element.

For example, when the STA transmits the probe request frame including the above MLD request element, the AP receiving the request message responds with a probe response including information on APs indicated in the corresponding element.

Referring to FIG. 33, the AP recognizes the information requested by the STA as all or partial information depending on whether the "Requested Element IDs/Requested Element ID extensions" field is omitted in the corresponding element. Element ID value information defined in the standard is defined in the 802.11 standard. In addition, the definitions of "Requested Element IDs" and "Element ID extensions" mentioned in this specification are the same as those of the existing standards.

For example, when an STA requests information on an AP or other APs from an AP, the probe request frame includes the above MLD request element and transmits it. Upon receiving this, the AP responds with a probe response frame by including only the information requested through the "Requested Element IDs/Requested Element ID extensions" field among the information of the APs requested through the "Link ID" field.

At this time, if the STA transmits by omitting the "Requested Element IDs/Requested Element ID extensions" field, upon receiving this, the AP responds with a probe response frame including all information of the requested APs through the "Link ID" field.

The format proposed above can request only the same information for all links.

However, the STA may request different information for each link depending on the case. This specification proposes several options for this.

First, as shown in FIG. 34, a format for requesting different information for each link is additionally proposed.

FIG. 34 shows another example of an MLD Request element.

As shown in FIG. 34, the STA is a method of including and indicating existing Request element or/and Extended Request element information for each link within the MLE Request element in order to request different information for each link. At this time, a new field or element "The number of Elements" is defined to inform the length of the requested element. This information means the number of elements requested for Link ID (x).

Upon receiving this, the AP checks the information requested differently for each link based on the MLD Request element and responds by including it in the Response frame.

In this case, the embodiment is shown in FIG. 35 when a field proposed by the present disclosure is used instead of the existing Request element or/and Extended Request element. Each field or element can be omitted as needed.

FIG. 35 shows another example of an MLD Request element.

Second, when the STA requests information, a format for distinguishing common information, which is equally requested for all links, and link specific information, which is requested differently for each link, is proposed as shown in FIG. 36.

FIG. 36 shows another example of an MLD Request element.

As shown in FIG. 36, when the Request element or/and Extended Request element is included in front of the number of Link ID field, it means elements of common information commonly requested for links indicated later, Information listed after The number of Elements together with Link ID (x) behind the number of Link ID field means element information requested for each link. Each field or element can be omitted as needed.

In this case, an embodiment is shown in FIG. 37 when a field proposed by the present disclosure is used instead of the existing Request element or/and Extended Request element. Each field or element can be omitted as needed.

FIG. 37 shows another example of an MLD Request element.

As shown in FIG. 37, when the Request element or/and Extended Request element is included in front of the number of Link ID field, it means elements of common information commonly requested for links indicated later, information listed after The number of Elements together with Link ID (x) behind the number of Link ID field means element information requested for each link. Each field or element can be omitted as needed.

Figure 38:
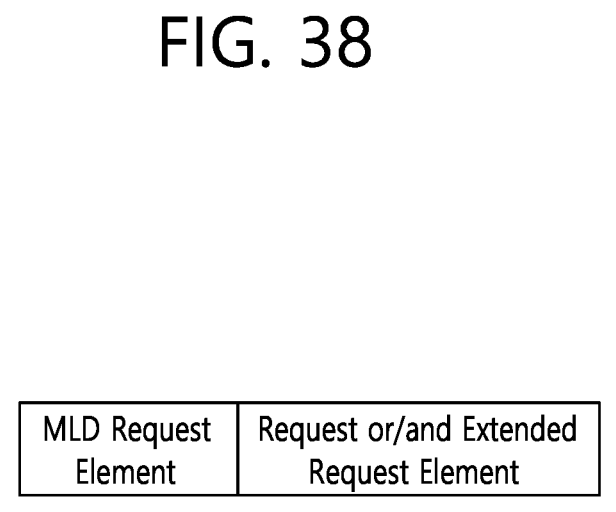

Fourth, Common information, which is equally requested for all links when the STA requests information, is used to indicate as a separate Request element or Extended Request element together with the MLD Request element as shown in FIG. 38.

FIG. 38 shows an example of a field requesting common information.

When the STA requests information on multiple links of the AP MLD through a request frame, a method of indicating commonly requested information through an existing Request or/and Extended Request Element is proposed. In the case of information requested differently for each link, a method of indicating through the MLD Request element is proposed. The AP receiving this request message recognizes the information included in the Request or/and Extended Request Element as information commonly requested for the link indicated in the MLD Request element, and transmits the corresponding element information for all links indicated by the MLD request element in the response message. In addition, when the STA requests different information for each link, the AP includes it in the response message and transmits it based on the information indicated for each link in the MLD Request element.

This specification also proposes a method in which an STA requests partial information of other APs of a connection AP MLD using a multi-link (ML) IE defined in the 802.11be standard.

Figure 39:
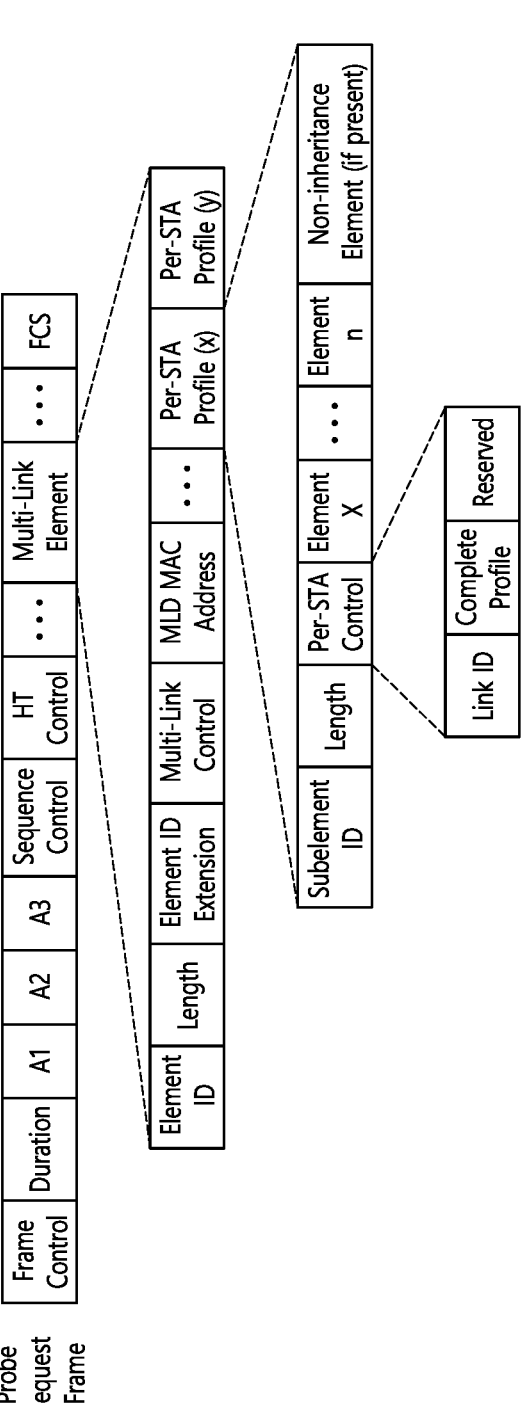
FIG. 39 shows an example of the ML IE format defined in 802.11be.

FIG. 39 shows an example of the ML IE format defined in 802.11be.

In 802.11be, an ML Multi-Link Information Element (IE) is defined as shown in FIG. 39 to define information for each link. Elements or fields can be added later depending on the proposed function. In the Per-STA Profile (x) sub-element, various information about the link can be included. The corresponding sub-element includes the corresponding link ID and the contents of the information range included in the corresponding sub-element through the Per-STA control field, and then lists information (Element) corresponding to the information requested by the STA. At this time, if there is non-inheritance information, information may be included using a non-inheritance element. The Complete Profile in the Per-STA Control sub-element is a field that distinguishes whether the included information is complete information or partial information of the link.

Therefore, by including this ML IE in the request frame (e.g. Probe request frame), the STA can utilize it for requesting partial information from other APs, and various options are proposed for this.

In this specification, the following limiting factors are defined to use ML IE for MLD probing. If the STA uses the ML IE in probe request fame for MLD probing, element information (e.g. Element x, . . . , Element n) provided by the Per-STA Profile (x) can be omitted and transmitted to reduce overhead. (However, when ML IE is used in the association request/response frame used for association, element information must be included.). If the information requested by the STA is complete information of the link, the complete information bit is indicated through the Per-STA Control field, and the subsequent element information list is omitted and transmitted. If not, the Partial information bit is indicated through the Per-STA Control field, and information about the requested element ID is added to the back. However, various options related to the case where the STA requests partial information for a specific element rather than complete information are defined in detail below.

As described above, in the ML IE defined by 802.11be, the included information may be changed depending on whether the corresponding element is included in the Association frame or the Probe frame or whether the corresponding frame is a Request or Response. For example, if the STA uses the ML IE when making a probe request, elements containing various information in the Per-STA Profile (X) may be omitted, but if not, element information must be included. Therefore, this specification proposes a control field for indicating this.

Figure 40:
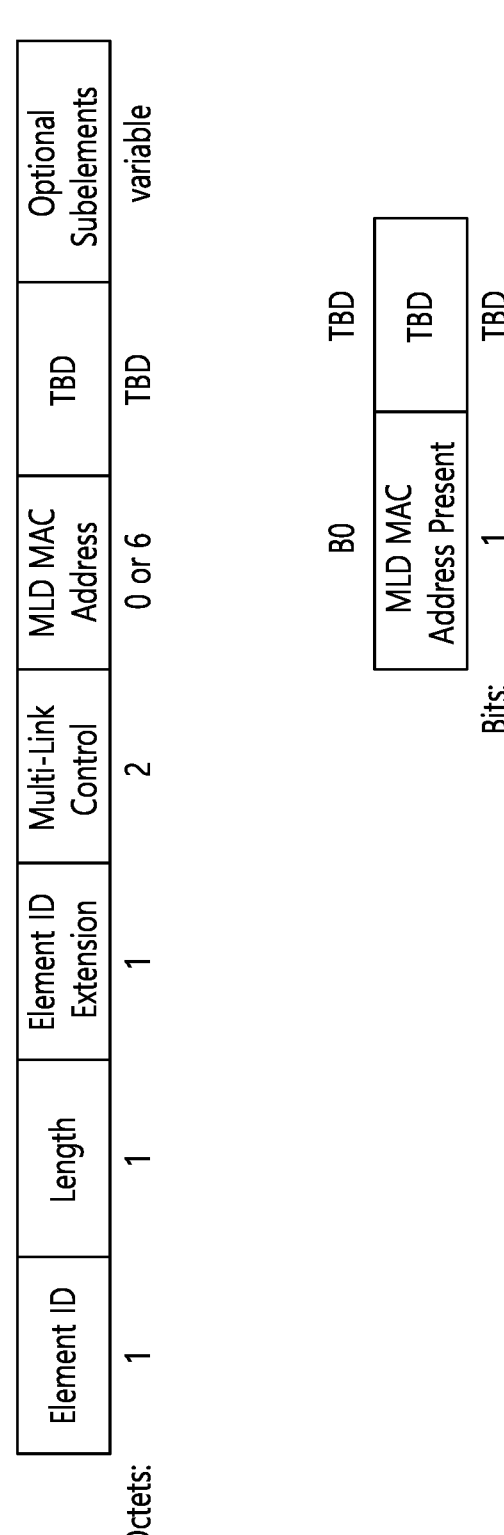
FIG. 40 shows an example of a multi-link element format and a multi-link control field format.

The multi-link element and multi-link control field format defined in the current 802.11be standard are shown in FIG. 40.

FIG. 40 shows an example of a multi-link element format and a multi-link control field format.

At this time, a field for indicating the type of frame including the current multi-link element is added to the multi-link control field element. The proposed field is defined as "Elements per-STA Present". The field name can be redefined as needed. This field indicates the presence or absence of element list information for each STA requested by the current ML IE. If the value is 1, it means that element information behind the Per-STA Control field in the Per-STA Profile (x) field is included, and if it is 0, it means behind the Per-STA Control field in the Per-STA Profile (x) field. This means that element information is omitted. An embodiment for this is shown in FIG. 41.

Figure 41:
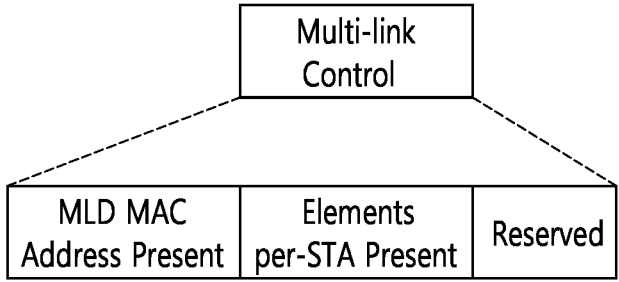
FIG. 41 shows an example of a multi-link control field format.

FIG. 41 shows an example of a multi-link control field format.

In addition, as described above, in the ML IE defined by 802.11be, the included information may change depending on whether the corresponding element is included in the Association frame or the Probe frame or whether the corresponding frame is a Request or Response. Therefore, a field that can indicate this is proposed. The corresponding field is included in the ML IE of the request/response frame and indicates the frame type currently transmitted by the STA. Accordingly, the content or arrangement order of additional elements (elements composed of 0 or variables) may change.

"frame type": An indicator indicating the frame type currently transmitted by the STA. Depending on the value of the corresponding field, the type of frame that currently includes the ML IE is indicated. For example, it can be indicated by classifying into 0: association request, 1: association response, 3: probe request, 4: probe response, and the like. This can be expressed as an integer value or as a bitmap. In addition, if MLD probing configured in 802.11be is distinguished, 5: MLD probe request frame, 6: MLD probe response frame, etc. may be additionally added. In this way, it is an indicator to indicate that the element composition of ML IE is changed according to the frame type. Each frame type may be listed in the form of a subfield in the "frame type" field, and in the case of 1, the indicated frame type may be configured.

At this time, it may be classified into several subfields within "frame type" according to various functions of the transmitted frame. Therefore, in this specification, "request type", which is a subfield that is classified according to the purpose of the frame in "frame type", is defined. The corresponding "request type" subfield may be classified in more detail in the message type classified as "frame type", which can be classified according to the purpose of the currently transmitted frame. For example, if the "frame type" transmits the MLD probe request frame to request all or part information on a specific AP, the "frame type" field is set to the MLD probe request frame (field=5), but the Whether the information is complete or partial, and when requesting partial information, what specific information (e.g. critical update related information, link subset information that is not set up for link re-setup, etc.) is requested as a "request type". If the "frame type" is set as a (re)association request frame for link switching to a specific AP, the "frame type" field is set as a (re)association request frame (for reference, the MLD Probe request frame is currently used in 802.11be). Since all frames except for the same basic type are classified, the (re)association request frame will be classified as basic type. However, the frame type classification may be changed in the future), the purpose of requesting the frame (e.g. TID-link mapping, link switching between MLDs, link switching within the same MLD), this can be indicated in the "request type" subfield. Upon receiving this, the non-AP STA or AP can determine the purpose of the frame transmitted by the STA in more detail through the subfield value transmitted along with the type of the currently received frame, and transmit appropriate information by including it in the response frame.

Various format options and operations for the ML IE regarding the case where the STA requests partial information for a specific element rather than complete information are proposed as follows.

First, it is a method of transmitting including a Request element or/and Extended Request element for indicating information that the STA wants to request from the corresponding AP in the Per-STA Profile (x) in the existing ML IE.

The AP receiving the request message indicating the corresponding information can know the partial information of the link that the STA wants to request through the ML IE information, and transmits the information by including it in the response frame (e.g. Probe response frame). The STA indicates in the Request frame the Link ID it wants to request through the Per-Control field in the Per STA Profile (x) in the ML IE and whether the currently requested information is all (Complete) or partial (Partial), additionally, it is a method of displaying specific information to be requested through Request element or/and Extended Request element. Using the format shown in FIG. 42, the STA may request specific desired information for each link. If the Request element or/and Extended Request element is omitted, it means that all information (i.e., complete information) of the corresponding AP is requested. However, as suggested above, element information listed after the Per-STA Control field may be omitted if necessary.

Figure 42:
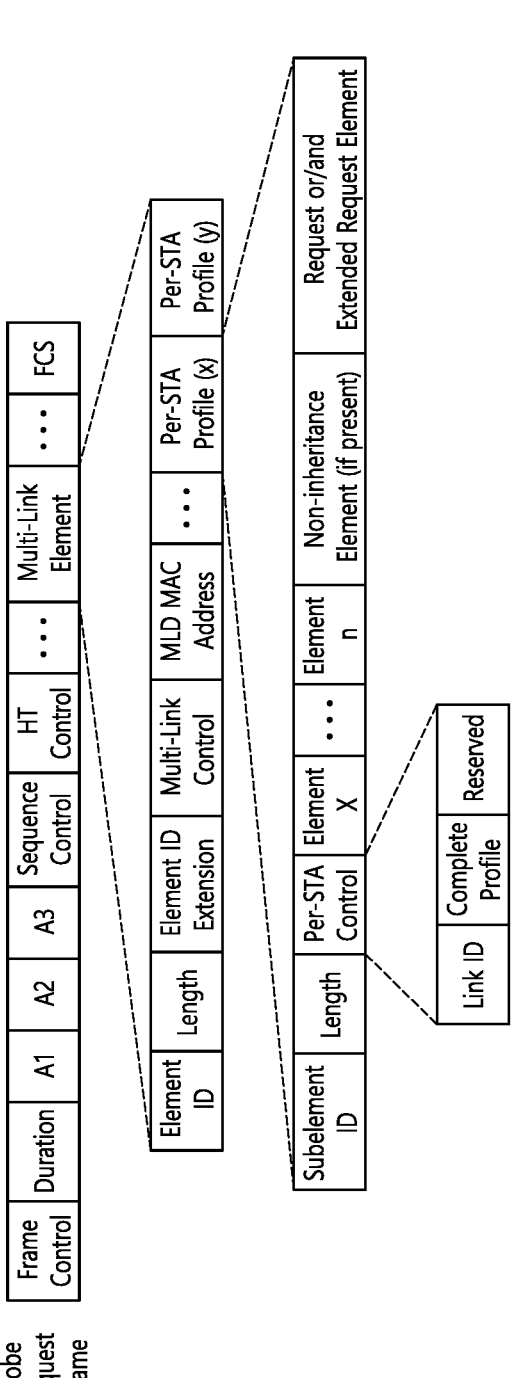
FIG. 42 shows an example of the ML IE format.

FIG. 42 shows an example of the ML IE format.

Second, it is a method of transmitting including Requested Element IDs/Requested Element ID extensions field for indicating information that the STA wants to request from the corresponding AP in the Per-STA Profile (x) in the existing ML IE. The corresponding field is defined in FIG. 43 as a field proposed in this specification.

Figure 43:
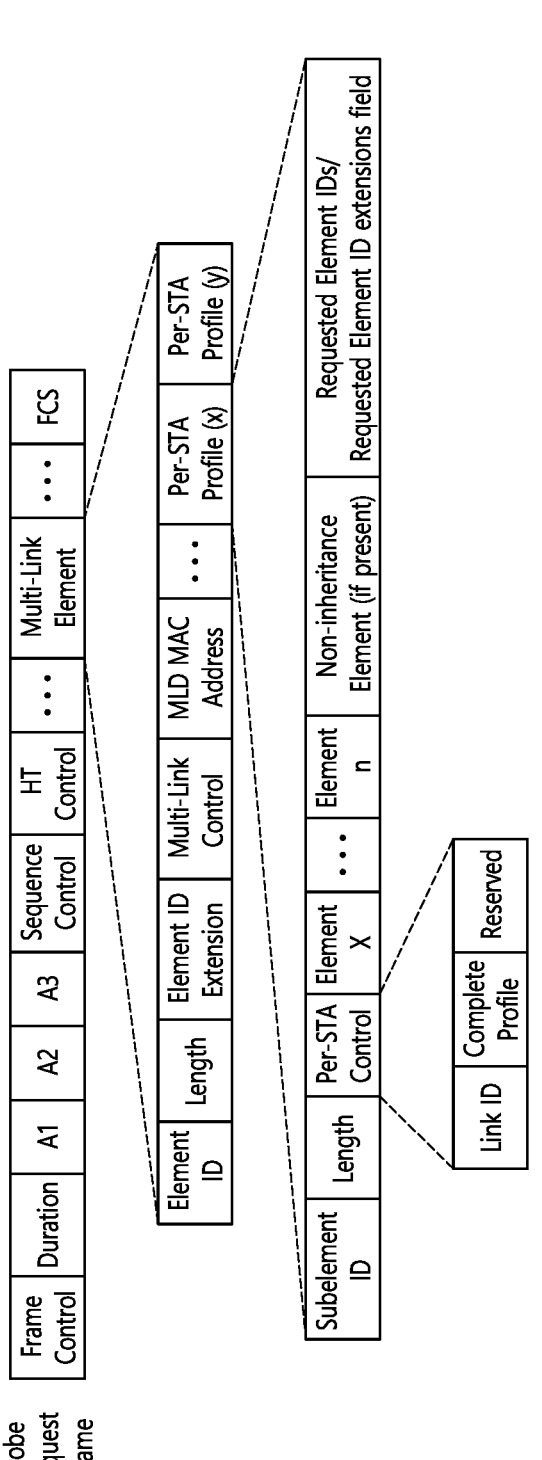
FIG. 43 shows another example of the ML IE format.

FIG. 43 shows another example of the ML IE format.

Upon receiving the information, the AP can know the partial information of the Link that the STA wants to request through the ML IE information, and transmits the information by including it in a response frame (e.g. Probe response frame). The STA indicates in the Request frame the Link ID it wants to request through the Per-STA Control field in the Per STA Profile (x) in the ML IE and whether the currently requested information is Complete or Partial, additionally, it is a method of displaying specific information to be requested through the Requested Element IDs/Requested Element ID extensions field. Omitting the Requested Element IDs/Requested Element ID extensions field means requesting all information (i.e., all elements information) of the corresponding AP. An example of the corresponding format is as follows. However, as suggested above, element information listed after the Per-STA Control field may be omitted if necessary.

The format of FIG. 43 has the advantage of reducing default field overhead (e.g. element ID, length), etc. by transmitting element indication information defined in the 802.11 standard as one piece of information without dividing it into Request element or/and Extended Request element.

Thirdly, by transmitting the Request element or/and Extended Request element to indicate the information that the STA wants to request from each AP, Common info and Link specific info that the STA wants to request in common for all APs are distinguished. This is the format you request. The format is defined in FIG. 44.

Figure 44:
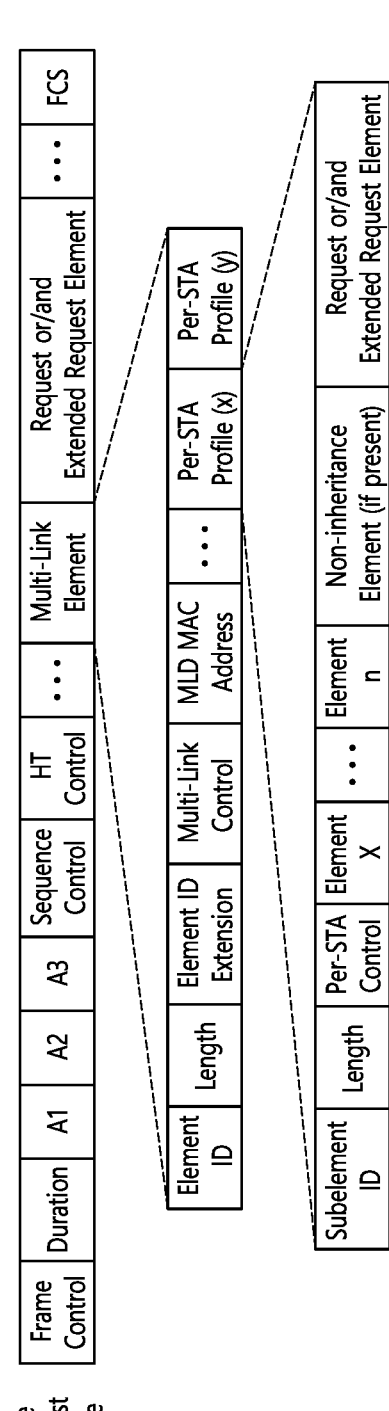
FIG. 44 shows another example of the ML IE format.

FIG. 44 shows another example of the ML IE format.

When the STA requests information of each AP through a request frame (e.g. Probe request frame), the same request may be made for partial information, and other information may be requested for each AP. A format for indicating this is defined and an embodiment is proposed. As shown in FIG. 44, the indicator for indicating the same information that the STA requests for the APs requesting information through the request frame is used as a Request or/and Extended Request Element together with the ML IE in the request frame, an indicator for indicating other information requested by each AP uses Request or/and Extended Element in Per-STA Profile (x). However, as suggested above, element information listed after the Per-STA Control field may be omitted if necessary.

For example, if the STA displays information corresponding to the TIM element (e.g. Element 5=11) as a Request Element in the probe request frame, indicates Per-STA Control of Per-STA Profile (x) in ML IE as Link ID=1, Complete Profile=0 (conversely, if the value is 1, it means all elements information request), displays information (e.g. Element ID=11) corresponding to the BSS load element in the Request Element, indicates Per-STA Control of Per-STA Profile (y) as Link ID=2, Complete Profile=0, and indicates and transmits information corresponding to a non-inheritance element (e.g. Element ID=255, Element ID extension=56) in the Extended Request Element, the AP responds with a Probe Response frame including the following information.

TIM element information for Link 1 and Link 2
BSS load element information for Link 1
Non-inheritance element information for Link 2

The STA can request different information for each link by dividing the requested information into Common or Link specific according to the element hierarchy within the Frame.

In this way, in 802.11be, an inheritance model can be applied to the ML Probe request frame. As described above, when the STA transmits including the (Extended) Request element in the ML probe request, this partial information request is accepted by the peer AP as a common information request for all APs as the inheritance model is applied not only to the peer AP but also to the APs requested through the ML IE (i.e. Probe request variant Multi-Link Element). Therefore, when receiving a probe request frame including an (Extended) Request element outside the ML IE as shown in FIG. 44 from the STA, the AP may respond by including information corresponding to each AP in the ML IE (i.e. basic variant Multi-Link Element) in the Per-STA Profile by interpreting it as a common information request for the peer AP and requested APs (i.e. APs indicated for other AP information request in ML IE), and by confirming the requested information indicated by the (Extended) Request element in the ML Probe response.

Fourth, by transmitting the Request element or/and Extended Request element in the Multi-link Element to indicate the information the STA wants to request from each AP, Common info and This is a format that requests Link specific info by classifying it. The format is defined in FIG. 45.

Figure 45:
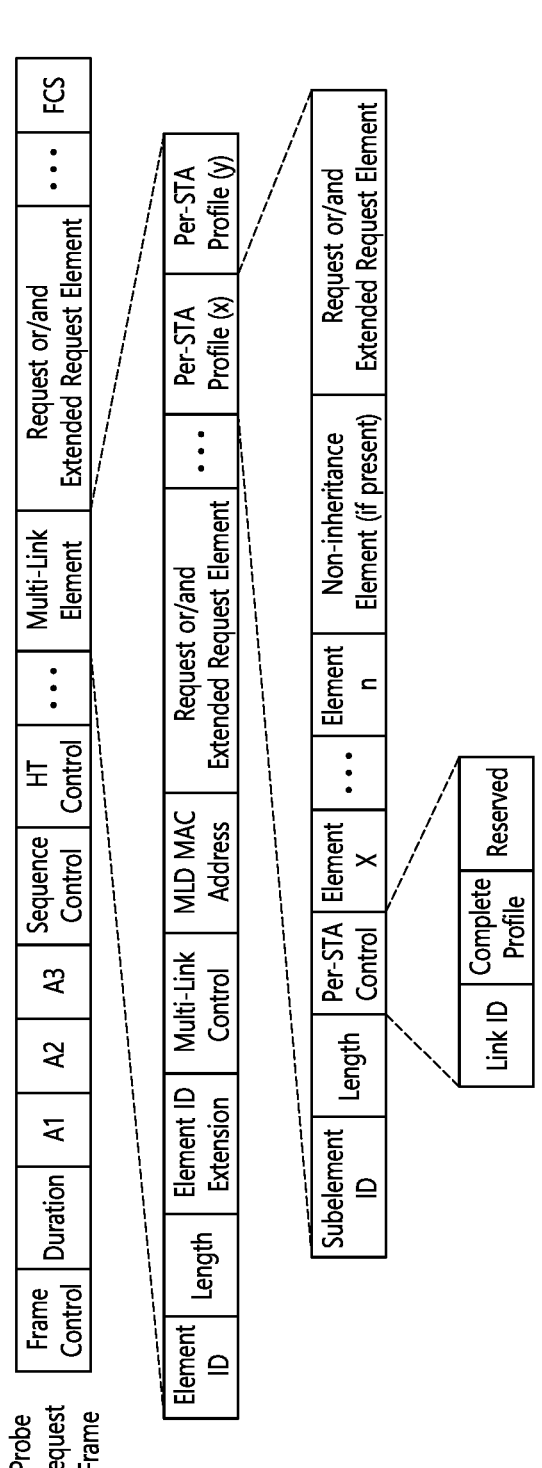
FIG. 45 shows another example of the ML IE format.

FIG. 45 shows another example of the ML IE format.

When the STA requests information of each AP through a request frame (e.g. Probe request frame), the same request may be made for partial information, and other information may be requested for each AP for another part of the information. A format for indicating this is defined and an embodiment is proposed. If the Request or/and Extended Request element is included along with the Multi-link element in the Request frame (e.g. Probe request), this means that the STA requests partial information about the Link (ie associated AP) to which it is connected. If the STA requests information on APs other than its own link among the APs of the connected AP MLD, the indication information for this is included in the ML multi-link element (IE). Therefore, if the Request or/and Extended Request element is included before the Per-STA Profile (x) element within the ML IE as above, through the corresponding element, information commonly requested for other APs of the AP MLD requested by the STA (APs that do not correspond to its own link among APs included in the AP MLD to which the STA is connected) can be indicated. Information commonly requested for other APs is indicated through the Request or/and Extended Request element in ML I.E., and information requested differently for each other AP is displayed behind the Per-STA Control field in Per-STA Profile (x). It can be indicated by adding Request or/and Extended Request element. At this time, if the Per-STA Profile (x) in the ML IE includes an indicator of an AP corresponding to its own link rather than other APs, the STA can also obtain information of the AP corresponding to its own link through the ML IE. In this case, the Request or/and Extended Request element included with the ML IE can be omitted in order to request partial information of the AP corresponding to its own link.

However, as suggested above, element information listed after the Per-STA Control field may be omitted if necessary.

Fifth, the STA may request some complete information or some partial information about the Peer AP (i.e., transmitting link) and Other APs (i.e., Other link) through the MLD probe request. Several cases and embodiments related to this are as follows.

1) When requesting complete information for peer APs and requesting complete information for other APs The EHT non-AP STA can transmit a message requesting all information about peer APs and other APs with one Probe Request frame.

Figure 46:
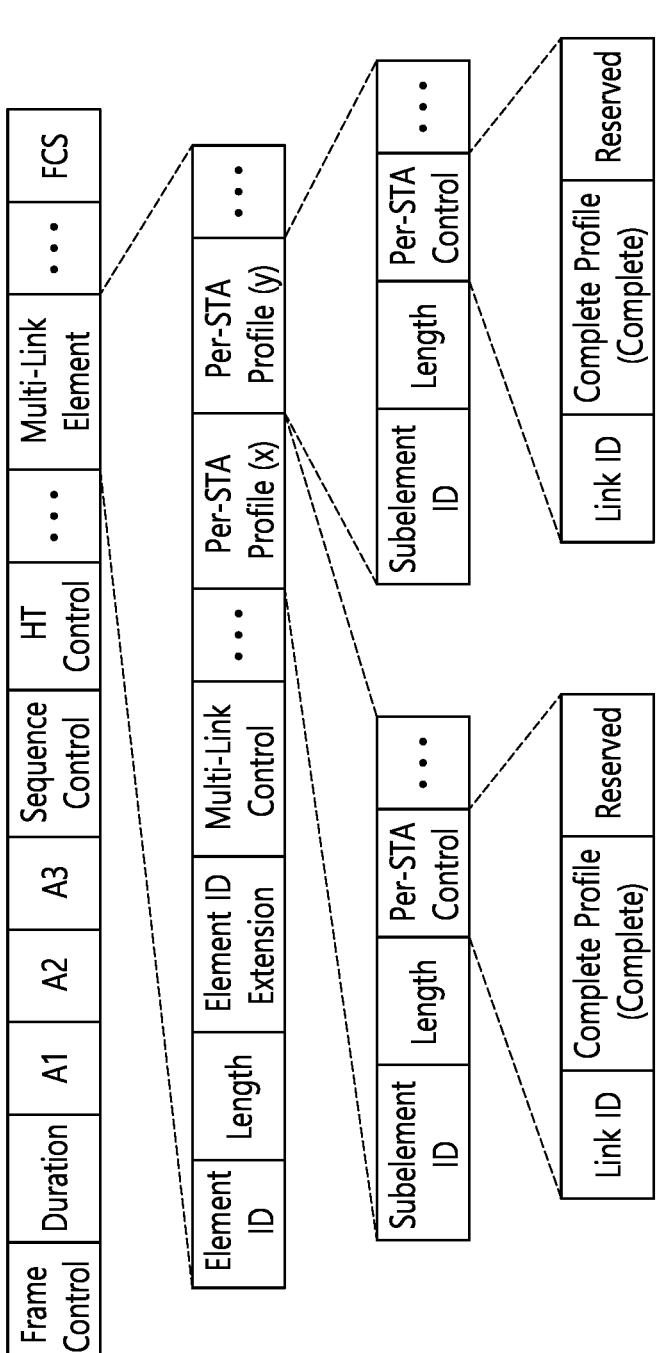
FIG. 46 shows an example of a Probe Request frame including an ML IE format.

FIG. 46 shows an example of a Probe Request frame including an ML IE format.

Referring to FIG. 46, when requesting complete information about a peer AP, the (Extended) Request element is not included in the Core of probe request frame (frame body of the probe request frame), and the Multi-Link Element (i.e., probe request variant By setting the 'Complete profile' subfield in the 'Per-STA Control' field in the Per-STA Profile of the Multi-Link Element) to 1, it indicates a request for all information about other APs.

2) When requesting complete information for peer APs and requesting complete or partial information for other APs 2) When requesting complete information for peer APs and requesting complete or partial information for other APs The EHT non-AP STA can transmit a message requesting all information about the peer AP in one Probe Request frame and requesting all or partial information about other APs indicated through the ML IE.

Figure 47:
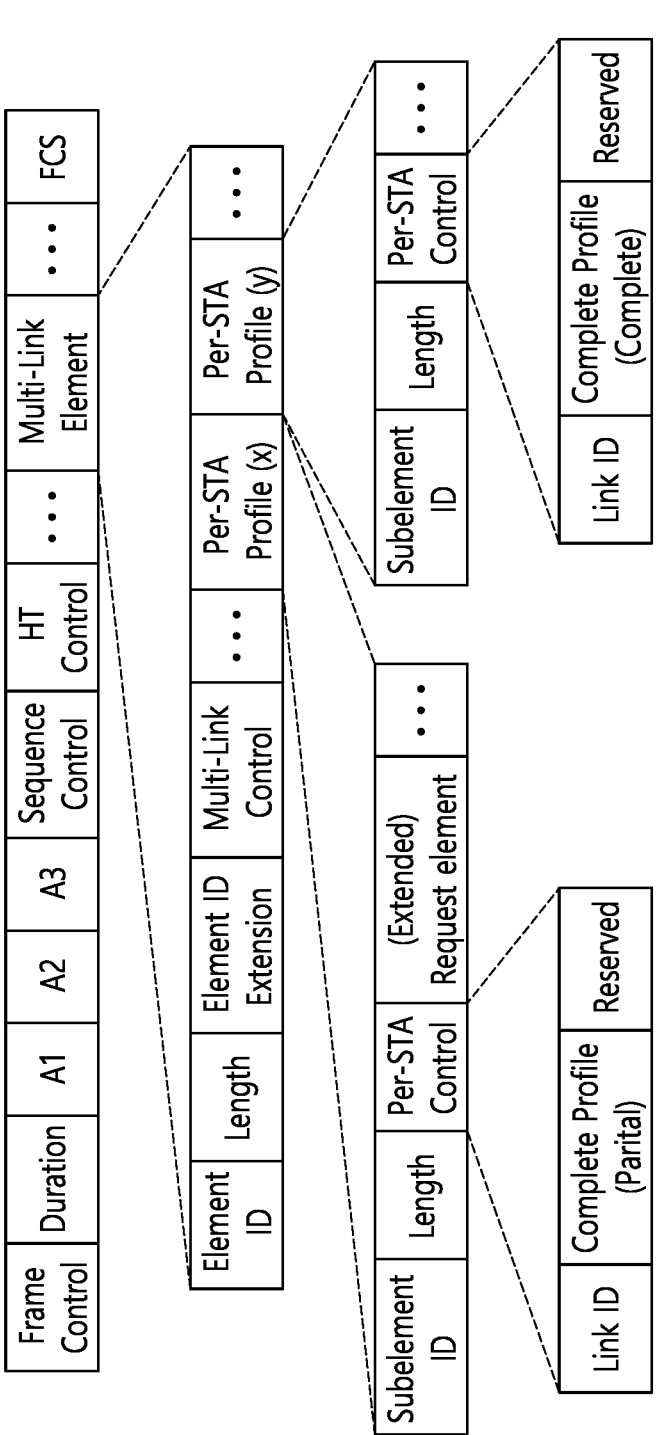
FIG. 47 shows another example of a Probe Request frame including an ML IE format.

FIG. 47 shows another example of a Probe Request frame including an ML IE format.

Referring to FIG. 47, when requesting complete information about a peer AP, when requesting partial information about other APs without including the (Extended) Request element in the Core of probe request frame, The STA includes the (Extended) Request element in the Per-STA Profile of the Multi-Link Element (i.e., the probe request variant Multi-Link Element) and sets the 'Complete profile' subfield in the 'Per-STA Control' field to 0 to Indicates a partial information request to the AP. At this time, if the STA wants to request complete information about another AP, the STA can set the 'Complete profile' subfield in the 'Per-STA Control' field to 1 without the (Extended) Request element in the Per-STA profile. In this way, the entire information request or partial information request for each AP can be made with one Probe Request frame for other APs.

3) When partial information is requested for peer APs and complete or partial information is requested for other Aps The EHT non-AP STA requests partial information from the peer AP in one Probe Request frame and can request all or partial information from other APs indicated through the Multi-Link Element.

Figure 48:
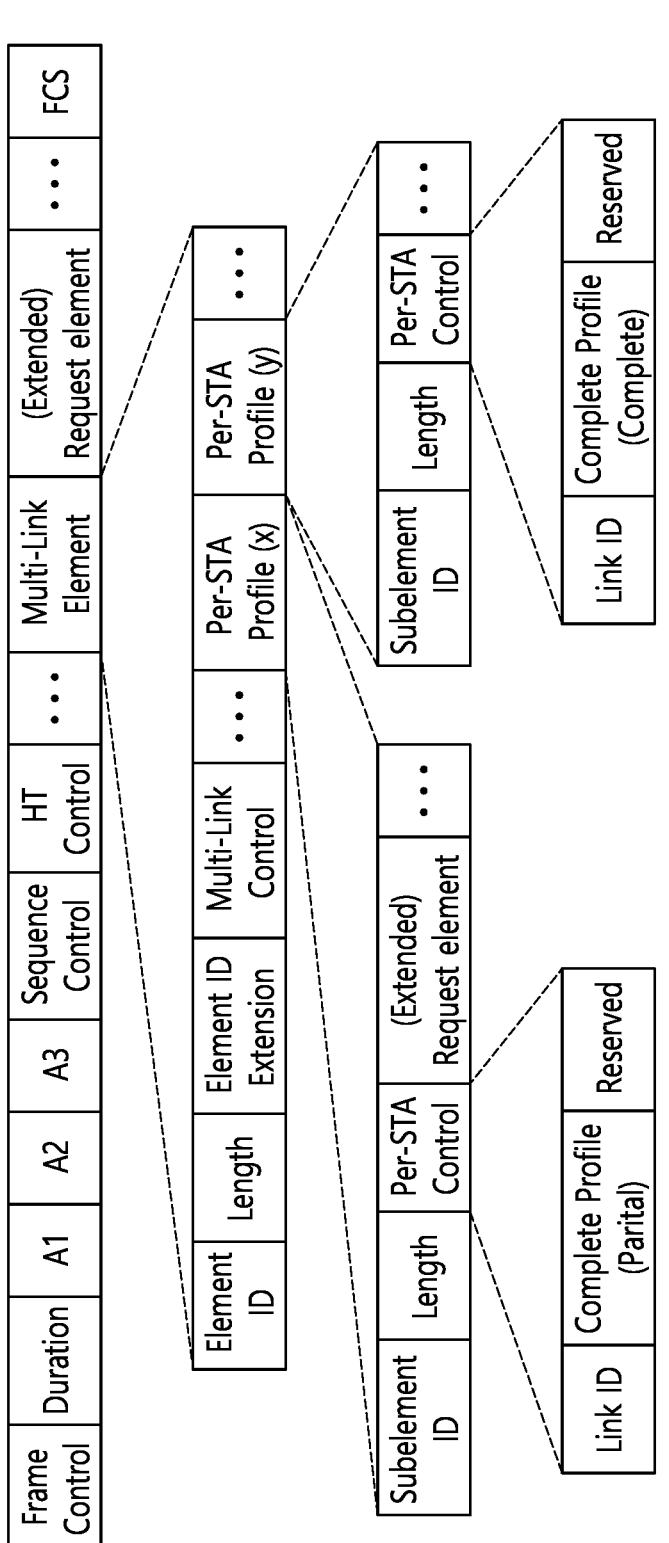
FIG. 48 shows another example of a Probe Request frame including an ML IE format.

FIG. 48 shows another example of a Probe Request frame including an ML IE format.

Referring to FIG. 48, when requesting partial information about a peer AP, an (Extended) Request element is included in the Core of probe request frame, and when requesting complete information about other APs, the STA sets the 'Complete profile' subfield in the 'Per-STA Control' field to 1 without the (Extended) Request element in the Per-STA Profile of the Multi-Link Element (i.e., the probe request variant Multi-Link Element), and the STA A request for complete information about other APs.

At this time, if the STA wants to request partial information for another AP, include the (Extended) Request element in the Per-STA profile and set the 'Complete profile' subfield in the 'Per-STA Control' field to 0. At this time, if the inheritance model is applied to the MLD probe request, if the requested partial information is the same for the peer AP and the AP (x) (i.e., Link) indicated in the Per-STA Profile (x), the (Extended) Request element in Per-STA Profile (x) may be omitted. That is, the (Extended) Request element is included in the Per-STA profile (x) only when it corresponds to the non-inheritance element for the (Extended) Request element included in the Core of probe request frame, otherwise it can be omitted.

Figure 49:
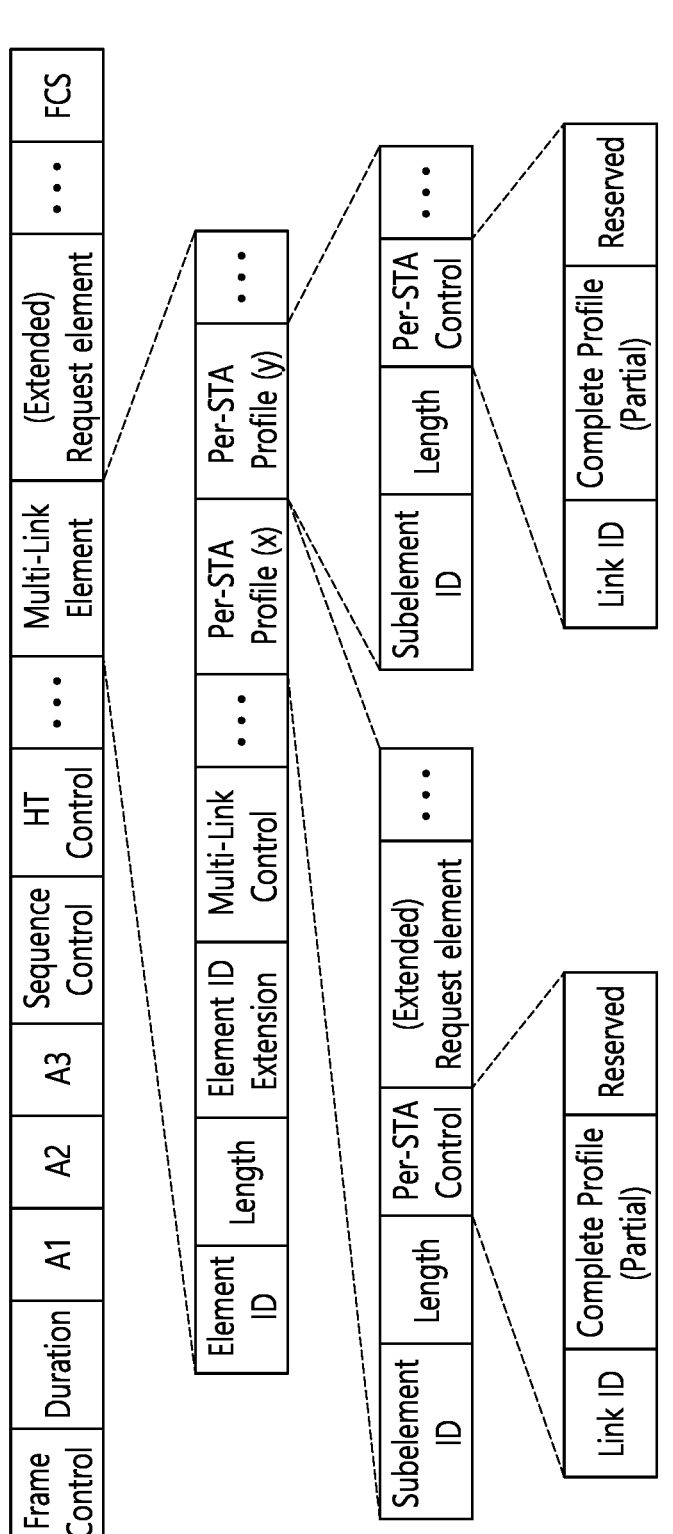
FIG. 49 shows another example of a Probe Request frame including an ML IE format.

An embodiment when the inheritance model is applied to the MLD probe request is shown in FIG. 49.

FIG. 49 shows another example of a Probe Request frame including an ML IE format.

Referring to FIG. 49, when an EHT non-AP STA requests partial information from a peer AP through an MLD probe request, an (Extended) Request element is included in the core of probe request frame. At this time, in the case of requesting partial information different from the peer AP for some APs (i.e., Per-STA Profile (x)) among the APs indicated by the Multi-Link Element, non-information in the Per-STA Profile (x) is requested. Other information can be requested by including the (Extended) Request element corresponding to the inheritance element. At this time, the Complete profile value of the Per-STA Control field is set to 0.

Or, when requesting the same partial information as the peer AP for some APs (i.e., Per-STA Profile (y)) among the APs indicated by the Multi-Link Element, the STA omits the (Extended) Request element in the Per-STA Profile (y). At this time, the Complete profile value of the Per-STA Control field is set to 0. In this way, when the inheritance model is applied to the MLD probe request, if the EHT non-AP STA requests Element (a) and Element (b) from the peer AP and requests Element (a) and Element (c) from the AP (x) indicated by the Per-STA Profile (x), Since there is information (e.g. Element (a)) that is equally requested from peer AP and AP (x), but also includes other information (e.g. Element (c)), in order for the AP to distinguish this, the Per-STA Profile (x) must include an (Extended) Request element indicating a request for information on Element (a) and Element (c). (When applying the inheritance model, if there is an (Extended) Request element in the Per-STA Profile(x), the AP recognizes it as a non-inheritance element even if there is overlapping requested partial information with the peer AP, so the same partial information as the peer AP In the (Extended) Request element included in the Per-STA Profile (x), unless requesting the AP (e.g. AP (x) indicated through the Per-STA Profile (x), regardless of the partial information requested for the peer AP)) must indicate all Element information requested). However, if the EHT non-AP STA requests Element (a) and Element (b) from the peer AP, and the EHT non-AP STA requests the same Element (a) and Element (b) to the AP (x) indicated by the Per-STA Profile (x)), since the information requested from the peer AP and AP (x) is the same, the STA applies the inheritance model and sets the 'Complete profile' subfield to 0 in the Per-STA Profile (x). The (Extended) Request element indicating a request for information on Element (a) and Element (b) may be omitted.

In this case, when the Complete profile value of the Per-STA Control field is set to 1, the inheritance model is not applied to the requested information of the peer AP, but the complete information request for AP (y). That is, in order to apply the inheritance model to the Multi-Link element for the partial information request for the peer AP, the Complete profile value of the Per-STA Control field must be set to 0.

The STA may request different information for each link by dividing the requested information into common or link specific according to the arrangement of elements in the frame.

To this end, additionally, a new field is proposed in the Multi-Link Control field to indicate whether the information requested by the corresponding ML IE distinguishes Common information. As described above, the STA may express common information for a corresponding link according to the arrangement of Request element or/and Extended Request element. Depending on whether Common information is requested, Request element or/and Extended Request element may exist before per-STA Profile (x) in ML IE in the request frame. Therefore, a control field for representing this is proposed as shown in FIG. 50.

Figure 50:
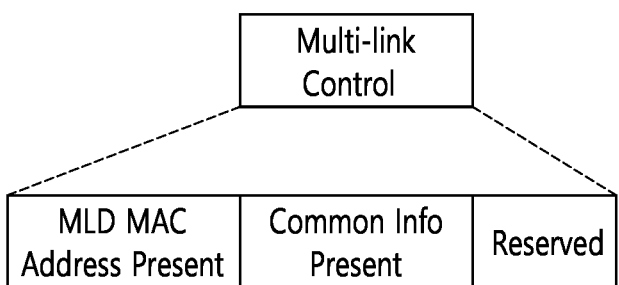
FIG. 50 shows an example of a Multi-link Control field format.

FIG. 50 shows an example of a Multi-link Control field format.

The field of FIG. 50 may be defined as a 'Common info Present' field, and the corresponding name may be defined as another name later. If the field is indicated as 1, when the STA requests information about other APs from the AP MLD, the Request element or/and Extended Request element meaning the same information request is included before the Per-STA Profile (x) element and transmitted. The field of FIG. 50 may be defined as a 'Common info Present' field, and the corresponding name may be defined as another name later. If the field is indicated as 1, when the STA requests information about other APs from the AP MLD, the Request element or/and Extended Request element meaning the same information request is included before the Per-STA Profile (x) element and transmitted. do. Link specific information requested differently for each AP is indicated through the Request element or/and Extended Request element included in the Per-STA Profile (x) element. If the field is indicated as 0, it means that there is no information that the STA equally requests for other APs, and it means that there is no separate Request element or/and Extended Request element before the Per-STA Profile (x) element.

An example for this is as follows.

The STA may make a partial request only for critical update information to the AP of the AP MLD. To this end, this specification proposes two options. In this case, the AP may correspond to all APs (reporting APs and reported APs) that the STA can acquire through Beacon. Reported AP refers to other APs that the STA can acquire through the RNR element of Beacon, and other APs in the same AP MLD as reporting APs, as well as other APs corresponding to the TxBSSID group and other APs corresponding to the non-TxBSSID group etc. In other words, the STA may request critical update information for all other APs capable of acquiring CSN (Change Sequence Number) information through Beacon (For reference, 802.11be agreed to include change sequence field information of other APs in the RNR element of the Beacon frame).

First, a method of newly defining a 'Critical update request' field for requesting critical update information from other APs.

'Critical update request' field: A field requesting only system information defined as critical update of the AP. Used together with the link indicator, it can be used when requesting system information defined as critical update of a specific link.

When the STA requests information on other APs of the AP MLD, if the corresponding field value is set to 1 and transmitted along with the link indicator information in the Request frame (e.g. Probe request frame), upon receiving this, the AP responds by including critical update information on the indicated link in the Response frame. At this time, the critical update information (a) Inclusion of an Extended Channel Switch Announcement, b) Modification of the EDCA parameters, c) Modification of the S1G Operation element) means various system information defined as critical update in the system information update procedure of the existing 802.11 standard. However, in the case of 802.11be, new information can be additionally defined in addition to the previously defined system information for critical update, and the critical update information mentioned in this specification means information including critical update information newly defined in 802.11be. If the corresponding field value is set to 0 and transmitted, the AP responds with a response frame as in the previous operation. The proposed field can be included in any element within the Request frame, and can also be included and used in the MLD Request element or ML IE mentioned above. An embodiment for this is shown in FIG. 51.

Figure 51:
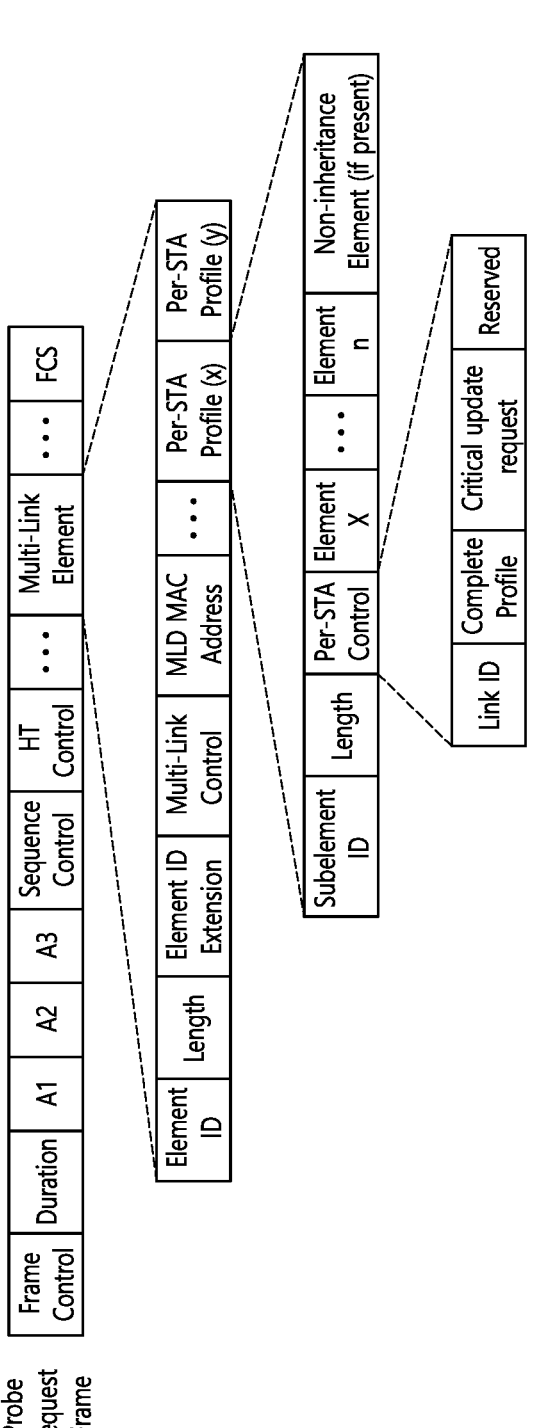
FIG. 51 shows an example in which the Critical update request field is included in the ML IE format.

FIG. 51 shows an example in which the Critical update request field is included in the ML IE format.

Referring to FIG. 51, when the STA requests information on specific links through the ML IE in the probe request, information corresponding to the specific link may be requested through Per-STA Profile (x). At this time, if the newly defined 'Critical update request' field is included in the Per-STA Control in the Per-STA Profile (x) and set to 1 for transmission, the AP responds to the link indicated by the Per-STA Profile (x). Responds with response frame including current system information defined as critical update. At this time, when the non-AP STA of the non-AP MLD transmits the 'Critical update request' field value set to 1 to request critical update information through the MLD Probe request, Change Sequence Number (CSN) information (e.g. Change Sequence element, Change Sequence field, etc.) for each non-AP STA of the non-AP MLD may be transmitted together or omitted depending on the implementation of the STA. In this case, if the critical update information of APs is requested using the MLD probe request (i.e., 'Critical update request' field=1), if the Change Sequence element is used when including the CSN information, a separate additional indicator is not necessary (because the AP can check the presence by checking the element ID of the Change Sequence element), but if the Change Sequence field is used as CSN information, a (sub)field to indicate the presence or absence of the Change Sequence field (e.g. 'CSN Presence' subfield) needs additional definition. Therefore, in this specification, an indicator for displaying the presence or absence of CSN information in the Per-STA profile of the ML IE is additionally proposed as follows.

'CSN Presence' (sub)field: A field indicating that a change sequence field exists. When the value is set to 1, it indicates that the change sequence field exists, and when the value is 0, it indicates that the change sequence field does not exist.

This field can be used together with the 'Critical update request' field when the STA requests critical update information from other APs (For example, the 'CSN Presence' (sub)field can be used together with the 'Critical update request' (sub)field in the per-STA Control field of the Per-STA Profile element in the ML IE).

This field can also be used when the AP advertises CSN information of APs (including reporting AP and reported AP) through Beacon/Probe response. In the case of using the change sequence element to advertise the corresponding CSN information, the corresponding field is not required, but in case of using the change sequence field, the 'CSN Presence' (sub)field indicating the existence of the field is required. In this case, the corresponding (sub)field may be included in various ways according to the location where the CSN information of each AP is included. It may be included in the Beacon/Probe response frame (e.g. when the reporting AP's CSN information is located in the Beacon/Probe response frame), included in the common info part in the ML IE (e.g. when CSN information of reported AP is located in common info part in ML IE), or included in the per-STA Profile (e.g. when the CSN information of the reported AP is located in the link info part in the ML IE).

At this time, if the non-AP STA uses an MLD probe request to request critical update information for each STA (x), (y) . . . etc., (that is, AP (x), (y) . . . etc.,), when a non-AP STA requests critical update information for STA (x) by setting the value of the 'Critical update request' field of the Per-STA control in the Per-STA Profile (x) of the Multi-Link element (e.g. Probe Request variant Multi-Link element) to 1, depending on whether or not the CSN information is included, the receiving AP may respond to the MLD probe response as follows.

1) When a non-AP STA transmits an MLD Probe request including its CSN information (That is, the most recently received CSN information may be included in the form of a change sequence element or change sequence field) along with 'Critical update request' field=1 in Per-STA profile (x)

A. The AP compares the CSN information of the non-AP STA (x) with the current CSN information of the AP (x) connected to the non-AP STA (x) to obtain updated critical update information (i.e., as a critical update event in 802.11be). classified elements) can be included in the MLD Probe response.

B. However, even in this case, if the received AP MLD does not implement the function of tracking update information per CSN of the AP, since it is not known what information has been updated for each CSN version, it may respond by including all current critical update information (i.e., elements classified as critical update events in 802.11be) of the AP (x) connected to the non-AP STA (x) in the MLD Probe response.

C. In this specification, in order to reduce the overhead of the MLD probe response, when requesting critical update information, it is proposed to respond with all current critical update information of AP (x) instead of all information of AP (x). Depending on the AP implementation, even if an MLD Probe request with the 'Critical update request' field set to 1 in Per-STA profile (x) is received from a non-AP STA, the AP (x)'s Complete profile (i.e., complete information) may be responded.

2) The non-AP STA transmits the MLD Probe request by omitting its CSN information (i.e., the most recently received CSN information) along with the 'Critical update request' field=1 in the Per-STA profile (x) case A. Since the AP cannot know the CSN information of the non-AP STA (x), all current critical update information of the AP (x) connected to the non-AP STA (x) (i.e., classified as a critical update event in 802.11be) elements) can be included in the MLD Probe response.

B. In this specification, in order to reduce the overhead of the MLD probe response, when requesting critical update information, it is proposed to respond with all current critical update information of AP (x) instead of all information of AP (x). Depending on the AP implementation, even when receiving an MLD Probe request with the 'Critical update request' field set to 1 in Per-STA profile (x) from a non-AP STA, it may respond with the complete profile (i.e., complete information) of AP (x).

Figure 52:
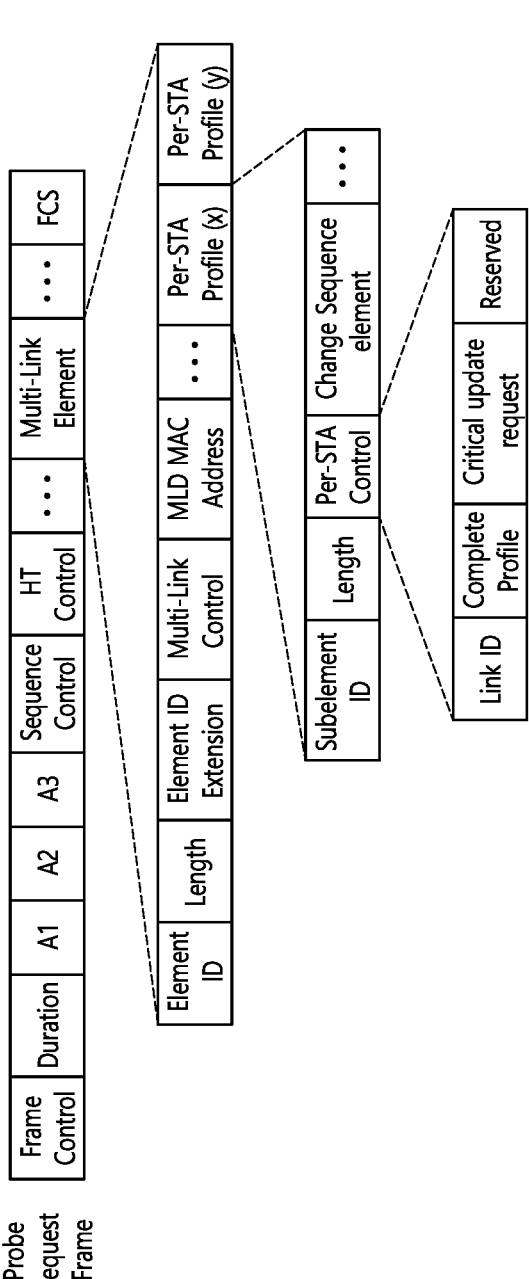
FIG. 52 shows an example of an MLD probe request using a change sequence element when requesting critical update information.

FIG. 52 shows an example of an MLD probe request using a change sequence element when requesting critical update information.

Figure 53:
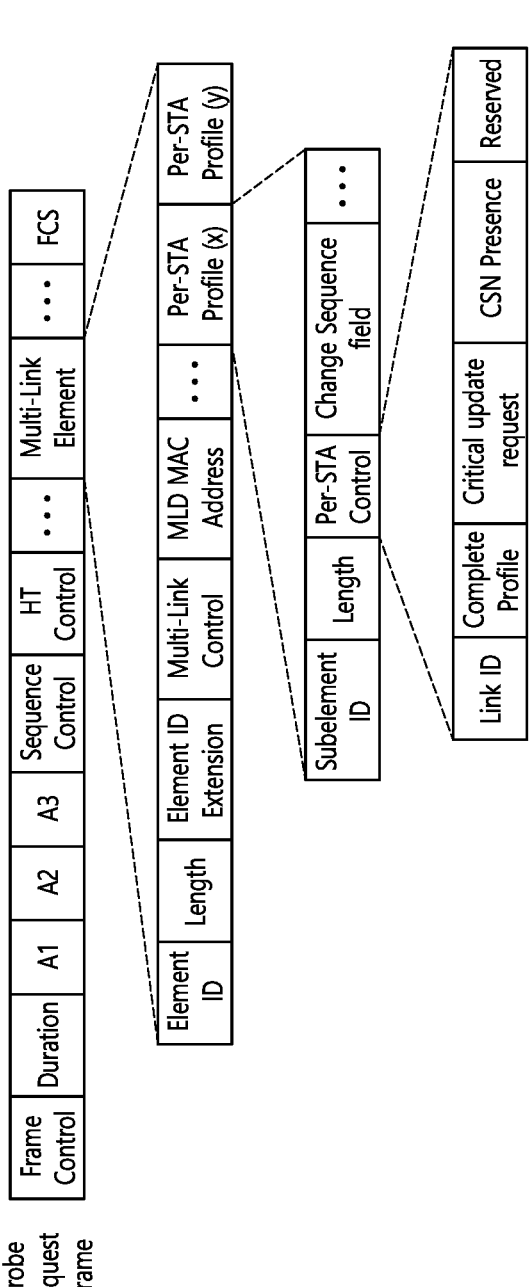
FIG. 53 shows another example of an MLD probe request using a change sequence element when requesting critical update information.

FIG. 53 shows another example of an MLD probe request using a change sequence element when requesting critical update information.

For example, when a non-AP STA requests critical update information for a specific STA (x), as shown in FIG. 53, critical update request=1 may be set and change sequence number information (e.g. change sequence element or change sequence field) may be transmitted together. At this time, the non-STA may omit and transmit the change sequence number information depending on the case. However, in this case, as defined above, the information included in the MLD Probe response from the AP may be limited.

Figure 54:
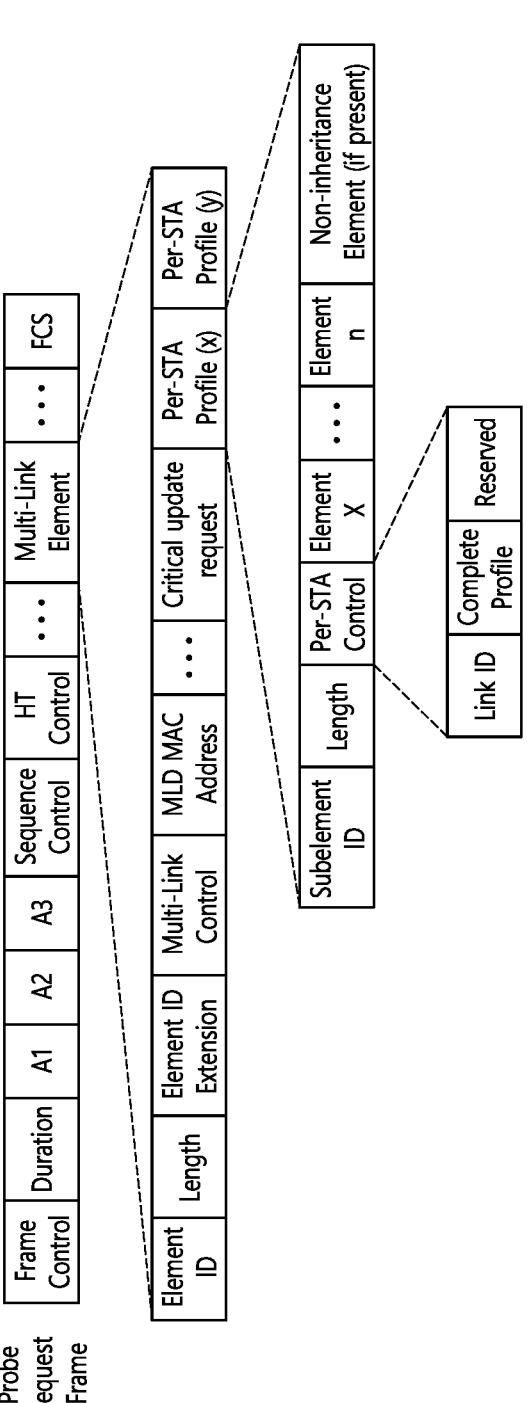
FIG. 54 shows an example in which the Critical update request field is included in the ML IE format.

FIG. 54 shows an example in which the Critical update request field is included in the ML IE format.

Referring to FIG. 54, when the Critical update request field is located in the ML IE as above, critical update information for all links indicated through the Per-STA Profile (x) can be requested. If the Critical update request field is included in a position that includes common information in the ML I.E., and the field value is indicated as 1 and transmitted, upon receiving this, the AP responds with a response frame including critical update information for links requested in the corresponding request frame. Alternatively, the Critical update request field may be included in a subfield within the multi-link control field in the ML IE to indicate. The shape of the field defined in this way (field, subfield, subelement, etc.) or location within the ML IE can be defined in various ways according to the standard definition.

Second, a method using a change sequence element for requesting critical update information from other APs. In 802.11ah, if the change sequence element is included in the probe request frame and transmitted, the AP transmits only the changed critical update information for the corresponding link in the probe response frame in the compressed probe response frame. 802.11be can also take advantage of this.

When the STA makes a request by including a change sequence element along with link indicators for other APs in the probe request frame, the AP receiving the request includes only the changed critical update information for the indicated links in the probe response and transmits it. The change sequence element can be included in any element or sub-element in the request frame, and can also be included and used in the above-mentioned MLD Request element or ML IE. An embodiment for this is shown in FIG. 55.

Figure 55:
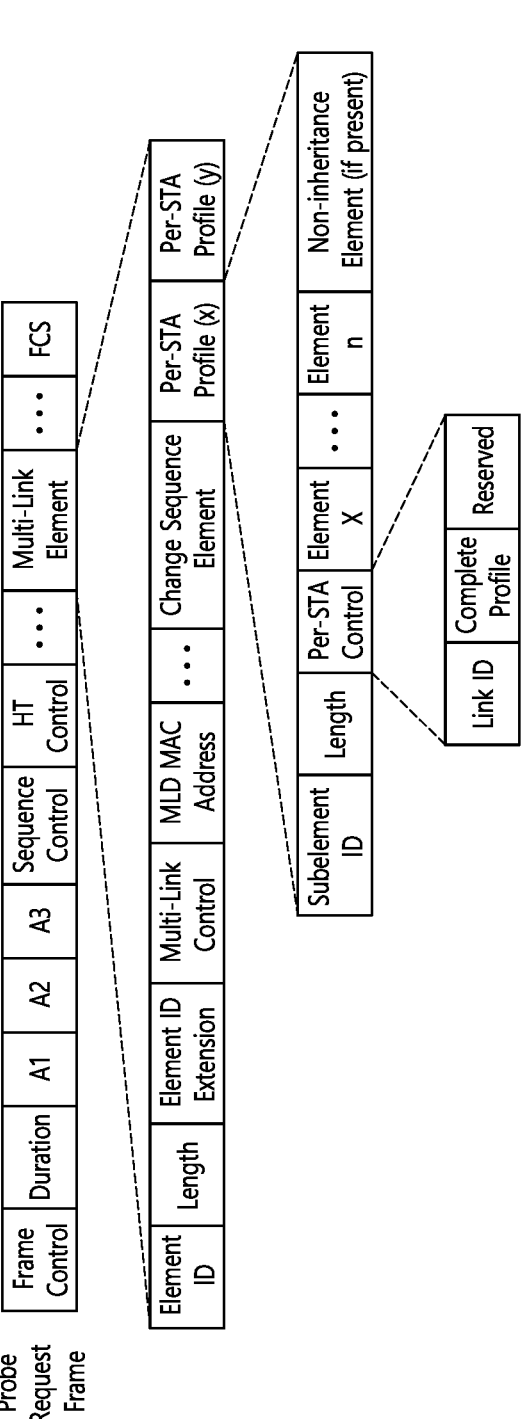
FIG. 55 shows an example in which a Change sequence element is included in the ML IE format.

FIG. 55 shows an example in which a Change sequence element is included in the ML IE format.

For example, when transmitting including a Change Sequence element in the ML IE as shown in FIG. 55, for the links indicated through the ML I.E., the AP compares the change sequence field value it currently has with the change sequence field value in the change sequence element transmitted by the STA, and if there is a change, the AP responds by including the changed critical update information in the probe response. At this time, the change sequence element transmitted by the STA must include change sequence information for all links requesting information from the ML IE. Therefore, when using the existing change sequence element, additionally requested link indicator information may be required. Additionally, in the present specification, when transmitting including the Change Sequence element in the ML IE as above, the option of transmitting including all information related to the critical update currently possessed by the AP is also considered. If the AP compares the value of the Change sequence field transmitted by the STA with the field currently possessed by the AP and finds a difference, the AP transmits all information related to the currently possessed critical update to the STA. This method may increase overhead for information transmitted by APs, but can be implemented more simply because there is no need to store change information for each critical update version for each AP.

Additionally, in this specification, a new element considering MLD is additionally proposed.

'MLD Change Sequence element': Element that can contain change sequence information of multiple links Examples for this are shown in FIGS. 56 and 57.

Figure 56:
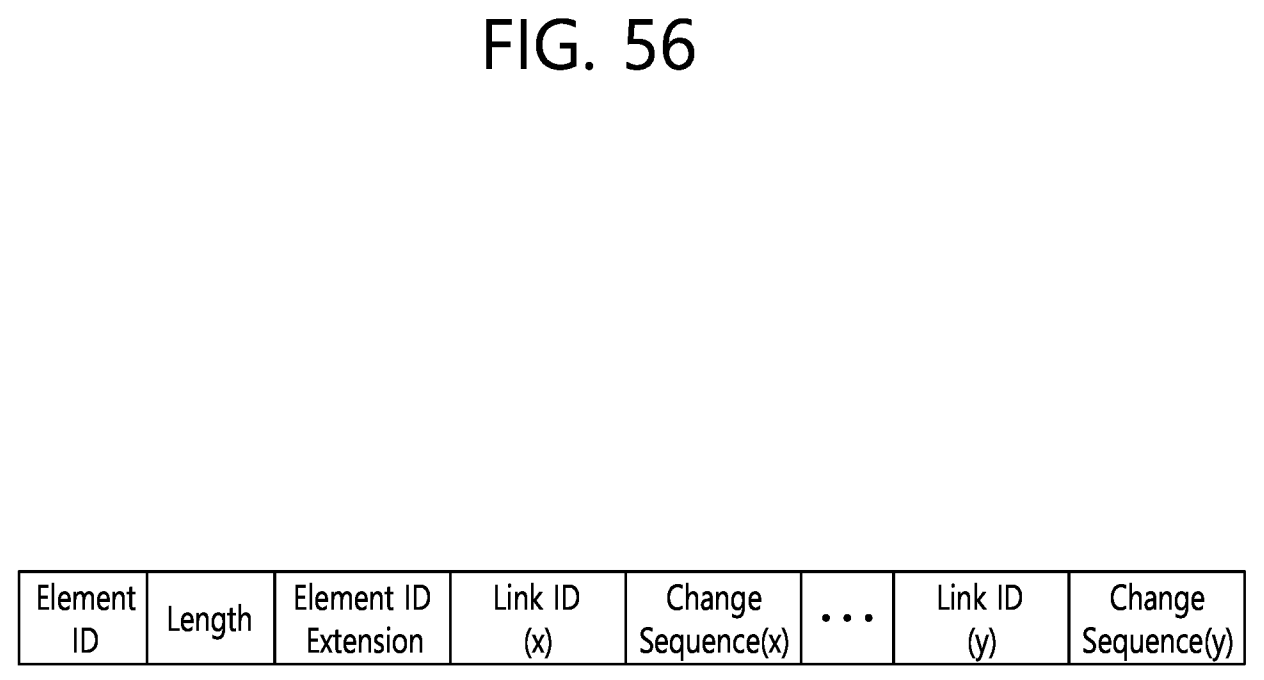

FIG. 56 shows an example of an MLD Change Sequence format.

Figure 57:
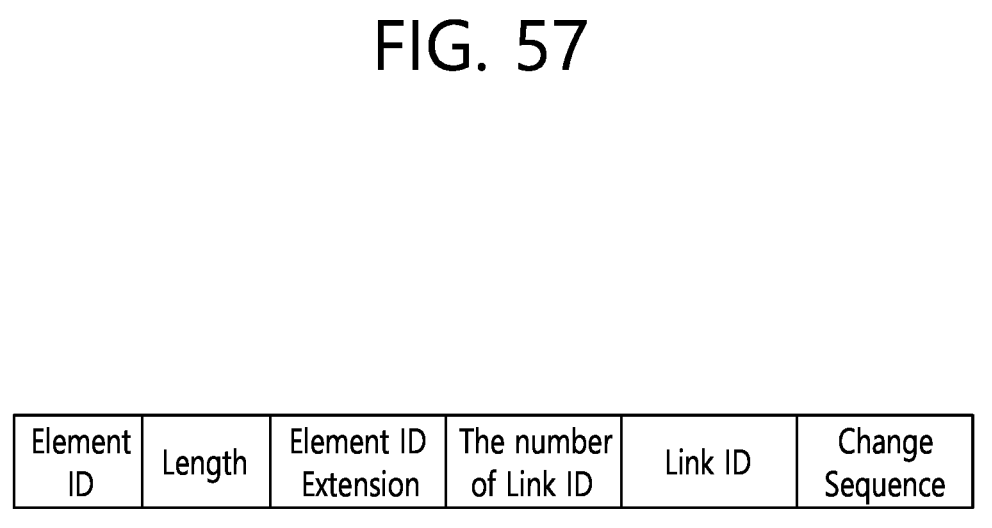

FIG. 57 shows another example of an MLD Change Sequence format.

As shown in FIG. 56, the MLD change sequence value repeatedly lists change sequence values for each link, or as shown in FIG. 57, after indicating the number of links as 'The number of Link ID', Link ID information and Change sequence information may be indicated respectively.

Figure 58:
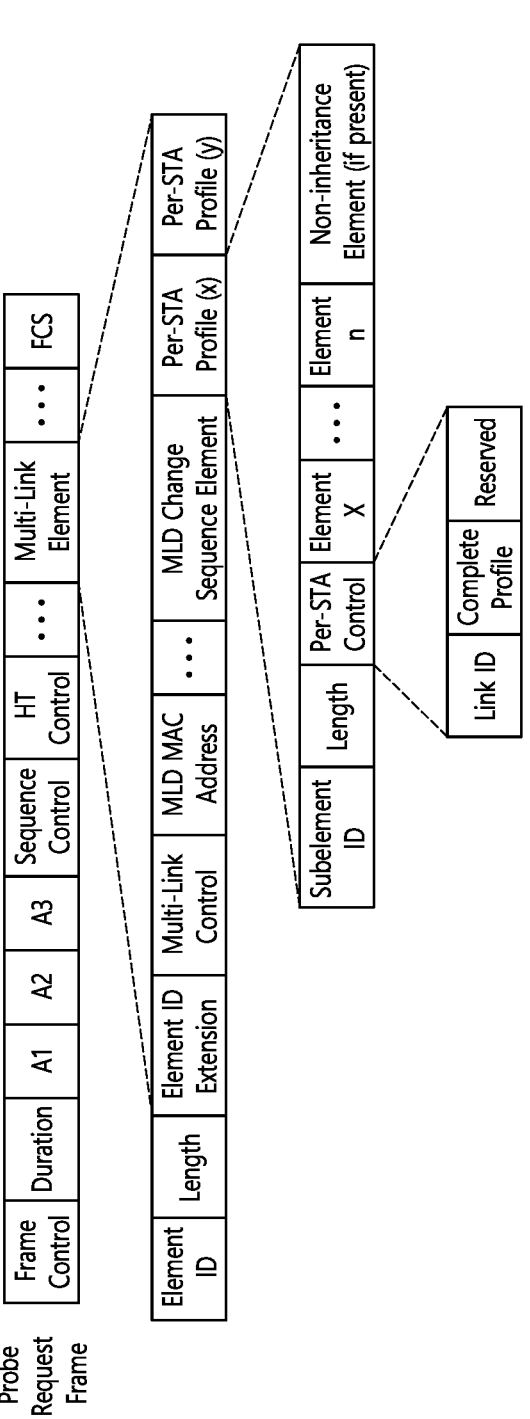
FIG. 58 shows an example of an MLD Change Sequence element.

An embodiment of the MLD Change Sequence element is shown in FIG. 58.

FIG. 58 shows an example of an MLD Change Sequence element.

As shown in FIG. 58, when the MLD Change sequence element is included in the ML IE in the probe request frame and transmitted, the AP may compare the change sequence value received for each link with its own change sequence value, and may respond by including changed critical update information for links corresponding to the updated change sequence value in a response frame. In this case, if the STA does not request other information for each link, the Per-STA Profile (x) sub-element may be omitted and transmitted.

Figure 59:
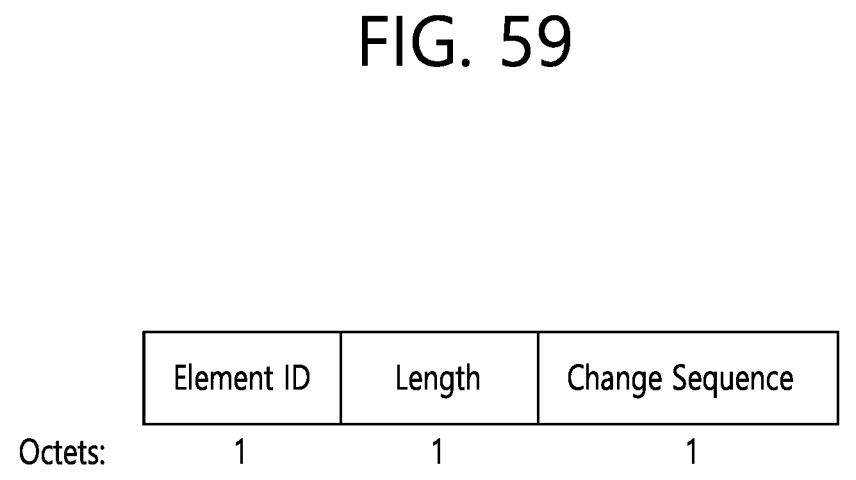

At this time, when using the existing Change Sequence element, it can be used as shown in FIG. 59.

FIG. 59 shows an example of a change sequence element in the existing standard.

Critical update information updated for each link may be requested by using the existing change sequence element in the ML IE as it is. An embodiment for this is shown in FIG. 59.

Figure 60:
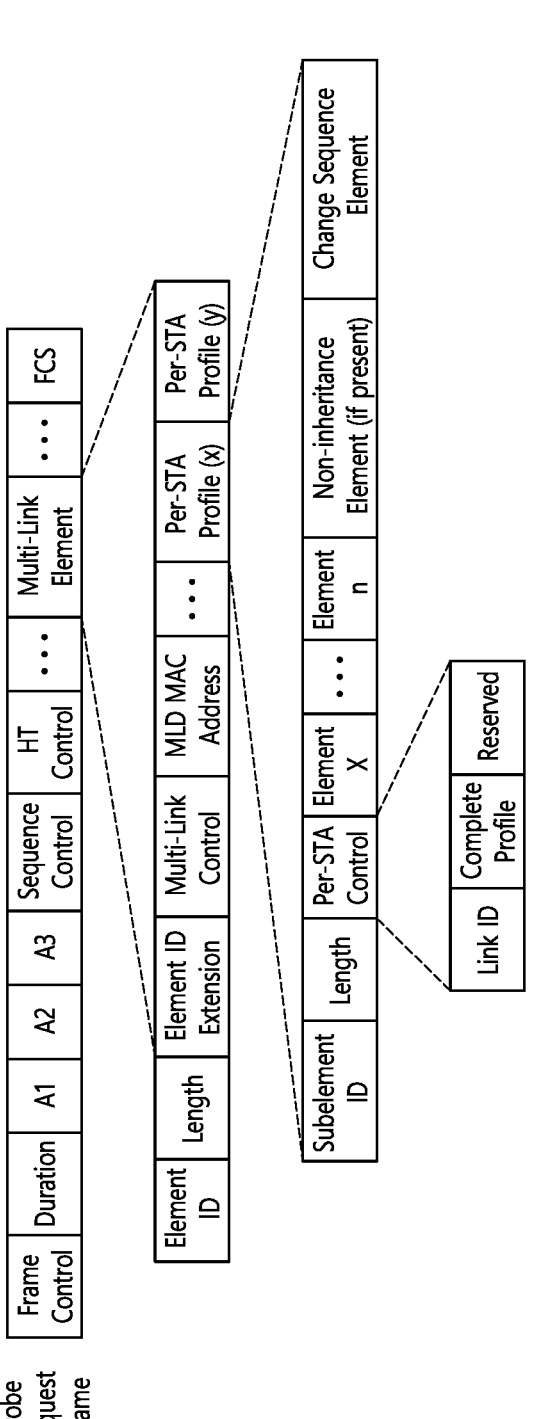
FIG. 60 shows another example in which a change sequence element is included in the ML IE format.

FIG. 60 shows another example in which a change sequence element is included in the ML IE format.

Referring to FIG. 60, when the STA transmits including a change sequence element in the Per-STA Profile (x) in the ML IE in the Probe request, it means a request for changed critical update information of the link indicated by the Per STA Profile (x). Therefore, after checking the change sequence element included in the request frame, the AP compares the received change sequence value with its own change sequence value, and when there is an update (i.e., when there is changed information that the STA needs to update), the AP may transmit a response frame including changed critical update information or a response frame including all critical update related information.

Third, a change sequence field is used together with the 'Critical update request' field defined above to request critical update information from other APs. Above, as an indicator for the STA to request information from other APs, the 'Critical update request' field is defined as follows.

'Critical update request' field: A field requesting only system information defined as critical update of the AP.

Used together with the link indicator, it can be used when requesting system information defined as critical update of a specific link.

However, when the STA requests the critical update information of a specific link with the 1-bit indicator as above, if the AP receiving the request does not know the version of the critical update information currently possessed by the STA (That is, the change sequence field value of the critical update information of the STA), the AP must transmit a response message including all critical update information for the requested link. In addition, a Change Sequence element may be included together with critical update information in the corresponding response frame and transmitted. This is a rather simple method, but since it may be redundant transmission of information already possessed by the STA, a format is additionally proposed to reduce overhead. An example for this is as follows.

Figure 61:
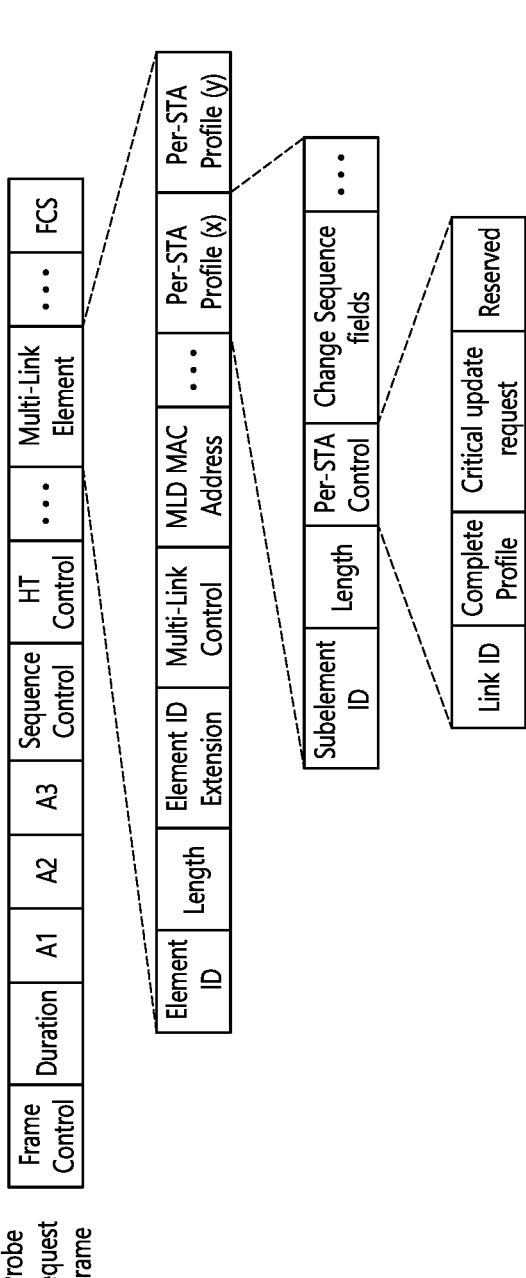
FIG. 61 shows an example of a probe request frame for requesting critical update information.

FIG. 61 shows an example of a probe request frame for requesting critical update information.

Referring to FIG. 61, the STA may transmit a request frame by including a Critical update request field, which is an indicator for requesting critical update information, in a Request frame and Change sequence fields (or Change Sequence element) indicating version information of the critical update currently possessed by the STA. At this time, the change sequence fields mean an indicator indicating a change sequence value for each link. In 802.11be, the STA can periodically receive a change sequence value for the APs of the connected AP MLD through a beacon or probe response, and since it is defined that the STA stores these values, the STA Change sequence value information for each link is known. Therefore, the Change sequence fields field defined in this specification means information on versions (i.e., change sequence values) of critical update information for APs of the connected AP MLD previously obtained by the STA through a Beacon or Probe response.

At this time, when the value of the 'Critical update request' field is 1, it means that the STA requests critical update information, and otherwise, the value is indicated as 0. If the value of the 'Critical update request' field is 1, it means a request for critical update information, so it is transmitted including the Change sequence fields field (or Change Sequence element), but if the value is 0, this field is omitted and transmitted. In other words, when the value of the 'Critical update request' field is 1, the STA attaches Change sequence fields (or Change Sequence elements), and the receiving AP compares the received information with the current information it has and only changes information (i.e., Only changed information to be updated by the STA) can be transmitted in a response message, and when the value of the 'Critical update request' field is 0, the change sequence fields (or change sequence element) are omitted to reduce overhead. Additionally, in the present specification, when transmitting including the Change Sequence fields in the ML IE as above, the option of transmitting including all information related to the critical update currently possessed by the AP is also considered. If the AP compares the value of the Change sequence field transmitted by the STA with the field currently possessed by the AP and finds a difference, the AP transmits all information related to the currently possessed critical update to the STA. This method may increase overhead for information transmitted by APs, but can be implemented more simply because there is no need to store change information for each critical update version for each AP.

As above, the presence or absence of the change sequence field (or change sequence element) can be classified and defined according to the value of the 'Critical update request' field, but depending on options, the 'Critical update request' field value and the Change sequence field (or Change Sequence element) may be independently defined and used. In this case, a case may occur when the request message transmitted by the STA does not include the Change sequence fields field (or Change Sequence element) together with the 'Critical update request' field having a value of 1, in this case, it is considered that the receiving AP wants to receive all critical update information, not only the updated critical update information, and responds by including all critical update information in the response message. In this specification, as shown below, a method that the STA transmits the previously acquired change sequence value information along with the 'Critical update request' field, and the AP compares it with its current change sequence value information and transmits only the changed information in the response frame is proposed. At this time, the corresponding section provides a Change sequence fields field as an example to deliver change sequence information of the link, but the STA may request a Change sequence element instead of the Change sequence fields field. However, since the use of the change sequence element has already been mentioned in the above section, the embodiment in which the change sequence element is used together with the 'Critical update request' field is omitted.

For example, when the STA transmits the Probe Request frame including the ML IE for MLD probing, information for requesting critical update may be included in a Per-STA Profile (x) subelement for requesting information for each STA as shown in FIG. 61. At this time, the Critical update request field in the Per-STA Control field and the Change sequence fields field containing the Critical update information of the current STA may be located in the Per-STA Profile (x). At this time, the Critical update request field may be located together with Change sequence fields in the Per-STA Profile (x), not in the Per-STA Control field. An embodiment for this is shown in FIG. 62.

Figure 62:
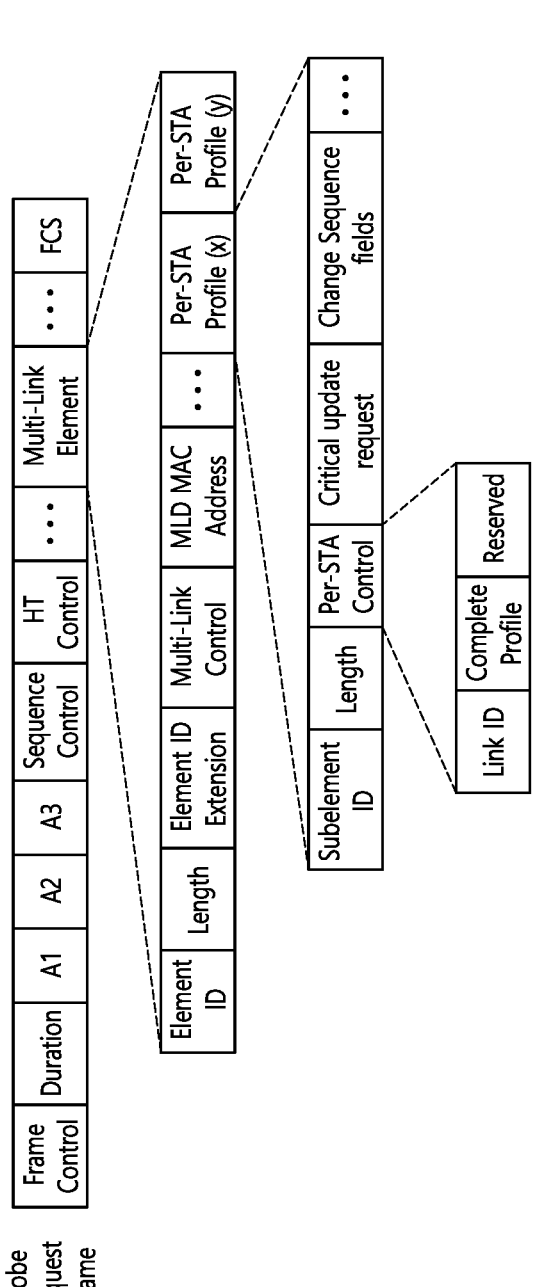
FIG. 62 shows another example of a probe request frame for requesting critical update information.

FIG. 62 shows another example of a probe request frame for requesting critical update information.

Upon receiving the request frame as shown in FIG. 62, the AP sees the ML IE information in the request frame and transmits a response message including critical update information of a specific link requested by the STA. At this time, if the Critical update request field exists in the Per-STA Profile (x) element in the ML IE and the value is 1, it is recognized that the STA has requested Critical update information. In addition, by comparing the change sequence information of the STA with the current change sequence information for the link (X) requested by the STA through the change sequence fields information received together at this time, If there is something updated (that is, if there is changed information that the STA needs to update), a compressed probe response frame containing only the updated information is transmitted, or if there are updated items, all information related to the critical update can be responded with a probe response frame.

The information mentioned above is included in the Common info level rather than the Link specific level in ML I.E., so that critical update information can be requested for all links at once, not for specific links.

Figure 63:
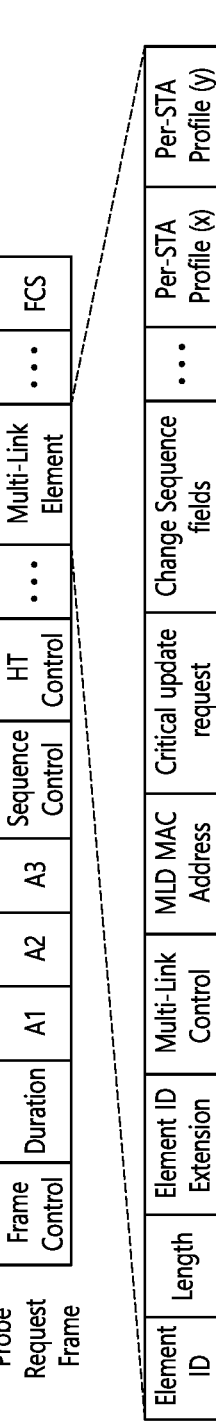
FIG. 63 shows another example of a probe request frame for requesting critical update information.

An embodiment for this is shown in FIG. 63.

FIG. 63 shows another example of a probe request frame for requesting critical update information.

As shown in FIG. 63, the STA requests including the Critical update request field (i.e., setting the value to 1) and Change sequence fields in the Link specific information location (e.g. Common information location rather than Per-STA Profile (x)) in the ML IE frame can be transmitted. Upon receiving this, the AP recognizes the STA as a request for all of its own links, not a specific link, and compares the change sequence fields information transmitted by the STA with the current change sequence information for all of its own links. (that is, if there is changed information that the STA needs to update), it transmits a compressed probe response frame containing only updated information for all links, or if there are updated items, all information related to the critical update can be responded with a probe response frame.

Figure 64:
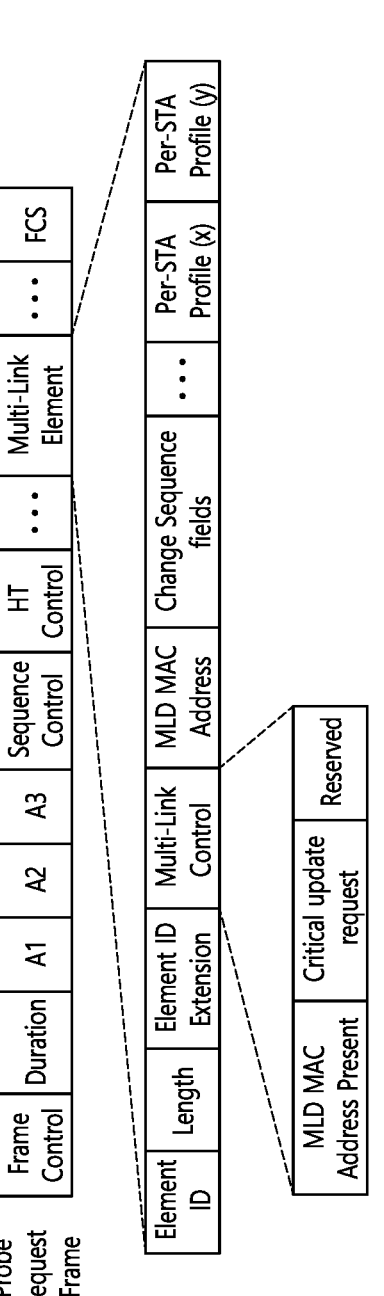
FIG. 64 shows another example of a probe request frame for requesting critical update information.

FIG. 64 shows another example of a probe request frame for requesting critical update information.

At this time, the STA may indicate a request for the changed critical update information of the link by placing the critical update request field in the multi-link control field as shown in FIG. 64.

Regarding the above method of requesting critical update change information for a specific AP by the STA, in this specification, a response operation to which the AP responds is additionally proposed. In the current 802.11ax standard, when a 6 GHz AP receives a Probe Request and transmits a Probe Response frame, if the AP does not indicate the actual SSID of the SSID element of its Beacon frame, the sending rule by setting the broadcast address in the Address 1 field is already defined. Referring to this, in the 802.11be standard, when an MLD Probe Request frame requesting complete information about an AP operating in the 2.4 GHz band or 5 GHz band is received, when the AP responds to the MLD Probe Response frame, if the AP does not indicate the actual SSID of the SSID element of its Beacon frame, a method for setting the Address 1 field to a broadcast address is being discussed.

In contrast, in the present specification, even when the STA requests update-related information on a critical update for a specific AP through the MLD Probe Request frame (for example, when the STA transmits the MLD Probe Request frame with Change Sequence field information included), when the AP responds to the MLD Probe Response frame, if the AP does not indicate the actual SSID of the SSID element of its Beacon frame, a method for setting the Address 1 field to a broadcast address is proposed. Critical update information is important change information of an AP and is information that all STAs must know before data transmission/reception. Therefore, in order to prevent a storm caused by MLD probing, the present specification proposes a method of responding with a broadcast message when a STA requests partial information on a critical update of a specific AP, unless otherwise indicated.

In addition, as described above, depending on the implementation of the AP MLD, the AP MLD may implement a method of storing which information (i.e., IEs) has been updated for each CSN (Change Sequence Number, whenever a critical update occurs) of each AP, depending on the memory size, it may not be implemented. If the corresponding method is supported, the AP needs to remember which IE information has been updated whenever its CSN is changed. For example, if the AP generates a critical update event for Element X at CSN n=1 and updates for Elements Y and Z at CSN=n+1, then the AP determines what happens at CSN=n and CSN n+1. It should be possible to keep the information to see if it has changed. If the AP can track which IE has changed for each CSN like this, when the STA transmits the CSN information it is currently storing in the Request frame, it can be useful in terms of overhead because only changed information compared to the current CSN value of the AP, not all information, can be included in the response frame and transmitted. However, this tracking may not be easy, and since additional memory is required for the AP, the corresponding capability may or may not be supported depending on the implementation specifications of the AP. Therefore, the present disclosure proposes a capability for indicating the ability of the AP to track update information for each CSN as follows.

'Critical update Tracking Support' field: This field is information indicating whether or not the current STA or AP supports a function for storing which information (e.g. EI (Element ID) information) has been updated for each CSN value. If the value is 1, it means that the STA or AP supports the ability to store which information has been updated for each CSN value, and if it is 0, it means that the STA or AP does not support the corresponding function. For example, this Field may be included in an Extended Capabilities element or an EHT Capabilities element.

The STA can use it to request critical update information for a specific AP (or STA) by checking whether the corresponding AP (or STA) supports this function in the association process. This function may be supported at the MLD level or at the STA level for each STA.

In this way, when the 'Critical update Tracking Support' field indicating whether the MLD supports critical update tracking is defined, the detailed operation of the STA may be defined as follows.

For example, if the AP MLD supports Critical update tracking support (e.g. 'Critical update Tracking Support' field=1), the non-AP MLD can know this during the multi-link setup process.

In case the AP MLD supports critical update tracking, the STA of the non-AP MLD may include CSN (Change Sequence number) information in the probe request frame when requesting partial information related to only the critical update. Upon receiving this, the AP may compare the CSN of the current AP with the CSN information received from the STA and transmit a Probe Response frame including only updated information. However, even in this case, if the STA wants to obtain all information related to the critical update of the AP, not just the changed information, when requesting partial information related to the critical update, the desired information is transmitted without including the CSN information in the probe request frame (Entire information related to the critical update of the AP) may be obtained.

If the AP MLD does not support Critical update tracking (e.g. 'Critical update Tracking Support' field=0), when an STA of a non-AP MLD requests information related only to critical update, CSN information may not be included in the Probe Request frame and sent. Upon receiving this, the AP may transmit a Probe Response frame including element information related to all critical updates corresponding to the CSN of the current AP (or complete information (i.e., complete profile) of the requested AP if there is no separate instruction). However, even in this case, when the STA requests partial information related to the critical update, CSN information may be included in the probe request frame and sent. However, since the AP receiving it cannot track the update information for each CSN, element information related to all critical updates corresponding to the CSN of the current AP (or complete information of the requested AP (i.e., complete profile) if not otherwise instructed) may be included in the Probe Response frame and sent.

As such, if the non-AP MLD can know whether the AP MLD supports update information tracking for each CSN by defining the 'Critical update Tracking Support' field in the MLD, the non-AP MLD requests a probe request for partial information related to the critical update. This can be useful because it allows you to decide whether or not to include CSN information in a frame.

According to an embodiment, the AP MLD and the non-AP MLD can activate the IOM method proposed in the multi-link setup process or after the multi-link setup through the signaling method proposed in this specification. In addition, AP MLD and non-AP MLD can limit the range and type of requested information through various field values in the IOM Capability element.

According to an embodiment, the IOM operation may be performed after precise operation negotiation between MLDs through the above-described IOM signaling method, but the IOM operation may be performed by the MLD implementation without a separate signaling process. This may mean that it operates by implementing an AP MLD or by implementing a non-AP MLD without negotiation between the AP MLD and the non-AP MLD.

Based on the above-described embodiments, AP MLD and non-AP MLD can operate, but the following restrictions may occur when the MLD performs an IOM operation without separate signaling exchange.

1) Constraints on the Solicited method: If information sharing is not supported between APs in the AP MLD, it cannot respond when the STA requests information on another link.

2) Constraints on the unsolicited method: The AP can provide a separate message by determining the STA that needs link additional information (e.g. beacon period, etc.). Therefore, the STA cannot predict in advance whether it will receive this information.

When the MLD implements the IOM without a separate signaling method, there is an effect of simplifying the operation process, but there is a problem that the above-mentioned limitations may occur.

According to an embodiment, a method for requesting multi-link information may be set based on an agreement between an AP MLD and a non-AP MLD performed using the above-described IOM capability element. In contrast, in the case of the solicited method, the STA may want to acquire the information temporarily by instructing specific information other than the agreed content. In this case, when the STA dynamically sends a request message, the request may include the content indicated (e.g., IOM capability information).

For example, during or after multi-link setup, the AP MLD and the non-AP MLD agree and the STA may receive information from the AP based on the agreed content, but the STA may want to temporarily request information of a specific AP or specific parameter information of APs. In this case, when requesting information, the STA may transmit an "IOM capability" element in a request frame (e.g. probe request frame or (re)association frame or new frame) including instructions for the information it wants to request. Based on the request frame, the AP may transmit/provide a response message including information requested by the STA to the STA. According to an embodiment, when a field in an IOM capability element is omitted, the AP may provide information to the STA based on previously agreed content.

Accordingly, the MLD (AP MLD or non-AP MLD) may perform negotiation between the AP MLD and the non-AP MLD using the above-described element during a multi-link setup process or thereafter. Based on the negotiation, the non-AP MLD may perform an agreement on information to be provided (or information to be received) and receive it. In addition, the STA may temporarily receive only requested information by transmitting a request message including instructions for information desired to be requested. However, if special instructions are omitted in the request message, the non-AP MLD and AP MLD may operate based on the basic agreed upon indications.

According to an embodiment, if the contents of the agreement are to be changed after completion of the multi-link setup, the non-AP MLD and the AP MLD may update the contents of the agreement between the MLDs through a separate message exchange.

The procedure for BSS parameter critical update is described below.

If the AP of the AP MLD does not belong to multiple BSSIDs or the AP corresponds to the transmitted BSSID in the multiple BSSID set, the AP includes a BSS Parameter Change Count (BPCC) subfield for each of all APs belonging to the same AP MLD in a beacon and probe response frame and transmits the beacon and probe response frames.

The value of the BPCC subfield of each AP is initialized to 0, and should be incremented when a critical update occurs for operational parameters of the AP (modulo 256).

The BPCC subfield for each of the other APs of the AP MLD must be transmitted in the MLD Parameters subfield of the Target Beacon Transmission Time (TBTT) Information field of the Reduced Neighbor Report (RNR) element corresponding to the AP.

The BPCC subfield for the AP must be delivered in the Common Info field of the Basic Multi-Link element.

The AP provides the Critical Update Flag subfield of the Capability Information field of the beacon and probe response frame, and the value transmitted in the BPCC subfield of the MLD Parameters field of the RNR element for any AP of the same AP MLD (or Basic Multi-Link The update indicator for the value transmitted in the BPCC subfield of the element's Common Info field) is transmitted.

If there is a change in the value transmitted from the BPCC subfield of the MLD Parameters field of the RNR element for an AP of the same AP MLD (or the value transmitted from the BPCC subfield of the Common Info field of the Basic Multi-Link element), the AP sets the Critical Update Flag subfield of the Capability Information field in the beacon frame to 1 and includes the next DTIM beacon frame for the link in which the AP operates.

In other cases, the AP sets the Critical Update Flag subfield of the Capability Information field to 1.

The non-AP MLD shall maintain a record of the value of the most recently received BPCC subfield for each AP in the AP MLD with multi-link configuration.

Hereinafter, the above-described embodiment will be described with reference to FIGS. 1 to 64.

Figure 65:
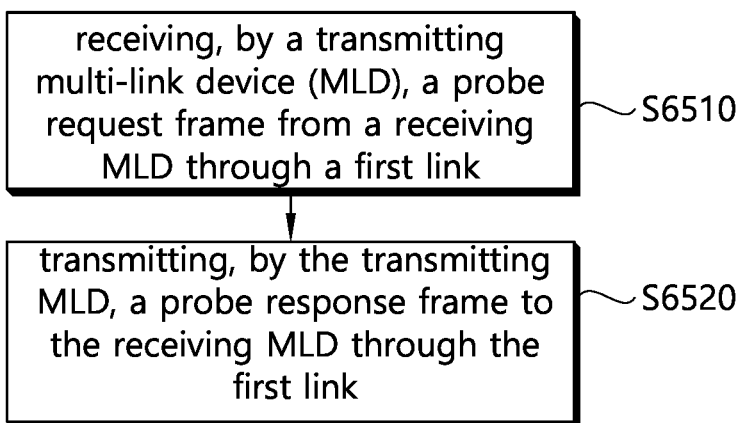
FIG. 65 is a flowchart illustrating a procedure in which a transmitting MLD provides critical update information to a receiving MLD based on a probe response frame according to the present embodiment.

FIG. 65 is a flowchart illustrating a procedure in which a transmitting MLD provides critical update information to a receiving MLD based on a probe response frame according to the present embodiment.

The example of FIG. 65 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

In this embodiment, when a non-AP STA requests partial information about an AP other than a peer AP through a probe request frame in MLD communication, a method and apparatus for indicating that the partial information request is a request for important update information by including an important update request field (set to 1) in the probe request frame are proposed. Here, the transmitting MLD may correspond to the AP MLD, and the receiving MLD may correspond to the non-AP MLD. If the non-AP STA is a first receiving STA, a first transmitting STA connected to the first receiving STA through a first link may be referred to as a peer AP, and the second and third transmitting STAs connected through different links may be referred to as different APs.

In step S6510, a transmitting multi-link device (MLD) receives a probe request frame from a receiving MLD through a first link.

In step S6520, the transmitting MLD transmits a probe response frame to the receiving MLD through the first link.

The transmitting MLD includes a first transmitting station (STA) operating on the first link and a second transmitting STA operating on a second link. The receiving MLD includes a first receiving STA operating on the first link and a second receiving STA operating on the second link.

The probe request frame includes a profile field of the second receiving STA. The profile field of the second receiving STA includes a first critical update request field.

When the first receiving STA requests partial information on the second link and the first critical update request field is set to 1, the partial information on the second link is set as critical update information on the second link.

In this case, the probe response frame may include the critical update information on the second link. The critical update information on the second link may include a Basic Service Set (BSS) parameter of the second transmitting STA.

That is, in this embodiment, a method of requesting, by a non-AP STA (first receiving STA) critical update information of another AP (second transmitting STA) in the AP MLD by not simply requesting partial information through the above-mentioned critical update request field is proposed. Accordingly, the non-AP STA may receive the critical update information (BSS parameter information) of the other AP through the probe response frame.

If the transmitting MLD supports a capability for critical update tracking, the profile field of the second receiving STA may further include Change Sequence Number (CSN) information most recently obtained by the second receiving STA. The probe response frame may include only updated information by comparing the CSN information most recently obtained by the second receiving STA with current CSN information of the second transmitting STA. That is, when the second receiving STA (Non-AP STA) requests critical update information on the second transmitting STA (another AP) by including the most recent CSN information stored therein in the probe request frame, the transmitting MLD (AP MLD) may transmit only information that needs to be updated instead of all critical update information on the second transmitting STA by including it in a probe response frame. As a result, frame overhead can be reduced.

On the other hand, if the transmitting MLD does not support a capability for critical update tracking, the profile field of the second receiving STA may not include CSN information most recently obtained by the second receiving STA. The probe response frame may include all current critical update information of the second transmitting STA. Since the transmitting MLD does not know the CSN information of the second receiving STA, the transmitting MLD may include all critical update information for the second transmitting STA in a probe response frame and inform it.

The most recently acquired CSN information may be a Last Known BPCC (BSS Parameters Change Counts) element or a Last Known BPCC field (In addition, a Last Known BPCC present field indicating whether Last Known BPCC information exists may be included in the probe request frame) That is, the CSN information does not simply include only a change sequence number indicating whether a critical update event has occurred, but may directly include an information element in which the critical update event has occurred. Accordingly, when the CSN information is included in the probe response frame, updated critical update information can be directly requested and a response received through the probe response frame.

In addition, the receiving MLD may request critical update information from a plurality of APs within the transmitting MLD.

The transmitting MLD may further include a third transmitting STA operating in a third link, and the receiving MLD may further include a third receiving STA operating in the third link.

The probe request frame may further include a profile field of the third receiving STA. The profile field of the third receiving STA may include a second critical update request field. When the first receiving STA requests partial information on the third link and the second important update request field is set to 1, the partial information on the third link may be set as critical update information on the third link.

In this case, the probe response frame may include the critical update information on the third link. The critical update information on the third link may include a BSS parameter of the third transmitting STA.

If the transmitting MLD supports a capability for critical update tracking, the profile field of the third receiving STA may further include CSN information most recently obtained by the third receiving STA. The probe response frame includes only updated information by comparing CSN information most recently obtained by the third receiving STA with current CSN information of the third transmitting STA. That is, when the third receiving STA requests critical update information on the third transmitting STA by including the most recent CSN information stored therein in the probe request frame, the transmitting MLD may transmit only information that needs to be updated instead of all critical update information on the third transmitting STA by including it in a probe response frame. As a result, frame overhead can be reduced.

On the other hand, if the transmitting MLD does not support a capability for critical update tracking, the profile field of the third receiving STA may not include CSN information most recently obtained by the third receiving STA. The probe response frame may include all current critical update information of the third transmitting STA. Since the transmitting MLD does not know the CSN information of the third receiving STA, the transmitting MLD may include all critical update information for the third transmitting STA in a probe response frame and inform it.

Conventionally, a non-AP STA in a non-AP MLD could obtain the most recent BPCC value of APs of the AP MLD through a beacon to check whether a critical update event of the corresponding APs had occurred. However, the BPCC value only confirms whether a critical update event has occurred, but cannot confirm which information or element has been updated. In this embodiment, by directly including the critical update request field and CSN information stored by the non-AP STA in the probe response frame, it has a novel effect of directly obtaining updated BSS parameter information through the probe response frame. In addition, there is an effect that frame overhead can be reduced because only updated BSS parameter information, not all BSS parameter information of a specific AP, can be included in the probe response frame based on the CSN information.

Figure 66:
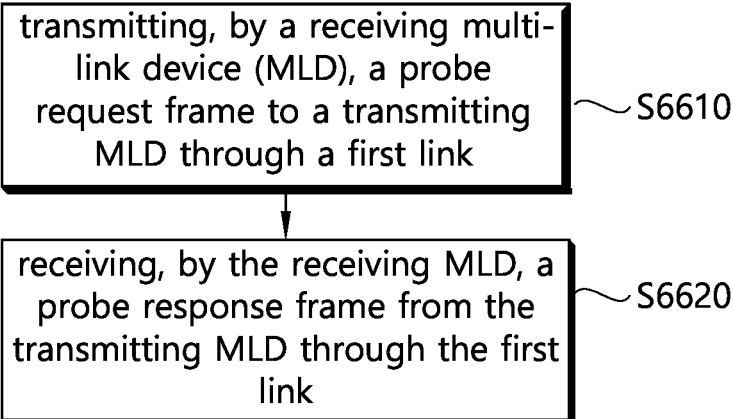
FIG. 66 is a flowchart illustrating a procedure for a receiving MLD to request critical update information from a transmitting MLD based on a probe request frame according to the present embodiment.

FIG. 66 is a flowchart illustrating a procedure for a receiving MLD to request critical update information from a transmitting MLD based on a probe request frame according to the present embodiment.

The example of FIG. 66 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

In this embodiment, when a non-AP STA requests partial information about an AP other than a peer AP through a probe request frame in MLD communication, a method and apparatus for indicating that the partial information request is a request for important update information by including an important update request field (set to 1) in the probe request frame are proposed. Here, the transmitting MLD may correspond to the AP MLD, and the receiving MLD may correspond to the non-AP MLD. If the non-AP STA is a first receiving STA, a first transmitting STA connected to the first receiving STA through a first link may be referred to as a peer AP, and the second and third transmitting STAs connected through different links may be referred to as different APs.

In step S6610, a receiving multi-link device (MLD) transmits a probe request frame to a transmitting MLD through a first link.

In step S6620, the receiving MLD receives a probe response frame from the transmitting MLD through the first link.

The transmitting MLD includes a first transmitting station (STA) operating on the first link and a second transmitting STA operating on a second link. The receiving MLD includes a first receiving STA operating on the first link and a second receiving STA operating on the second link.

The probe request frame includes a profile field of the second receiving STA. The profile field of the second receiving STA includes a first critical update request field.

When the first receiving STA requests partial information on the second link and the first critical update request field is set to 1, the partial information on the second link is set as critical update information on the second link.

In this case, the probe response frame may include the critical update information on the second link. The critical update information on the second link may include a Basic Service Set (BSS) parameter of the second transmitting STA.

That is, in this embodiment, a method of requesting, by a non-AP STA (first receiving STA) critical update information of another AP (second transmitting STA) in the AP MLD by not simply requesting partial information through the above-mentioned critical update request field is proposed. Accordingly, the non-AP STA may receive the critical update information (BSS parameter information) of the other AP through the probe response frame.

If the transmitting MLD supports a capability for critical update tracking, the profile field of the second receiving STA may further include Change Sequence Number (CSN) information most recently obtained by the second receiving STA. The probe response frame may include only updated information by comparing the CSN information most recently obtained by the second receiving STA with current CSN information of the second transmitting STA. That is, when the second receiving STA (Non-AP STA) requests critical update information on the second transmitting STA (another AP) by including the most recent CSN information stored therein in the probe request frame, the transmitting MLD (AP MLD) may transmit only information that needs to be updated instead of all critical update information on the second transmitting STA by including it in a probe response frame. As a result, frame overhead can be reduced.

On the other hand, if the transmitting MLD does not support a capability for critical update tracking, the profile field of the second receiving STA may not include CSN information most recently obtained by the second receiving STA. The probe response frame may include all current critical update information of the second transmitting STA. Since the transmitting MLD does not know the CSN information of the second receiving STA, the transmitting MLD may include all critical update information for the second transmitting STA in a probe response frame and inform it.

The most recently acquired CSN information may be a Last Known BPCC (BSS Parameters Change Counts) element or a Last Known BPCC field (In addition, a Last Known BPCC present field indicating whether Last Known BPCC information exists may be included in the probe request frame) That is, the CSN information does not simply include only a change sequence number indicating whether a critical update event has occurred, but may directly include an information element in which the critical update event has occurred. Accordingly, when the CSN information is included in the probe response frame, updated critical update information can be directly requested and a response received through the probe response frame.

In addition, the receiving MLD may request critical update information from a plurality of APs within the transmitting MLD.

The transmitting MLD may further include a third transmitting STA operating in a third link, and the receiving MLD may further include a third receiving STA operating in the third link.

The probe request frame may further include a profile field of the third receiving STA. The profile field of the third receiving STA may include a second critical update request field. When the first receiving STA requests partial information on the third link and the second important update request field is set to 1, the partial information on the third link may be set as critical update information on the third link.

In this case, the probe response frame may include the critical update information on the third link. The critical update information on the third link may include a BSS parameter of the third transmitting STA.

If the transmitting MLD supports a capability for critical update tracking, the profile field of the third receiving STA may further include CSN information most recently obtained by the third receiving STA. The probe response frame includes only updated information by comparing CSN information most recently obtained by the third receiving STA with current CSN information of the third transmitting STA. That is, when the third receiving STA requests critical update information on the third transmitting STA by including the most recent CSN information stored therein in the probe request frame, the transmitting MLD may transmit only information that needs to be updated instead of all critical update information on the third transmitting STA by including it in a probe response frame. As a result, frame overhead can be reduced.

On the other hand, if the transmitting MLD does not support a capability for critical update tracking, the profile field of the third receiving STA may not include CSN information most recently obtained by the third receiving STA. The probe response frame may include all current critical update information of the third transmitting STA. Since the transmitting MLD does not know the CSN information of the third receiving STA, the transmitting MLD may include all critical update information for the third transmitting STA in a probe response frame and inform it.

Conventionally, a non-AP STA in a non-AP MLD could obtain the most recent BPCC value of APs of the AP MLD through a beacon to check whether a critical update event of the corresponding APs had occurred. However, the BPCC value only confirms whether a critical update event has occurred, but cannot confirm which information or element has been updated. In this embodiment, by directly including the critical update request field and CSN information stored by the non-AP STA in the probe response frame, it has a novel effect of directly obtaining updated BSS parameter information through the probe response frame. In addition, there is an effect that frame overhead can be reduced because only updated BSS parameter information, not all BSS parameter information of a specific AP, can be included in the probe response frame based on the CSN information.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure transmits a probe request frame to a transmitting multi-link device (MLD) through a first link; and receives a probe response frame from the transmitting MLD through the first link.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including transmitting a probe request frame to a transmitting multi-link device (MLD) through a first link; and receiving a probe response frame from the transmitting MLD through the first link. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method comprising:

transmitting, by a receiving multi-link device (MLD), a probe request frame to a transmitting MLD through a first link; and receiving, by the receiving MLD, a probe response frame from the transmitting MLD through the first link, wherein the transmitting MLD includes a first transmitting station (STA) operating on the first link and a second transmitting STA operating on a second link, wherein the receiving MLD includes a first receiving STA operating on the first link and a second receiving STA operating on the second link, wherein the probe request frame includes a profile field of the second receiving STA, wherein the profile field of the second receiving STA includes a first critical update request subfield, and wherein based on the first receiving STA requesting partial information on the second link and the first critical update request field being set to 1, the partial information on the second link is set as critical update information on the second link, wherein based on the transmitting MLD supporting a capability for critical update tracking:

the profile field of the second receiving STA further includes Change Sequence Number (CSN) information most recently obtained by the second receiving STA, and the probe response frame includes only updated information by comparing the CSN information most recently obtained by the second receiving STA with current CSN information of the second transmitting STA.

2. The method of claim 1, wherein based on the transmitting MLD not supporting a capability for critical update tracking;

the profile field of the second receiving STA does not include CSN information most recently obtained by the second receiving STA, the probe response frame includes all current critical update information of the second transmitting STA.

3. The method of claim 1, wherein the transmitting MLD further includes a third transmitting STA operating in a third link, wherein the receiving MLD further includes a third receiving STA operating in the third link, wherein the probe request frame further includes a profile field of the third receiving STA, wherein the profile field of the third receiving STA includes a second critical update request field, and wherein based on the first receiving STA requesting partial information on the third link and the second critical update request field being set to 1, the partial information on the third link is set as critical update information on the third link.

4. The method of claim 3, wherein based on the transmitting MLD supporting a capability for critical update tracking;

the profile field of the third receiving STA further includes CSN information most recently obtained by the third receiving STA, the probe response frame includes only updated information by comparing CSN information most recently obtained by the third receiving STA with current CSN information of the third transmitting STA.

5. The method of claim 3, wherein based on the transmitting MLD not supporting a capability for critical update tracking:

the profile field of the third receiving STA does not include CSN information most recently obtained by the third receiving STA, the probe response frame includes all current critical update information of the third transmitting STA.

6. The method of claim 3, wherein the probe response frame includes the critical update information on the second and third links, wherein the critical update information on the second link includes a basic service set (BSS) parameter of the second transmitting STA, wherein the critical update information on the third link includes a BSS parameter of the third transmitting STA.

7. A receiving multi-link device (MLD) comprising:

a memory;

a transceiver; and a processor operatively coupled to the memory and the transceiver, wherein processor is configured to:

transmit a probe request frame to a transmitting MLD through a first link; and receive a probe response frame from the transmitting MLD through the first link, wherein the transmitting MLD includes a first transmitting station (STA) operating on the first link and a second transmitting STA operating on a second link, wherein the receiving MLD includes a first receiving STA operating on the first link and a second receiving STA operating on the second link, wherein the probe request frame includes a profile field of the second receiving STA, wherein the profile field of the second receiving STA includes a first critical update request subfield, and wherein based on the first receiving STA requesting partial information on the second link and the first critical update request field being set to 1, the partial information on the second link is set as critical update information on the second link, wherein based on the transmitting MLD supporting a capability for critical update tracking:

the profile field of the second receiving STA further includes Change Sequence Number (CSN) information most recently obtained by the second receiving STA, and the probe response frame includes only updated information by comparing the CSN information most recently obtained by the second receiving STA with current CSN information of the second transmitting STA.

8. A method comprising:

receiving, by a transmitting multi-link device (MLD), a probe request frame from a receiving MLD through a first link; and transmitting, by the transmitting MLD, a probe response frame to the receiving MLD through the first link, wherein the transmitting MLD includes a first transmitting station (STA) operating on the first link and a second transmitting STA operating on a second link, wherein the receiving MLD includes a first receiving STA operating on the first link and a second receiving STA operating on the second link, wherein the probe request frame includes a profile field of the second receiving STA, wherein the profile field of the second receiving STA includes a first critical update request subfield, and wherein based on the first receiving STA requesting partial information on the second link and the first critical update request field being set to 1, the partial information on the second link is set as critical update information on the second link, wherein based on the transmitting MLD supporting a capability for critical update tracking:

the profile field of the second receiving STA further includes Change Sequence Number (CSN) information most recently obtained by the second receiving STA, and the probe response frame includes only updated information by comparing the CSN information most recently obtained by the second receiving STA with current CSN information of the second transmitting STA.

9. The method of claim 8, wherein based on the transmitting MLD not supporting a capability for critical update tracking;

the profile field of the second receiving STA does not include CSN information most recently obtained by the second receiving STA, the probe response frame includes all current critical update information of the second transmitting STA.

10. The method of claim 8, wherein the transmitting MLD further includes a third transmitting STA operating in a third link, wherein the receiving MLD further includes a third receiving STA operating in the third link, wherein the probe request frame further includes a profile field of the third receiving STA, wherein the profile field of the third receiving STA includes a second critical update request field, and wherein based on the first receiving STA requesting partial information on the third link and the second critical update request field being set to 1, the partial information on the third link is set as critical update information on the third link.

11. The method of claim 10, wherein based on the transmitting MLD supporting a capability for critical update tracking;

the profile field of the third receiving STA further includes CSN information most recently obtained by the third receiving STA, the probe response frame includes only updated information by comparing CSN information most recently obtained by the third receiving STA with current CSN information of the third transmitting STA.

12. The method of claim 10, wherein based on the transmitting MLD not supporting a capability for critical update tracking:

the profile field of the third receiving STA does not include CSN information most recently obtained by the third receiving STA, the probe response frame includes all current critical update information of the third transmitting STA.

13. The method of claim 10, wherein the probe response frame includes the critical update information on the second and third links, wherein the critical update information on the second link includes a basic service set (BSS) parameter of the second transmitting STA, wherein the critical update information on the third link includes a BSS parameter of the third transmitting STA.

* * * * *